US012259311B2

(12) United States Patent
Ota et al.

(10) Patent No.: US 12,259,311 B2
(45) Date of Patent: Mar. 25, 2025

(54) METHODS AND SYSTEMS FOR CYTOMETRY

(71) Applicants: ThinkCyte K.K., Tokyo (JP); University of Tokyo, Tokyo (JP); Osaka University, Osaka (JP)

(72) Inventors: Sadao Ota, Tokyo (JP); Ryoichi Horisaki, Osaka (JP); Yoko Kawamura, Tokyo (JP); Masashi Ugawa, Tokyo (JP); Issei Sato, Tokyo (JP)

(73) Assignees: ThinkCyte K.K., Tokyo (JP); University of Tokyo, Tokyo (JP); Osaka University, Osaka (JP)

( * ) Notice: Subject to any disclaimer, the term of this patent is extended or adjusted under 35 U.S.C. 154(b) by 0 days.

(21) Appl. No.: 18/238,368

(22) Filed: Aug. 25, 2023

(65) Prior Publication Data

US 2024/0133792 A1  Apr. 25, 2024

Related U.S. Application Data

(63) Continuation of application No. 17/115,657, filed on Dec. 8, 2020, now Pat. No. 11,788,948, which is a (Continued)

(51) Int. Cl.
*G01N 15/14* (2024.01)
*G01N 15/1434* (2024.01)
(Continued)

(52) U.S. Cl.
CPC ..... *G01N 15/1434* (2013.01); *G01N 15/1459* (2013.01); *G01N 2015/1006* (2013.01);
(Continued)

(58) Field of Classification Search
CPC .......... G01N 15/1434; G01N 15/1459; G01N 15/149; G01N 2015/1006; G01N 2015/145; G01N 2015/1497
See application file for complete search history.

(56) References Cited

U.S. PATENT DOCUMENTS

| 4,537,861 A | 8/1985 | Elings et al. |
| 5,007,737 A | 4/1991 | Hirleman, Jr. |
| (Continued) | | |

FOREIGN PATENT DOCUMENTS

| CN | 1302229 A | 7/2001 |
| CN | 1330151 A | 1/2002 |
| (Continued) | | |

OTHER PUBLICATIONS

CN201680011390X Chinese Search Report dated Mar. 1, 2019.
(Continued)

*Primary Examiner* — Roy M Punnoose
(74) *Attorney, Agent, or Firm* — WILSON SONSINI GOODRICH & ROSATI

(57) ABSTRACT

The present disclosure provides methods and systems for ghost cytometry (GC), which may be used to produce an image of an object without using a spatially resolving detector. This may be used to perform image-free ultrafast fluorescence "imaging" cytometry, based on, for example, a single pixel detector. Spatial information obtained from the motion of cells relative to a patterned optical structure may be compressively converted into signals that arrive sequentially at a single pixel detector. Combinatorial use of the temporal waveform with the intensity distribution of the random or pseudo-random pattern may permit computational reconstruction of cell morphology. Machine learning methods may be applied directly to the compressed waveforms without image reconstruction to enable efficient image-free morphology-based cytometry. Image-free GC
(Continued)

may achieve accurate and high throughput cell classification as well as selective sorting based on cell morphology without a specific biomarker, which have been challenging using conventional flow cytometers.

22 Claims, 27 Drawing Sheets

Related U.S. Application Data continuation of application No. PCT/US2019/036849, filed on Jun. 12, 2019.

(60) Provisional application No. 62/684,612, filed on Jun. 13, 2018, provisional application No. 62/701,395, filed on Jul. 20, 2018, provisional application No. 62/804,560, filed on Feb. 12, 2019, provisional application No. 62/848,478, filed on May 15, 2019.

(51) Int. Cl.
G01N 15/10 (2006.01)
G01N 15/149 (2024.01)

(52) U.S. Cl.
CPC ..... G01N 2015/145 (2013.01); G01N 15/149 (2024.01); G01N 2015/1497 (2013.01)

(56) References Cited

U.S. PATENT DOCUMENTS

| | | |
|---|---|---|
| 5,017,497 A | 5/1991 | Gerard De Grooth et al. |
| 5,483,469 A * | 1/1996 | Van den Engh ....... G01N 15/14 356/336 |
| 6,064,473 A | 5/2000 | Hironaga et al. |
| 6,249,341 B1 | 6/2001 | Basiji et al. |
| 6,956,230 B1 | 10/2005 | Gharib et al. |
| 7,012,738 B1 | 3/2006 | Schwarte |
| 7,217,573 B1 | 5/2007 | Oshida et al. |
| 7,812,303 B2 | 10/2010 | Meyers et al. |
| 8,314,933 B2 | 11/2012 | Cui et al. |
| 8,582,203 B2 | 11/2013 | Dunsby |
| 9,069,175 B2 | 6/2015 | Koebler et al. |
| 9,134,242 B2 | 9/2015 | Shaffer et al. |
| 9,360,660 B2 | 6/2016 | Yi et al. |
| 9,518,916 B1 | 12/2016 | Pandev et al. |
| 9,645,377 B2 * | 5/2017 | Bosworth ............ G02B 21/008 |
| 9,915,598 B2 | 3/2018 | Kim et al. |
| 10,646,160 B2 | 5/2020 | Yelin et al. |
| 10,761,011 B2 * | 9/2020 | Ota ........................ G01N 21/59 |
| 10,904,415 B2 | 1/2021 | Horisaki et al. |
| 11,054,363 B2 | 7/2021 | Ota et al. |
| 11,098,275 B2 | 8/2021 | Ota et al. |
| 11,412,118 B2 | 8/2022 | Horisaki et al. |
| 11,542,461 B2 | 1/2023 | Ota et al. |
| 11,549,880 B2 | 1/2023 | Horisaki et al. |
| 11,579,075 B2 | 2/2023 | Ota et al. |
| 11,630,293 B2 | 4/2023 | Ugawa et al. |
| 11,788,948 B2 * | 10/2023 | Ota .................... G01N 15/1459 356/39 |
| 11,861,889 B2 | 1/2024 | Ota et al. |
| 11,867,610 B2 | 1/2024 | Ota et al. |
| 11,906,722 B2 | 2/2024 | Horisaki et al. |
| 2002/0041376 A1 | 4/2002 | Kurozumi et al. |
| 2003/0162218 A1 | 8/2003 | Emalfarb et al. |
| 2004/0061914 A1 | 4/2004 | Miyawaki et al. |
| 2004/0189977 A1 | 9/2004 | Nagai et al. |
| 2005/0002030 A1 | 1/2005 | Kolp et al. |
| 2005/0046849 A1 | 3/2005 | Cromwell et al. |
| 2005/0051466 A1 | 3/2005 | Carter et al. |
| 2007/0091315 A1 | 4/2007 | Brady et al. |
| 2007/0151343 A1 | 7/2007 | Gross et al. |
| 2008/0195020 A1 | 8/2008 | Cabuz et al. |
| 2008/0214412 A1 | 9/2008 | Stahler et al. |
| 2009/0071225 A1 | 3/2009 | Schilffarth |
| 2009/0093807 A1 | 4/2009 | Hyde et al. |
| 2009/0153883 A1 | 6/2009 | Shinoda |
| 2009/0190121 A1 | 7/2009 | Hegyi et al. |
| 2009/0194702 A1 | 8/2009 | Meyers et al. |
| 2009/0248318 A1 | 10/2009 | Nagai et al. |
| 2009/0290156 A1 | 11/2009 | Popescu et al. |
| 2010/0170796 A1 | 7/2010 | Bhatia et al. |
| 2010/0284016 A1 | 11/2010 | Teitell et al. |
| 2010/0294916 A1 | 11/2010 | Meyers et al. |
| 2012/0001090 A1 | 1/2012 | Takasaki et al. |
| 2012/0004514 A1 | 1/2012 | Marugame |
| 2012/0069170 A1 | 3/2012 | Gesley |
| 2012/0122084 A1 | 5/2012 | Wagner et al. |
| 2012/0128264 A1 | 5/2012 | Yazdanfar et al. |
| 2012/0200857 A1 | 8/2012 | Sharpe et al. |
| 2012/0204628 A1 | 8/2012 | Wagner et al. |
| 2013/0016335 A1 | 1/2013 | Lo et al. |
| 2013/0078733 A1 | 3/2013 | Holmes et al. |
| 2013/0102865 A1 | 4/2013 | Mandelis et al. |
| 2013/0155499 A1 | 6/2013 | Dixon et al. |
| 2013/0163844 A1 | 6/2013 | Ozaki et al. |
| 2013/0176533 A1 | 7/2013 | Raffle et al. |
| 2013/0200277 A1 | 8/2013 | Li et al. |
| 2013/0202151 A1 | 8/2013 | Dauwels et al. |
| 2013/0204538 A1 | 8/2013 | Rich |
| 2013/0308122 A1 | 11/2013 | Merchez et al. |
| 2013/0329226 A1 | 12/2013 | Matsubara et al. |
| 2014/0073000 A1 | 3/2014 | Sun et al. |
| 2014/0078352 A1 | 3/2014 | Iwai |
| 2014/0098359 A1 | 4/2014 | Gross et al. |
| 2014/0152801 A1 | 6/2014 | Fine et al. |
| 2014/0236494 A1 | 8/2014 | Kolandaivelu et al. |
| 2014/0293281 A1 | 10/2014 | Yamamoto et al. |
| 2014/0353522 A1 | 12/2014 | Wu et al. |
| 2014/0376816 A1 | 12/2014 | Lagae et al. |
| 2015/0182178 A1 | 7/2015 | Baturin et al. |
| 2015/0192767 A1 | 7/2015 | Li et al. |
| 2015/0198584 A1 | 7/2015 | Rajwa et al. |
| 2015/0233703 A1 | 8/2015 | Martini et al. |
| 2015/0268244 A1 | 9/2015 | Cho et al. |
| 2015/0276387 A1 | 10/2015 | Kletter et al. |
| 2015/0377783 A1 | 12/2015 | Kumer |
| 2016/0005351 A1 | 1/2016 | Jeon et al. |
| 2016/0026900 A1 | 1/2016 | Ando |
| 2016/0033328 A1 | 2/2016 | Walters |
| 2016/0046958 A1 | 2/2016 | Eberwine et al. |
| 2016/0069919 A1 | 3/2016 | Holmes et al. |
| 2016/0125615 A1 | 5/2016 | Shigaki et al. |
| 2016/0131891 A1 | 5/2016 | Higaki |
| 2016/0169786 A1 | 6/2016 | Albitar et al. |
| 2016/0223453 A1 | 8/2016 | Jalali et al. |
| 2016/0231549 A1 * | 8/2016 | Bosworth .......... G02B 21/0032 |
| 2016/0258856 A1 | 9/2016 | Kim et al. |
| 2016/0258901 A1 | 9/2016 | Kang et al. |
| 2016/0327779 A1 | 11/2016 | Hillman et al. |
| 2016/0370266 A1 | 12/2016 | White et al. |
| 2017/0045437 A1 | 2/2017 | Ishimaru |
| 2017/0052106 A1 | 2/2017 | Hennig et al. |
| 2017/0058361 A1 | 3/2017 | Ogawa et al. |
| 2017/0082531 A1 | 3/2017 | Okada et al. |
| 2017/0184483 A1 | 6/2017 | Bartels et al. |
| 2017/0212028 A1 | 7/2017 | Correia De Matos Nolasco Lamas et al. |
| 2017/0221194 A1 | 8/2017 | Ebstein |
| 2017/0227466 A1 | 8/2017 | Lo et al. |
| 2017/0322137 A1 | 11/2017 | Feher et al. |
| 2017/0328826 A1 | 11/2017 | Diebold et al. |
| 2017/0332933 A1 | 11/2017 | Krishnaswamy et al. |
| 2018/0052154 A1 | 2/2018 | Stoner et al. |
| 2018/0127823 A1 | 5/2018 | Shekhar et al. |
| 2018/0246030 A1 | 8/2018 | Ota et al. |
| 2018/0251833 A1 | 9/2018 | Daugharthy et al. |
| 2018/0327699 A1 * | 11/2018 | Ota ........................ G01N 21/64 |
| 2019/0005351 A1 | 1/2019 | Zhou et al. |
| 2019/0339380 A1 | 11/2019 | Marks |
| 2019/0355440 A1 | 11/2019 | Ramjeet et al. |
| 2019/0383719 A1 | 12/2019 | Corbett et al. |

(56) References Cited

U.S. PATENT DOCUMENTS

| | | | |
|---|---|---|---|
| 2020/0027020 A1 | 1/2020 | Kamesawa et al. | |
| 2021/0003498 A1 | 1/2021 | Ota et al. | |
| 2021/0080382 A1 | 3/2021 | Alfano et al. | |
| 2021/0161385 A1 | 6/2021 | Ben-Yakar et al. | |
| 2021/0190669 A1* | 6/2021 | Ota | G01N 15/1434 |
| 2021/0310053 A1 | 10/2021 | Sugimoto | |
| 2022/0317020 A1 | 10/2022 | Nakagawa | |
| 2023/0012588 A1 | 1/2023 | Imai et al. | |
| 2023/0090631 A1 | 3/2023 | Imai et al. | |
| 2023/0237789 A1 | 7/2023 | Ota et al. | |
| 2023/0288318 A1 | 9/2023 | Ota et al. | |
| 2024/0241038 A1 | 7/2024 | Ota et al. | |
| 2024/0303980 A1 | 9/2024 | Ota et al. | |

FOREIGN PATENT DOCUMENTS

| | | |
|---|---|---|
| CN | 101320252 A | 12/2008 |
| CN | 101714212 A | 5/2010 |
| CN | 101925809 A | 12/2010 |
| CN | 101939633 A | 1/2011 |
| CN | 102272580 A | 12/2011 |
| CN | 102331411 A | 1/2012 |
| CN | 102495467 A | 6/2012 |
| CN | 102890049 A | 1/2013 |
| CN | 103582809 A | 2/2014 |
| CN | 103604737 A | 2/2014 |
| CN | 103837461 A | 6/2014 |
| CN | 103930768 A | 7/2014 |
| CN | 103942415 A | 7/2014 |
| CN | 104136907 A | 11/2014 |
| CN | 104154878 A | 11/2014 |
| CN | 104200114 A | 12/2014 |
| CN | 104736995 A | 6/2015 |
| CN | 104849874 A | 8/2015 |
| CN | 105005053 A | 10/2015 |
| CN | 105044897 A | 11/2015 |
| CN | 105181649 A | 12/2015 |
| CN | 105223582 A | 1/2016 |
| CN | 105574536 A | 5/2016 |
| CN | 105579828 A | 5/2016 |
| CN | 105651656 A | 6/2016 |
| CN | 105849275 A | 8/2016 |
| CN | 106068520 A | 11/2016 |
| CN | 106097437 A | 11/2016 |
| CN | 106267241 A | 1/2017 |
| CN | 106295251 A | 1/2017 |
| CN | 106520535 A | 3/2017 |
| CN | 109297888 A | 2/2019 |
| EP | 2602612 A1 | 6/2013 |
| EP | 2673618 A1 | 12/2013 |
| EP | 3264031 A1 | 1/2018 |
| EP | 3372985 A1 | 9/2018 |
| EP | 3499201 A1 | 6/2019 |
| EP | 3584564 A1 | 12/2019 |
| EP | 3807005 A1 | 4/2021 |
| EP | 4306931 A2 | 1/2024 |
| JP | S613032 A | 1/1986 |
| JP | S6279329 A | 4/1987 |
| JP | H01118747 A | 5/1989 |
| JP | H03216553 A | 9/1991 |
| JP | H06102152 A | 4/1994 |
| JP | H07270302 A | 10/1995 |
| JP | H07270314 A | 10/1995 |
| JP | H07325026 A | 12/1995 |
| JP | H09311102 A | 12/1997 |
| JP | 2002116133 A | 4/2002 |
| JP | 3444509 B2 | 9/2003 |
| JP | 2003526091 A | 9/2003 |
| JP | 2004150832 A | 5/2004 |
| JP | 2004279032 A | 10/2004 |
| JP | 2004286731 A | 10/2004 |
| JP | 2005069832 A | 3/2005 |
| JP | 2006520893 A | 9/2006 |
| JP | 2007048172 A | 2/2007 |
| JP | 2007281634 A | 10/2007 |
| JP | 2008523402 A | 7/2008 |
| JP | 2008539425 A | 11/2008 |
| JP | 2009115672 A | 5/2009 |
| JP | 2009180724 A | 8/2009 |
| JP | 2009180725 A | 8/2009 |
| JP | 2009210465 A | 9/2009 |
| JP | 2010203949 A | 9/2010 |
| JP | 4679507 B2 | 4/2011 |
| JP | 2011099848 A | 5/2011 |
| JP | 2011141444 A | 7/2011 |
| JP | 2011229409 A | 11/2011 |
| JP | 2011229410 A | 11/2011 |
| JP | 2012500385 A | 1/2012 |
| JP | 2013015357 A | 1/2013 |
| JP | 2013128438 A | 7/2013 |
| JP | 2013167582 A | 8/2013 |
| JP | 2013178232 A | 9/2013 |
| JP | 2013210287 A | 10/2013 |
| JP | 2014013234 A | 1/2014 |
| JP | 5418386 B2 | 2/2014 |
| JP | 5464244 B2 | 4/2014 |
| JP | 5534214 B2 | 6/2014 |
| JP | 5574407 B2 | 8/2014 |
| JP | 2014175819 A | 9/2014 |
| JP | 2014190748 A | 10/2014 |
| JP | 2015036799 A | 2/2015 |
| JP | 2015052663 A | 3/2015 |
| JP | 2015512029 A | 4/2015 |
| JP | 2016057172 A | 4/2016 |
| JP | 2016510418 A | 4/2016 |
| JP | 2016073210 A | 5/2016 |
| JP | 2016090292 A | 5/2016 |
| JP | 2016099685 A | 5/2016 |
| JP | 2016517526 A | 6/2016 |
| JP | 2016524703 A | 8/2016 |
| JP | 2016192007 A | 11/2016 |
| JP | 2017058361 A | 3/2017 |
| JP | 2018511060 A | 4/2018 |
| JP | 2018132501 A | 8/2018 |
| JP | WO2018181458 A1 | 2/2020 |
| WO | WO-03048345 A1 | 6/2003 |
| WO | WO-2006080314 A1 | 8/2006 |
| WO | WO-2006103920 A1 | 10/2006 |
| WO | WO-2006115663 A2 | 11/2006 |
| WO | WO-2006127967 A2 | 11/2006 |
| WO | WO-2007067999 A2 | 6/2007 |
| WO | WO-2010017001 A2 | 2/2010 |
| WO | WO-2010032452 A1 | 3/2010 |
| WO | WO-2011028109 A1 | 3/2011 |
| WO | WO-2011049965 A1 | 4/2011 |
| WO | WO-2012068287 A2 | 5/2012 |
| WO | WO-2012086195 A1 | 6/2012 |
| WO | WO-2012144886 A1 | 10/2012 |
| WO | WO-2012147804 | 11/2012 |
| WO | WO-2013066896 A1 | 5/2013 |
| WO | WO-2013101675 A2 | 7/2013 |
| WO | WO-2014127379 A1 | 8/2014 |
| WO | WO-2014144585 A1 | 9/2014 |
| WO | WO-2014146062 A2 | 9/2014 |
| WO | WO-2015067734 A1 | 5/2015 |
| WO | WO-2015068834 A1 | 5/2015 |
| WO | WO-2015148560 A1 | 10/2015 |
| WO | WO-2016038796 A1 | 3/2016 |
| WO | WO-2016073985 A1 | 5/2016 |
| WO | WO-2016085571 A2 | 6/2016 |
| WO | WO-2016130489 A1 | 8/2016 |
| WO | WO-2016136801 A1 | 9/2016 |
| WO | WO-2017046988 A1 | 3/2017 |
| WO | WO-2017073737 A1 | 5/2017 |
| WO | WO-2017121896 A1 | 7/2017 |
| WO | WO-2017164936 A1 | 9/2017 |
| WO | WO-2018034241 A1 | 2/2018 |
| WO | WO-2018126205 A1 | 7/2018 |
| WO | WO-2018151206 A1 | 8/2018 |
| WO | WO-2018199080 A1 | 11/2018 |
| WO | WO-2019241443 A1 | 12/2019 |
| WO | WO-2020081819 A1 | 4/2020 |

(56) References Cited

FOREIGN PATENT DOCUMENTS

| WO | WO-2021132484 A1 | 7/2021 |
|---|---|---|
| WO | WO-2021200911 A1 | 10/2021 |
| WO | WO-2021200960 A1 | 10/2021 |

OTHER PUBLICATIONS

CN201680062987.7 Office Action dated Dec. 30, 2019.
EP16755545.7 European Office Action dated Jun. 24, 2020.
EP16755545.7 Extended European Search Report dated Aug. 24, 2018.
EP16859965.2 European Search Report dated Aug. 16, 2019.
EP16859965.2 European Search Report dated May 6, 2019.
EP16859965.2 Office Action dated Jul. 18, 2022.
EP19819019.1 Extended European Search Report dated Feb. 8, 2022.
Han, et al., Imaging cells in flow cytometer using spatial-temporal transformation. Scientific Reports, Aug. 18, 2015; vol. 5, No. 1: XP055477357.
International Search Report of PCT/JP2016/055412, dated May 17, 2016.
International Search Report of PCT/JP2016/082089, dated Jan. 24, 2017.
Japanese Application No. 2017-547891 Office Action dated Oct. 6, 2020.
JP2017-547891 Japanese Office Action dated Apr. 27, 2021.
JP2021-159163 Japanese Office Action dated Oct. 4, 2022.
Katz, et al. Compressive ghost imaging. Appl. Phys. Lett. 95, 131110 (2009).
Li, et al., Ghost imaging for an axially moving target with an unknown constant speed, Photonics Research, Aug. 2015; 3(4):153-157.
Li, et al., Ghost imaging of a moving target with an unknown constant speed, Applied Physics Letters, 2014; 104:251120-1-251120-3.
PCT/US2019/036849 International Search Report and Written Opinion dated Sep. 19, 2019.
Shibuya, et al., Monomolecular fluorescence imaging method based on ghost imaging by using circulatory pattern (second report), 2014: 863-864.
Ugawa M, Lei C, Nozawa T, Ideguchi T, Di Carlo D, Ota S, Ozeki Y, Goda K. High-throughput optofluidic particle profiling with morphological and chemical specificity. Opt Lett. Oct. 15, 2015;40(20):4803-6. doi: 10.1364/OL.40.004803. PMID: 26469624.
U.S. Appl. No. 15/552,438 Notice of Allowance dated Jul. 17, 2020.
U.S. Appl. No. 15/552,438 Notice of Allowance dated Jun. 16, 2020.
U.S. Appl. No. 15/552,438 Office Action dated Apr. 12, 2019.
U.S. Appl. No. 15/552,438 Office Action dated Aug. 9, 2018.
U.S. Appl. No. 15/552,438 Office Action dated Nov. 12, 2019.
U.S. Appl. No. 15/771,180 Notice of Allowance dated May 17, 2021.
U.S. Appl. No. 15/771,180 Office Action dated Apr. 23, 2019.
U.S. Appl. No. 15/771,180 Office Action dated Jul. 30, 2020.
U.S. Appl. No. 15/771,180 Office Action dated Jun. 8, 2020.
U.S. Appl. No. 15/771,180 Office Action dated Nov. 13, 2019.
U.S. Appl. No. 16/936,138 Notice of Allowance dated Apr. 14, 2021.
U.S. Appl. No. 16/936,138 Notice of Allowance dated Jun. 8, 2021.
U.S. Appl. No. 16/936,138 Office Action dated Oct. 22, 2020.
U.S. Appl. No. 17/115,657 Notice of Allowance dated Aug. 4, 2023.
U.S. Appl. No. 17/115,657 Notice of Allowance dated Jun. 14, 2023.
U.S. Appl. No. 17/115,657 Office Action dated Jan. 20, 2023.
U.S. Appl. No. 17/336,720 Notice of Allowance dated Oct. 27, 2022.
U.S. Appl. No. 17/336,720 Office Action dated Apr. 14, 2022.
U.S. Appl. No. 17/351,117 Notice of Allowance dated Sep. 15, 2022.
U.S. Appl. No. 17/351,117 Office Action dated Apr. 22, 2022.
U.S. Appl. No. 18/059,846 Notice of Allowance dated Aug. 22, 2023.
U.S. Appl. No. 18/059,846 Notice of Allowance dated Sep. 6, 2023.
U.S. Appl. No. 18/059,846 Office Action dated May 17, 2023.
U.S. Appl. No. 18/152,354 Notice of Allowance dated Aug. 23, 2023.
U.S. Appl. No. 18/152,354 Office Action dated Jul. 3, 2023.
Zhang, et al., Study on ghost imaging via compressive sensing for a reflected object, Optik, 2013;124:2334-2338.
Co-pending U.S. Appl. No. 18/511,920, inventors Ota; Sadao et al., filed on Nov. 16, 2023.
Co-pending U.S. Appl. No. 18/512,356, inventors Ota; Sadao et al., filed on Nov. 17, 2023.
Byounghyo Lee, Jong-Young Hong, Dongheon Yoo, Jaebum Cho, Youngmo Jeong, Seokil Moon, Byoungho Lee, "Single-shot phaseretrieval via Fourier ptychographic microscopy", Optica, Optical Society of America, vol. 5, No. 8, p. 976, Aug. 2018.
Choi, K. et al., Compressive holography of diffuse objects, Applied Optics, Optical Society of America, Washington, Dc; US, vol. 49, No. 34, Dec. 1, 2010 (Dec. 1, 2010), pp. H1-H10, XP001559209, ISSN: 0003-6935, DOI: 10.1364/A0.49.0000H1.
Hassan et al., "Flow Cytometry-Based Classification in Cancer Research: A View on Feature Selection", 2015, Cancer Informatics, vol. 14(S5), pp. 75-85 (Year: 2015).
Hennig et al., "An open-source solution for advanced imaging flow cytometry data analysis using machine learning", Jan. 2017, Methods, vol. 112, pp. 201-210 (Year: 2017).
Hiroaki Adachi et al: "Use of Ghost Cytometry to Differentiate Cells with Similar Gross Morphologic Characteristics", arxiv.org, Cornell University Library, 201OLIN Library Cornell University Ithaca, NY14853,Mar. 22, 2019 (Mar. 22, 2019), XP081156807.
Horisaki, et al., Single-pixel compressive diffractive imaging with structured illumination. Applied Optics, May 10, 2017, vol. 56 No. 14; 4085-4089.
Joung, J. et al.: Genome-scale CRISPR-Cas9 knockout and transcriptional activation screening. Nat Protoc. 12(4):828-863 (2017). doi: 10.1038/nprot.2017.016. Epub Mar. 2, 20173.
Katkovnik V, Astola J, Compressive sensing computational ghost imaging, J.Opt. Soc. Am. A, 2012.07.12, vol. 29, No. 8, pp. 1556-1567.
Katkovnik V, Astola J, Phase retrieval via spatial light modulator phase modulation in 4f optical setup: numerical inverse imaging with sparse regularization for phase and amplitude, J. Opt. Soc. Am. A, Dec. 19, 2011, vol. 29, No. 1, pp. 105-116.
Krstenansky, J.L. et al., Short model peptides having a high alpha-helical tendency: design and solution properties. FEBS Lett. Jan. 2, 1989;242(2):409-13. doi: 10.1016/0014-5793(89)80512-5.
Lee et al., "Transfer Learning for Auto-gating of Flow Cytometry Data", 2012, Proceedings of ICML Workshop on Unsupervised and Transfer Learning, vol. 27, pp. 155-165 (Year: 2012).
Liutkus, A. et al. Imaging With Nature: A Universal Analog Compressive Imager Using a Multiply Scattering Medium, Sep. 2, 2013 (Sep. 2, 2013), XP055194020, Retrieved from the Internet: URL: http://arxiv.org/vc/arxiv/papers/1309/1309.0425v1.pdf.
Liutkus, et al., Imaging with nature: compressive imaging using a multiply scattering medium. Scientific Reports, Jul. 9, 2014; vol. 4, Document No. 5552: pp. 1-7.
Marco F. Duarte et al: "Single-pixel imaging via compressive sampling", IEEE Signal Processing Magazine., vol. 25, No. 2, Mar. 2008 (Mar. 2008), pp. 83-91, XP055666482, US ISSN: 1053-5888, DOI: 10.1109/MSP.2007.914730.
Masashi Ugawa et al: "High-throughput optofluidic particle profiling with morphological and chemical specificity", Optics Letters, vol. 40, No. 20,Oct. 15, 2015 (Oct. 15, 2015), p. 4803, XP055601369, usISSN: 0146-9592, DOI: 10.1364/OL.40.004803.
Mehrdad Abolbashari: "High dynamic range compressive imaging: aprogrammable imaging system", Optical Engineering., vol. 51, No. 7, Jun. 11, 2012 (Jun. 11, 2012), p. 071407, XP055667050, Bellingham Issn: 0091-3286, DOI: 10.1117/1.OE.51.7.071407.
Ni et al., "Discrimination of malignant neutrophils of chronic myelogenous leukemia from normal neutrophils by support vectormachine", 2013, Computers in Biology and Medicine, vol. 43(9), pp. 1192-1195 (Year: 2013).

(56) References Cited

OTHER PUBLICATIONS

Nitta, N. et al., Intelligent Image-Activated Cell Sorting. Cell. Sep. 20, 2018;175(1):266-276.e13. doi: 10.1016/j.cell.2018.08.028. Epub Aug. 2, 20187.
Ota, S. et al., Ghost Cytometry, Science. Jun. 15, 2018; 360 (6394): 1246-1251.
PCT/JP2017/029156 International Search Report dated Oct. 31, 2017.
PCT/JP2018/005237 International Search Report dated May 1, 2018.
PCT/JP2018/012708 International Search Report dated Jul. 3, 2018.
PCT/JP2018/016584 International Search Report dated Jul. 17, 2018.
Pian Qi et al: "Time-resolved hyperspectral single-pixel camera implementationfor compressive wide-field fluorescence lifetime imaging", Progress Inbiomedical Optics and Imaging, Spie - International Societyfor Optical Engineering, Bellingham, Wa, US, vol. 9701, Mar. 7, 2016 (Mar. 7, 2016), p. 970115-970115, XP060064436, ISSN: 1605-7422, DOI:10.1117/12.2217686 ISBN: 978-1-5106-0027-0.
R. Horisaki et al., Single-shot phase imaging with a coded aperture, OPTICSLETTERS, vol. 39, No. 22, Nov. 15, 2014.
Rajwa, Bartek et al., Automated Classification of Bacterial Particles in Flow byMultiangle Scatter Measurement and Support Vector Machine Classifier, CytometryPart A, vol. 73A, Issue 4, International Society for Analytical Cytology [online],2007. 12. 28 [retrieved on 2018.6.20], Retrieved from the Internet :< url: https://onlinelibrary.wiley.com/doi/abs/10.1002/cyto.a.20515,</url: DOI:10.1002/cyto.a.20515, pp. 369-379.
Rota et al., "The Role of Machine Learning in Medical Data Analysis. A Case Study: Flow Cytometry", 2016, Proceedings of the 11th Joint Conference on Computer Vision, Imaging and Computer Graphics Theory and Applications (VISIGRAPP 2016), vol. 3, pp305-312 (Year: 2016).
Sadao Ota et al.: "Ghost cytometry", Science (New York, N.Y.), Jun. 15, 2018 (Jun. 15, 2018), pages1246-1251, XP055609224, United StatesDOI: 10.1126/science.aan0096Retrieved from the Internet: URL: https://science.sciencemag.org/content /360/6394/1246.full.pdf.
Shalem, O. et al., Genome-scale CRISPR-Cas9 knockout screening in human cells. Science, Jan. 3, 2014; 343(6166): 84-87.
Sosik et al., "Automated taxonomic classification of phytoplankton sampled with imaging-in-flow cytometry", 2007, Limnology and Oceanography: Methods, vol. 5, pp. 204-216 (Year: 2007).
Tsujioka et al., "Three-dimensional shape measurement system using optical spatial modulator and zoom camera", 2003, Fifth International Symposium on Instrumentation and Control Technology, vol. 5253, pp. 504-507 (Year: 2003).
Van Meir, E. G. et al., 'Single cell monitoring of growth arrest andmorphological changes induced by transfer of wild-type p53 alleles toglioblastoma cells', Proc. Natl. Acad. Sci. USA, 1995, vol. 92, pp. 1008-1012abstract; pp. 1008-1010; figures 1, 3-4.
Wang, xianwen: Research on Automatic Identification Algorithm of Cell Groups in Flow cytometry Data Based on Skew T-Hybrid Model, China Doctoral Dissertation Full text Database Information Technology Edition, vol. Year 2015, No. 11, Nov. 15, 2015, pp. 1138-16.
Wu, J. et al., 'Expression of an exogenous eukaryotic DNA methyltransferasegene induces transformation of Nih 3T3 cells', Proc. Natl. Acad. Sci. USA, 1993, vol. 90, pp. 8891-8895abstract; pp. 8891-8893; figures 1-2.
Wu, Jiani: Analysis of High Dimentional Mass Cytometry Data Based on Support Vector Machine and Its Application in the Early Diagnosis of Acute Myelocytic Leukemia. Chinese Excellent Master's Thesis Full Text Database, Medical and Health Technology Edition, 2017, No. 1, Jan. 15, 2017, pp. E072-67.
Zhou et al., Focusing on moving targets through scattering samples, 2014, Optica, vol. 1(4); pp. 227-232.
Ziji Liu, Lei Tian, Sijia Liu, Laura Waller, "Real-time brightfield, darkfield, and phasecontrast imaging in a light-emitting diode array microscope", Journal of BiomedicalOptics, SPIE, the international society for optics and photonic, 19(10), p. 106002,Oct. 1, 2014.
Adjouadi, Malek et al. Multidimensional Pattern Recognition and Classification of White Blood Cells Using Support Vector Machines. Particle & Particle Systems Characterization 22(2):107-118 (2005).
Baroud, Charles N., et al. Dynamics of microfluidic droplets. Lab on a Chip, vol. 10, 2032- 2045 (2010).
Bruggner, Robert V et al. Automated Identification of Stratifying Signatures in Cellular Subpopulations. Proceedings of the National Academy of Sciences 111(26):E2770-E2777 (2014).
CN201680011390.X Office Action dated Apr. 9, 2020, and an English translation.
CN201680011390.X Office Action dated Nov. 29, 2019, and an English translation.
CN201680062987.7 Office Action with Search Report dated Dec. 30, 2019, and a Partial English translation.
CN201680062987.7 Office Action with Search Report dated Mar. 11, 2021, and a Partial English translation.
CN201680062987.7 Office Action with Search Report dated Sep. 10, 2020, and a Partial English translation.
CN201780062816.9 Office Action dated Jul. 17, 2020.
CN201880012120.X Office Action dated Dec. 23, 2021.
CN201880021362.5 Chinese Office Action with Search Report dated Mar. 31, 2023.
CN201980053558.7 Office Action dated Aug. 23, 2022, and an English translation.
CN201980053558.7 Office Action with Search report dated Dec. 2, 2021, and a partial English translation.
EP17841464.5 Extended European Search Report dated Jan. 28, 2020.
EP18753550.5 Extended European Search Report dated Feb. 19, 2020.
EP18775495.7 Extended Search Report dated Dec. 18, 2020.
EP19873817.1 Extended European Search Report dated Jul. 15, 2022.
EP20907648.8 Partial Supplementary European Search Report dated Dec. 14, 2023.
EP21779172.2 European Supplementary Search Report dated Mar. 14, 2024.
Horisaki, Ryoichi, et al. Single-pixel compressive diffractive imaging. Applied Optics, vol. 56, No. 5, 1353-1357 (2017).
JP2017_502419 Office Action dated Aug. 21, 2018, and an English translation.
JP2017_502419 Office Action dated May 7, 2019, and an English translation.
JP2017_547891 Office Action dated Aug. 31, 2021, and an English translation.
JP2019-514527 Decision of Dismissal of Amendment dated Jul. 12, 2022.
JP2021_518859 Office Action dated Jun. 5, 2023, and an English translation.
JP2021_518859 Office Action dated Sep. 4, 2023, and an English translation.
JP2021_521403 Office Action dated May 7, 2024, and an English translation.
JP2021_521403 Office Action dated Sep. 4, 2023, and an English translation.
JP2021_567626 Office Action dated May 7, 2024, and an English translation.
JP2022-170844 Office Action dated Aug. 22, 2023.
JP2023_172195 Office Action dated Jun. 10, 2024, and an English translation.
Katkovnik, Vladimir, et al. Compressive sensing computational ghost imaging, 1-62 (2012). Retrieved from: https://pdfs.semanticscholar.org/4568/1fbc1143924f13c1800b8c1008be6c1241d8.pdf.
Mair, Florian et al. The End of Gating? An Introduction to Automated Analysis of High Dimensional Cytometry Data. European Journal of Immunology 46(1):34-43 (2016). Published Online Nov. 30, 2015.
Meehan, Stephen et al. AutoGate: Automating Analysis of Flow Cytometry Data. Immunologic Research 58(2-3):218-223 (2014).
PCT/JP2020/048503 International Preliminary Report on Patentability dated Jul. 7, 2022.

(56) References Cited

OTHER PUBLICATIONS

PCT/JP2020/048503 International Search Report dated Mar. 9, 2021.
PCT/JP2021/013478 International Preliminary Report on Patentability dated Oct. 13, 2022.
PCT/JP2021/013478 International Search Report dated Jun. 22, 2021.
PCT/JP2021/013564 International Search Report and Written Opinion dated Jun. 22, 2021.
PCT/US2019/056743 International Search Report and Written Opinion dated Feb. 7, 2020.
U.S. Appl. No. 15/771,180 Corrected Notice of Allowability dated Jul. 21, 2021.
U.S. Appl. No. 16/272,569 Notice of Allowance dated Aug. 12, 2020.
U.S. Appl. No. 16/272,569 Office Action dated Apr. 16, 2020.
U.S. Appl. No. 16/542,257 Notice of Allowance dated Aug. 30, 2022.
U.S. Appl. No. 16/542,257 Notice of Allowance dated Nov. 17, 2022.
U.S. Appl. No. 16/542,257 Office Action dated Nov. 16, 2021.
U.S. Appl. No. 16/584,535 Office Action dated Aug. 21, 2024.
U.S. Appl. No. 16/584,535 Office Action dated Dec. 4, 2023.
U.S. Appl. No. 16/584,535 Office Action dated Feb. 18, 2022.
U.S. Appl. No. 16/584,535 Office Action dated Jun. 14, 2023.
U.S. Appl. No. 16/584,535 Office Action dated Sep. 12, 2022.
U.S. Appl. No. 16/663,182 Notice of Allowance dated Dec. 15, 2022.
U.S. Appl. No. 16/663,182 Notice of Allowance dated Jan. 11, 2023.
U.S. Appl. No. 16/663,182 Office Action dated Apr. 27, 2022.
U.S. Appl. No. 17/089,028 Notice of Allowance dated Apr. 19, 2022.
U.S. Appl. No. 17/089,028 Office Action dated Nov. 24, 2021.
U.S. Appl. No. 17/231,725 Office Action dated Aug. 27, 2024.
U.S. Appl. No. 17/231,725 Office Action dated Feb. 26, 2024.
U.S. Appl. No. 17/351,117 Corrected Notice of Allowability dated Nov. 28, 2022.
U.S. Appl. No. 17/351,117 Corrected Notice of Allowability dated Sep. 23, 2022.
U.S. Appl. No. 17/847,478 Office Action dated May 15, 2024.
U.S. Appl. No. 17/935,696 Office Action dated Jun. 6, 2024.
U.S. Appl. No. 17/935,707 Office Action dated Aug. 9, 2024.
U.S. Appl. No. 18/056,432 Notice of Allowance dated Oct. 18, 2023.
U.S. Appl. No. 18/056,432 Office Action dated May 9, 2023.
U.S. Appl. No. 18/511,920 Notice of Allowance dated Oct. 18, 2024.
U.S. Appl. No. 18/511,920 Office Action dated Jul. 5, 2024.
U.S. Appl. No. 18/512,356 Office Action dated May 28, 2024.
Voigt, Andrew P. et al. Consistent Quantitative Gene Product Expression:# 1. Automated Identification of Regenerating Bone Marrow Cell Populations Using Support Vector Machines. Cytometry Part A 89(11):978-986 (2016).
JP2023-172195 Notice of Allowance dated Dec. 16, 2024, and an English translation.
Van Der Pol, Edwin., et al. Absolute sizing and label-free identification of extracellular vesicles by flow cytometry. Nanomedicine 14(3):801-810 (2018).

* cited by examiner

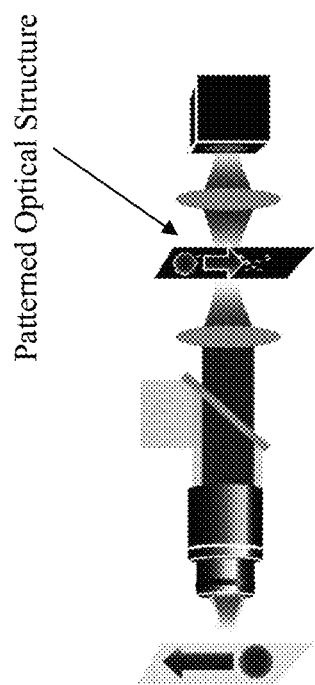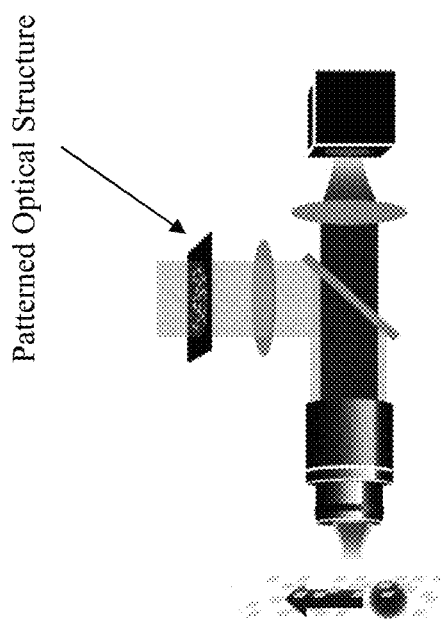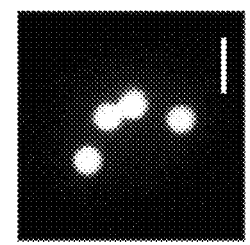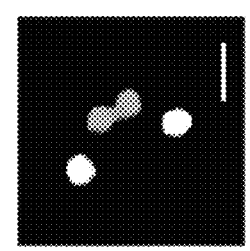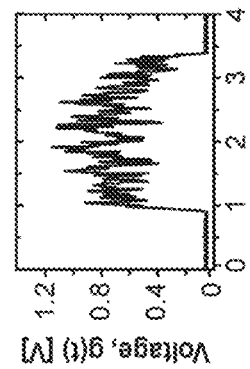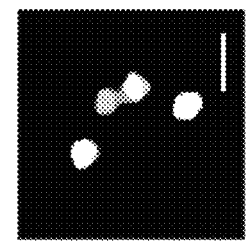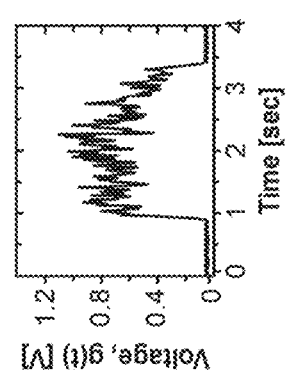
FIG. 2A
FIG. 2B
FIG. 2C
FIG. 2D
FIG. 2E
FIG. 2F
FIG. 2G

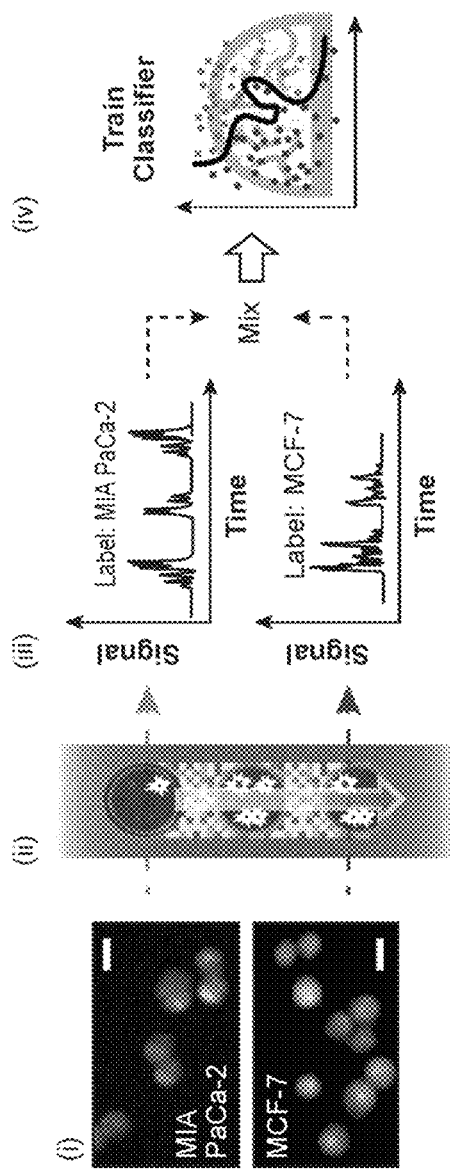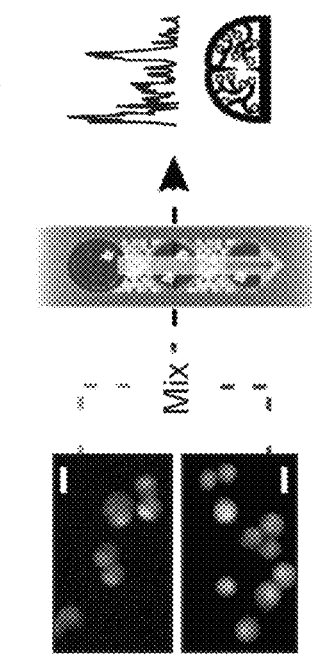
FIG. 4A
FIG. 4B

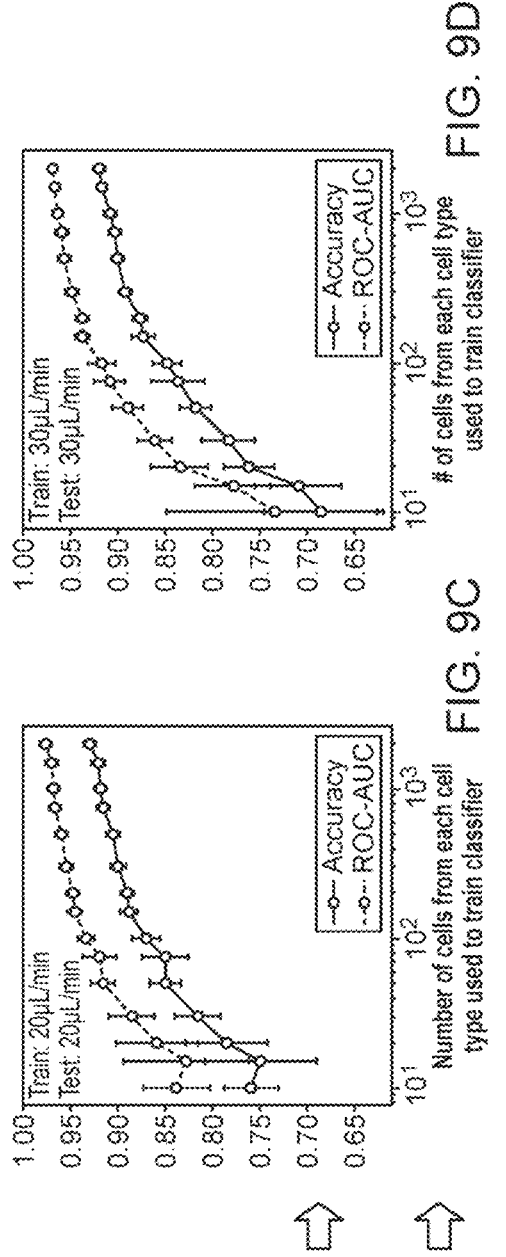
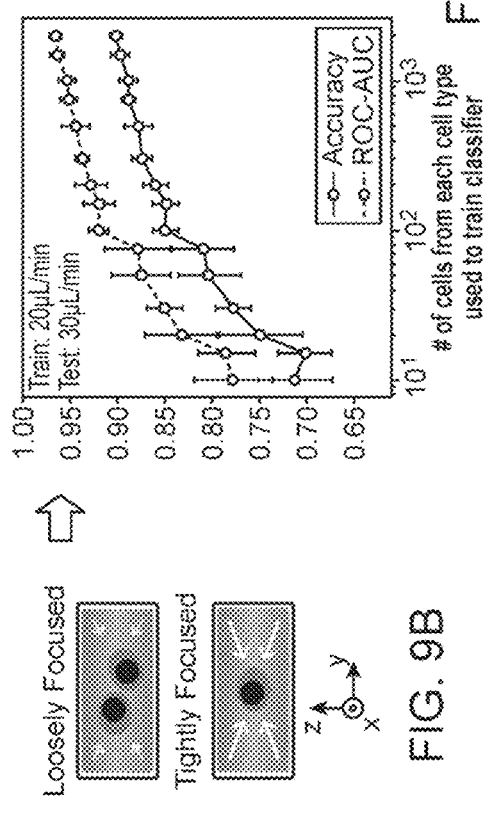
FIG. 9A  FIG. 9B  FIG. 9C  FIG. 9D  FIG. 9E  FIG. 9F

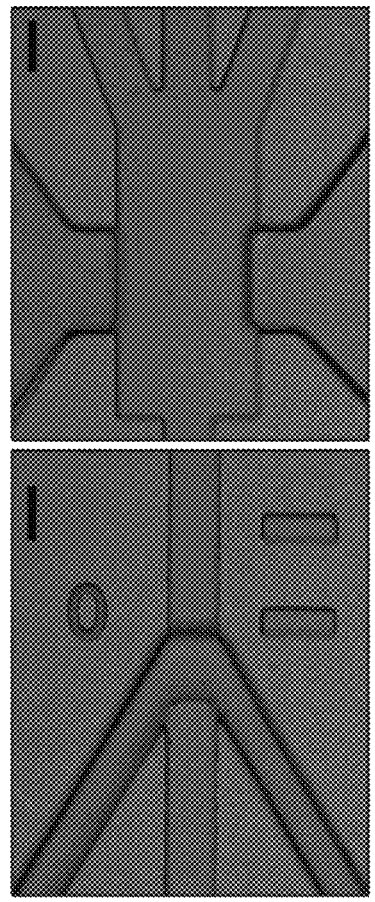
FIG. 12A
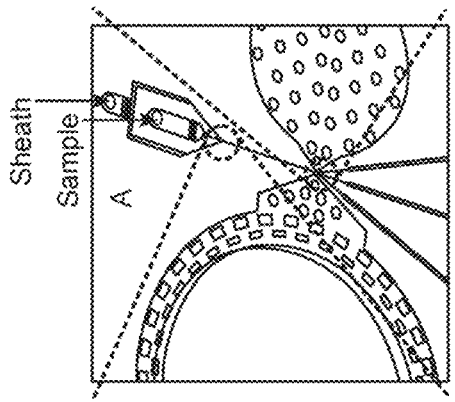
FIG. 12B
FIG. 12C
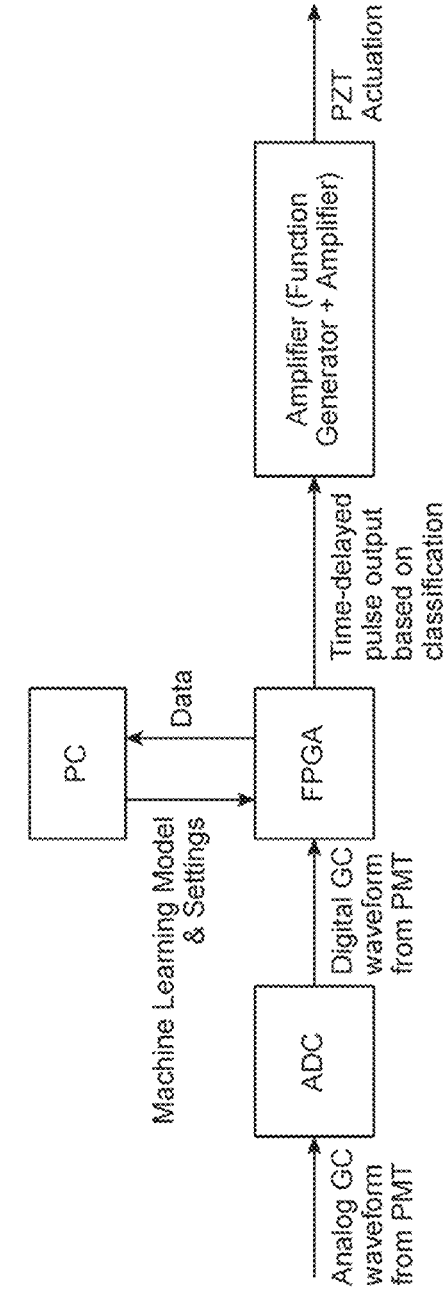
FIG. 12D

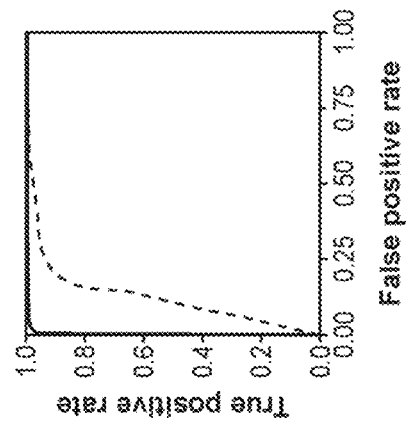
FIG. 17A
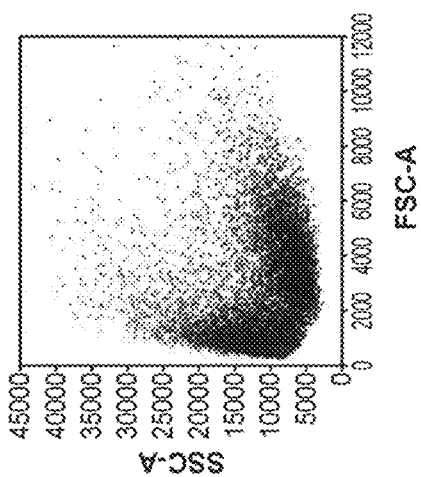
FIG. 17B
FIG. 17C
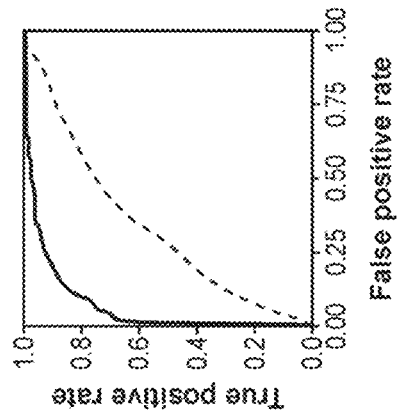
FIG. 17D
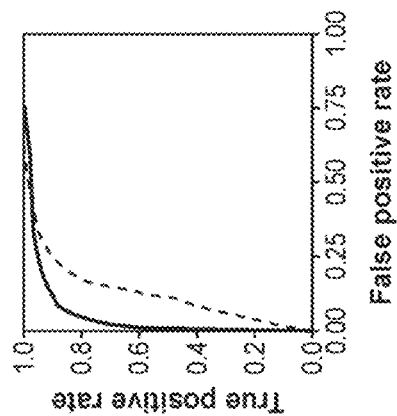
FIG. 17E
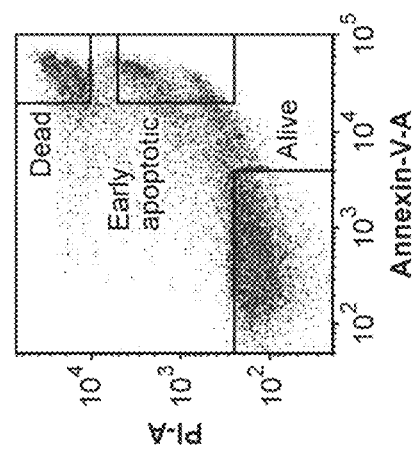

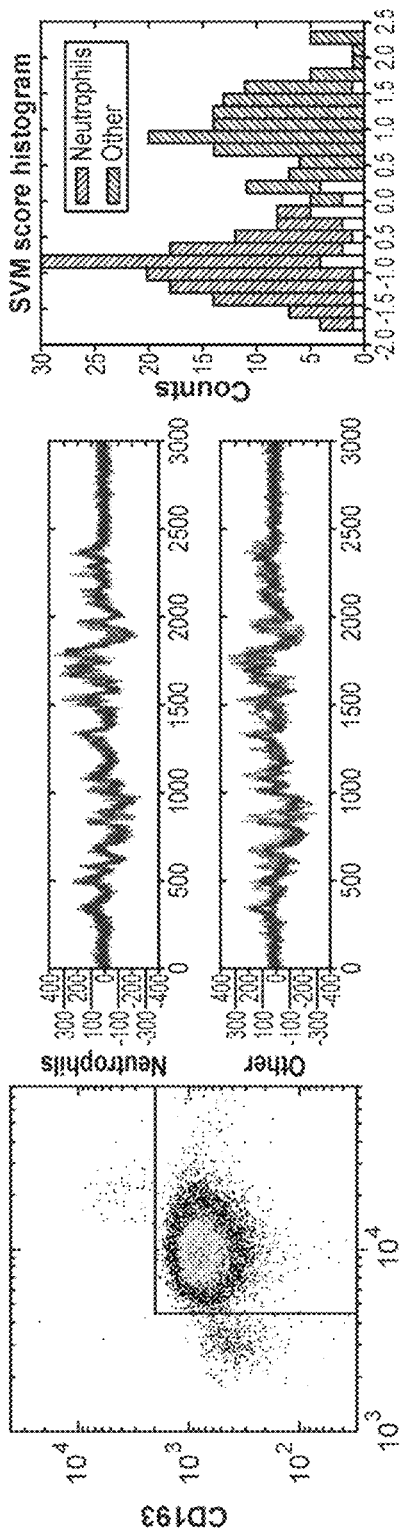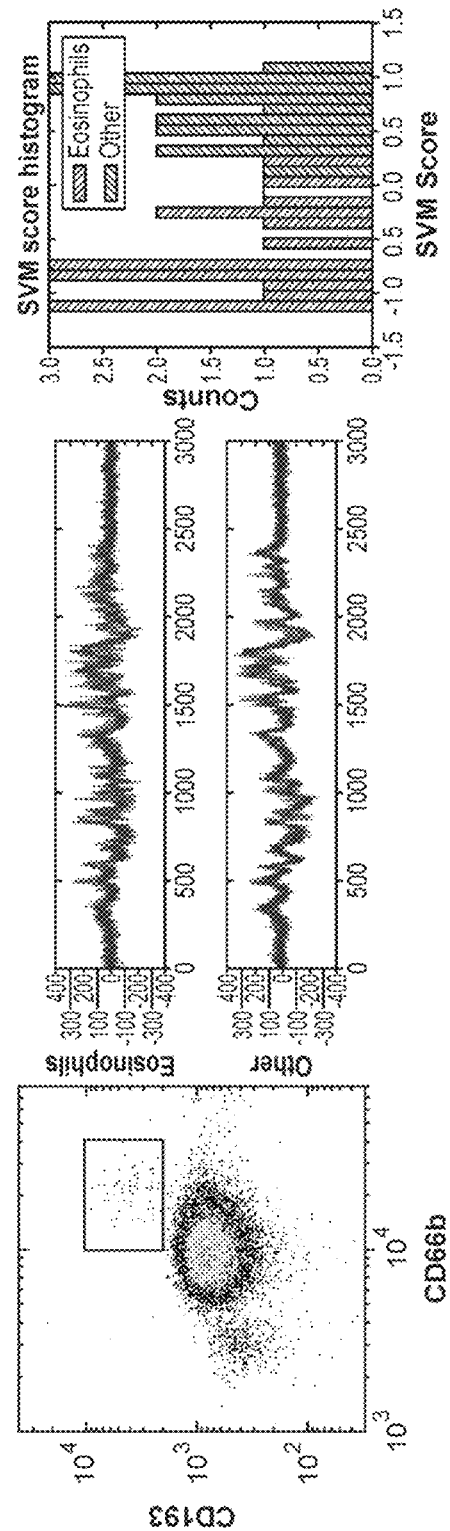
FIG. 20A  FIG. 20B  FIG. 20C
FIG. 20D  FIG. 20E  FIG. 20F

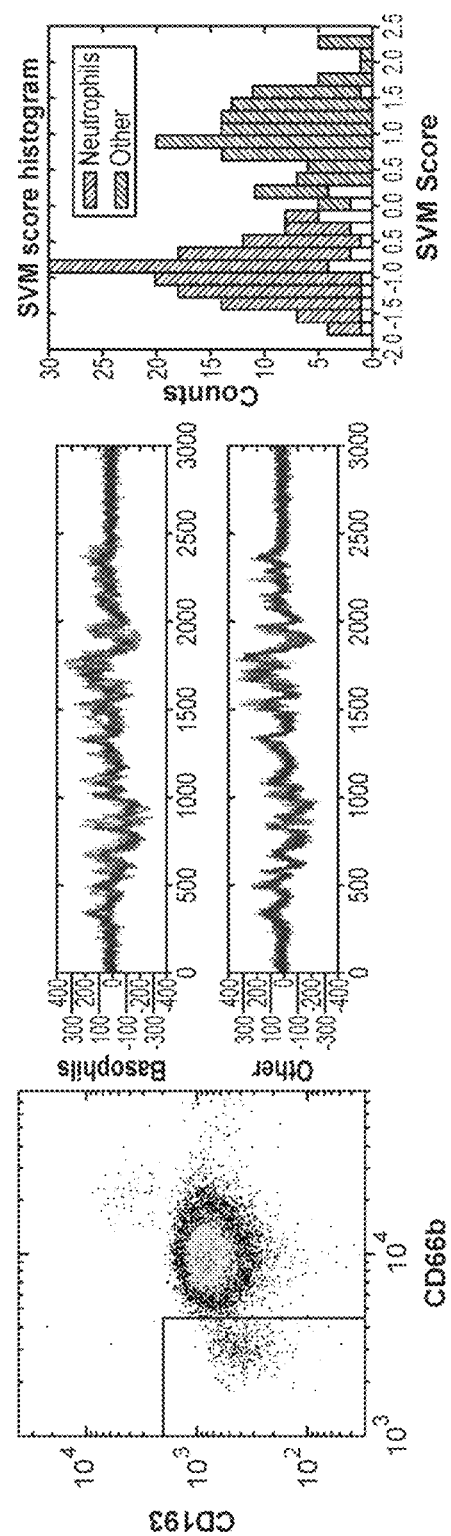

METHODS AND SYSTEMS FOR CYTOMETRY

CROSS-REFERENCE

The present application is a continuation of U.S. Non-Provisional Application No. 17/115,657, filed Dec. 8, 2020, which is a continuation of International Application No. PCT/US19/36849, filed Jun. 12, 2019, which claims the benefit of U.S. Provisional Patent Application No. 62/684,612, entitled "METHODS AND SYSTEMS FOR CYTOMETRY", filed Jun. 13, 2018, U.S. Provisional Patent Application No. 62/701,395, entitled "METHODS AND SYSTEMS FOR CYTOMETRY", filed Jul. 20, 2018, U.S. Provisional Patent Application No. 62/804,560, entitled "METHODS AND SYSTEMS FOR CYTOMETRY", filed Feb. 12, 2019, and U.S. Provisional Patent Application No. 62/848,478, entitled "METHODS AND SYSTEMS FOR CYTOMETRY", filed May 15, 2019, each of which is incorporated herein by reference in its entirety for all purposes.

BACKGROUND

Flow cytometry is a technique that may be employed for use in cell counting, cell sorting, biomarker detection and protein engineering. Flow cytometry may be performed by suspending cells in a stream of fluid and passing the cells through an electronic detection apparatus. A flow cytometer may allow simultaneous multi-parameter analysis of physical and chemical characteristics of particles.

SUMMARY

The present disclosure provides methods and systems for morphology-based cell classification and sorting using a process referred to as ghost cytometry (GC). Methods and systems of the present disclosure may be used to achieve morphology-based cell classification and sorting at high accuracy and throughput without obtaining images.

In an aspect, the present disclosure provides a method for particle processing or analysis, comprising (a) obtaining spatial information during motion of particles relative to a patterned optical structure, (b) compressively converting the spatial information into signals that arrive sequentially at a detector, (c) using the signals to identify at least a subset of the particles at any accuracy of at least 70%, and (d) sorting the at least subset of the particles identified in (c) into one or more groups at a rate of at least 10 particles per second. In some embodiments, (a) comprises: (i) directing light from a light source through the randomly or pseudo-randomly patterned optical structure, (ii) directing light from the patterned optical structure to the particles, and (iii) directing light from the particles to the detector. In some embodiments, (a) comprises: (i) directing light from a light source to the particles, (ii) directing light from the particles through the patterned optical structure, and (iii) directing light from the patterned optical structure to the detector. In some embodiments, the light comprises ultraviolet or visible light. In some embodiments, (b) comprises applying a two-step iterative shrinkage/thresholding (TwIST) procedure. In some embodiments, (c) comprises computationally reconstructing morphologies of the particles at least in part through combinatorial use of temporal waveforms comprising one or more intensity distributions imparted by the patterned optical structure. In some embodiments, the particles comprise one or more biological particles. In some embodiments, the particles comprise one or more cells. In some embodiments, the particles comprise one or more rare cells. In some embodiments, the particles comprise one or more cancer cells. In some embodiments, the particles comprise one or more circulating tumor cells. In some embodiments, (c) comprises applying one or more machine learning classifiers on compressed waveforms corresponding to the signals to identify the at least subset of particles. In some embodiments, the one or more machine learning classifiers are selected from the group consisting of: support vector machines, random forest, artificial neural networks, convolutional neural networks, deep learning, ultra-deep learning, gradient boosting, AdaBoosting, decision trees, linear regression, and logistic regression. In some embodiments, the particles are analyzed without image reconstruction. In some embodiments, the detector comprises a single pixel detector. In some embodiments, the single pixel detector comprises a photomultiplier tube. In some embodiments, the method further comprises reconstructing one or more images of the particles. In some embodiments, the one or more images comprise fluorescence images. In some embodiments, the method further comprises reconstructing a plurality of images of the particles, each image of the plurality comprising a different wavelength or a range of wavelengths. In some embodiments, the one or more images are free of blur artifacts. In some embodiments, the particles move at a rate of at least 1 m/s relative to the patterned optical structure. In some embodiments, the method further comprises sorting the particles into one or more groups of sorted particles based on morphologies of the particles. In some embodiments, the rate is at least 100 particles per second. In some embodiments, the rate is at least 1,000 particles per second. In some embodiments, (d) comprises collecting one or more of the groups to generate an enriched particle mixture. In some embodiments, the one or more groups have a purity of at least 70%. In some embodiments, the method further comprises subjecting one or more particles of the one or more groups to one or more assays. In some embodiments, the one or more assays are selected from the group consisting of: lysis, nucleic acid extraction, nucleic acid amplification, nucleic acid sequencing, and protein sequencing. In some embodiments, the method comprises, prior to (a), subjecting the particles to hydrodynamic flow focusing. In some embodiments, the method comprises collecting a partial transmissive speckle pattern of the particles as the particles move relative to the patterned optical structure. In some embodiments, the patterned optical structure comprises an ordered patterned optical structure. In some embodiments, the patterned optical structure comprises a disordered patterned optical structure. In some embodiments, the disordered optical structure comprises an aperiodic patterned optical structure. In some embodiments, the disordered optical structure comprises a randomly or pseudo-randomly patterned optical structure. In some embodiments, the optical structure comprises a static optical structure.

In another aspect, the present disclosure provides an image-free method for classifying or sorting particles based at least in part on morphologies of the particles without use of non-native labels at an accuracy of at least 70%. In some embodiments, the particles comprise one or more biological particles. In some embodiments, the particles comprise one or more cells. In some embodiments, the particles comprise one or more rare cells. In some embodiments, the particles comprise one or more cancer cells. In some embodiments, the particles comprise one or more circulating tumor cells.

In another aspect, the present disclosure provides a system for particle processing or analysis, comprising: a fluid flow path configured to direct particles; a detector in sensing communication with at least a portion of the fluid flow path; and one or more computer processors operatively coupled to the detector, wherein the one or more computer processors are individually or collectively programmed to (a) obtain spatial information during motion of particles relative to a randomly of pseudo-randomly patterned optical structure, (b) compressively convert the spatial information into signals that arrive sequentially at the detector, (c) use the signals to identify at least a subset of the particles at any accuracy of at least 70%, and (d) sort the at least subset of particles identified in (c) into one or more groups at a rate of at least 10 particles per second. In some embodiments, the detector is a single pixel detector.

In another aspect, the present disclosure provides a non-transitory computer-readable medium comprising machine-executable code that, upon execution by one or more computer processors, implements a method for particle analysis, the method comprising (a) obtaining spatial information during motion of particles relative to a randomly patterned optical structure, (b) compressively converting the spatial information into signals that arrive sequentially at a single pixel detector, (c) using the signals to identify at least a subset of the particles at an accuracy of at least 70%, and (d) sorting the at least subset of particles identified in (c) into one or more groups at a rate of at least 10 particles per second.

In another aspect, the present disclosure provides a method for cell processing or analysis, comprising (a) obtaining spatial information during motion of cells relative to a patterned optical structure, (b) compressively converting the spatial information into signals that arrive sequentially at a detector, (c) using the signals to identify at least a subset of the cells as being cancerous, and (d) sorting the at least the subset of the cells identified in (c) into one or more groups of cancerous cells and one or more groups of non-cancerous cells.

In another aspect, the present disclosure provides a method for cell processing or analysis, comprising (a) obtaining spatial information during motion of cells relative to a patterned optical structure, (b) compressively converting the spatial information into signals that arrive sequentially at a detector, (c) using the signals to identify at least a subset of the cells as being therapeutic, and (d) sorting the at least the subset of the cells identified in (c) into one or more groups of therapeutic cells and one or more groups of non-therapeutic cells.

In another aspect, the present disclosure provides a method for identifying one or more target cells from a plurality of cells, comprising (a) obtaining spatial information during motion of the plurality of cells relative to a patterned optical structure, and (b) inputting the spatial information to a trained machine learning algorithm to identify the one or more target cells from the plurality of cells.

In another aspect, the present disclosure provides a method for cell processing, comprising (a) obtaining spatial information of a plurality of cells, and (b) using at least the spatial information to separate or isolate a subset of the plurality of cells from the plurality of cells at a rate of at least 1,000 cells per second.

In another aspect, the present disclosure provides a method for processing one or more target cells from a plurality of cells, comprising: (a) obtaining spatial information during motion of the plurality of cells relative to a patterned optical structure; (b) using the spatial information to identify the one or more target cells from the plurality of cells; and (c) based at least in part on the one or more target cells identified in (b), separating or isolating the one or more target cells from the plurality of cells at a rate of at least 10 cells per second. In some embodiments, (a) comprises: (i) directing light from a light source through the patterned optical structure, (ii) directing light from the patterned optical structure to the plurality of cells, and (iii) directing light from the plurality of cells to the detector. In some embodiments, (a) comprises: (i) directing light from a light source to the plurality of cells, (ii) directing light from the plurality of cells through the patterned optical structure, and (iii) directing light from the patterned optical structure to the detector. In some embodiments, the patterned optical structure comprises a disordered patterned optical structure. In some embodiments, (c) comprises computationally reconstructing morphologies of the cells at least in part through combinatorial use of one or more temporal waveforms comprising one or more intensity distributions imparted by the patterned optical structure. In some embodiments, the target cells comprise one or more cancer cells or circulating tumor cells. In some embodiments, the target cells comprise one or more therapeutic cells. In some embodiments, the target cells comprise one or more members selected from the group consisting of: stem cells, mesenchymal stem cells, induced pluripotent stem cells, embryonic stem cells, cells differentiated from induced pluripotent stem cells, cells differentiated from embryonic stem cells, genetically engineered cells, blood cells, red blood cells, white blood cells, T cells, B cells, natural killer cells, chimeric antigen receptor T cells, chimeric antigen receptor natural killer cells, cancer cells, and blast cells. In some embodiments, (b) comprises applying one or more machine learning classifiers on compressed waveforms corresponding to the spatial information to identify the one or more target cells. In some embodiments, the one or more machine learning classifiers attain one or more of a sensitivity, a specificity, and an accuracy of at least 70%. In some embodiments, the one or more machine learning classifiers are selected from the group consisting of: support vector machines, random forest, artificial neural networks, convolutional neural networks, deep learning, ultra-deep learning, gradient boosting, AdaBoosting, decision trees, linear regression, and logistic regression. In some embodiments, the plurality of cells are processed without image reconstruction. In some embodiments, the detector comprises a single pixel detector. In some embodiments, the single pixel detector comprises a photomultiplier tube. In some embodiments, the method further comprises reconstructing one or more images of the plurality of cells. In some embodiments, the method further comprises reconstructing a plurality of images of the plurality of cells, each image of the plurality comprising a different wavelength or a range of wavelengths. In some embodiments, the one or more images are free of blur artifacts. In some embodiments, the plurality of cells move at a rate of at least 1 m/s relative to the patterned optical structure. In some embodiments, (c) comprises: (i) sorting the plurality of cells into one or more groups of sorted cells based on results of analyzing the plurality of cells; and (ii) collecting the one or more target cells from the one or more groups of sorted cells. In some embodiments, (c) comprises sorting the plurality of cells into one or more groups of sorted cells based on morphologies of the plurality of cells. In some embodiments, the sorting is achieved at a rate of at least 10 cells per second. In some embodiments, the method further comprises collecting one or more of the groups of sorted cells to generate an enriched cell mixture. In some embodiments, the one or more groups of sorted cells have a purity of at least 70%. In some embodiments, the method further comprises subjecting one or more cells of the one or more groups of sorted cells to one or more assays. In some embodiments, the one or more assays are selected from the group consisting of: lysis, nucleic acid extraction, nucleic acid amplification, nucleic acid sequencing, and protein sequencing. In some embodiments, the method further comprises, prior to (a), subjecting the cells to hydrodynamic flow focusing. In some embodiments, the method further comprises collecting a partial transmissive speckle pattern of the plurality of cells as the plurality of cells move relative to the patterned optical structure. In some embodiments, the spatial information corresponds with characteristics, properties, or information pertaining to the plurality of cells. In some embodiments, the spatial information corresponds one-to-one with the characteristics, properties, or information pertaining to the plurality of cells. In some embodiments, the characteristics, properties, or information pertaining to the plurality of cells comprise one or more members selected from the group consisting of: metabolic states, proliferation states, differentiation states, maturity states, expression of marker proteins, expression of marker genes, morphology of cells, morphology of organelles, positioning of organelles, size or extent of organelles, morphology of cytoplasm, positioning of cytoplasm, size or extent of cytoplasm, morphology of nucleus, positioning of nucleus, size or extent of nucleus, morphology of mitochondria, positioning of mitochondria, size or extent of mitochondria, morphology of lysosome, positioning of lysozyme, size or extent of lysozyme, distribution of molecules inside cells, distribution of peptides, polypeptides, or proteins inside cells, distribution of nucleic acids inside cells, distribution of glycans or polysaccharides inside cells, and distribution of lipids inside cells.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 2A shows an example of an optical setup for motion-based compressive fluorescence imaging comprising a structured illumination (SI) element.

FIG. 2B shows an example of an optical setup for motion-based compressive fluorescence imaging comprising a structured detection (SD) element.

FIG. 2C shows an example of a temporal waveform associated with moving fluorescent beads that has been acquired using an optical system comprising an SI element.

FIG. 2D shows an example of a two-dimensional (2D) fluorescence image of the moving fluorescent beads that has been computationally reconstructed from the temporal waveform acquired by the optical system comprising the SI element.

FIG. 2E shows an example of a temporal waveform associated with moving fluorescent beads that has been acquired using an optical system comprising an SD element.

FIG. 2F shows an example of a 2D fluorescence image of the moving fluorescent beads that has been computationally reconstructed from the temporal waveform acquired by the optical system comprising the SD element.

FIG. 2G shows an example of a fluorescence image of the moving fluorescent beads obtained using an arrayed pixel camera.

FIG. 4A illustrates a procedure for training a classifier model to be applied to GC signals.

FIG. 4B shows an example of a procedure for testing the classifier model.

FIG. 9A shows an example of a geometry of an example of a flow cell for hydrodynamic three-dimensional (3D) focusing of a fluid for use with the systems and methods described herein.

FIG. 9B shows examples of loosely and tightly focused flow.

FIG. 9C shows an example of the accuracy of a machine learning classifier for classifying cells using GC signals obtained under a 20 µL/min flow rate when the classifier is trained using GC signals obtained under a 20 µL/min flow rate.

FIG. 9D shows an example of the accuracy of a machine learning classifier for classifying cells using GC signals obtained under a 30 µL/min flow rate when the classifier is trained using GC signals obtained under a 30 µL/min flow rate.

FIG. 9E shows an example of the accuracy of a machine learning classifier for classifying cells using GC signals obtained under a 30 µL/min flow rate when the classifier is trained using GC signals obtained under a 20 µL/min flow rate.

FIG. 9F shows an example of the accuracy of a machine learning classifier for classifying cells using GC signals obtained under a 20 µL/min flow rate when the classifier is trained using GC signals obtained under a 20 µL/min flow rate and a 30 µL/min flow rate.

FIG. 12A shows an example of a cell sorting chip comprising a flow focusing segment and a cell sorting segment fabricated using soft lithography techniques.

FIG. 12B shows an example of microscopic image of the flow focusing segment.

FIG. 12C shows an example of microscopic image of the cell sorting segment.

FIG. 12D shows an example of process flow for real-time classification and electric control systems for use with systems and methods of the present disclosure.

FIG. 17A shows an example of a scatter plot of fluorescence intensities of propidium iodide (PI) and Annexin V for classification of induced pluripotent stem cells (iPSCs) as living, early apoptotic, or dead.

FIG. 17B shows an example of a scatter plot of forward scattering (F SC) and side scattering (SSC) for the IPSCs.

FIG. 17C shows an example of a receiver operating characteristic (ROC) curve and SVM score histogram for the classification of living and dead cells.

FIG. 17D shows an example of an ROC curve and SVM score histogram for the classification of living and early apoptotic cells.

FIG. 17E shows an example of an ROC curve and SVM score histogram for the classification of dead and early apoptotic cells.

FIG. 20A shows a training dataset comprising a population of neutrophils.

FIG. 20B shows examples of label-free optical signals corresponding to neutrophils and to non-neutrophils.

FIG. 20C shows an example of an SVM score histogram for the classification of neutrophils and non-neutrophils.

FIG. 20D shows a training dataset comprising a population of eosinophils.

FIG. 20E shows examples of label-free optical signals corresponding to eosinophils and to non-eosinophils.

FIG. 20F shows an example of an SVM score histogram for the classification of eosinophils and non-eosinophils.

FIG. 20G shows a training dataset comprising a population of basophils.

FIG. 20H shows examples of label-free optical signals corresponding to basophils and to non-basophils.

FIG. 20I shows an example of an SVM score histogram for the classification of basophils and non-basophils.

DETAILED DESCRIPTION

Figure 1A:
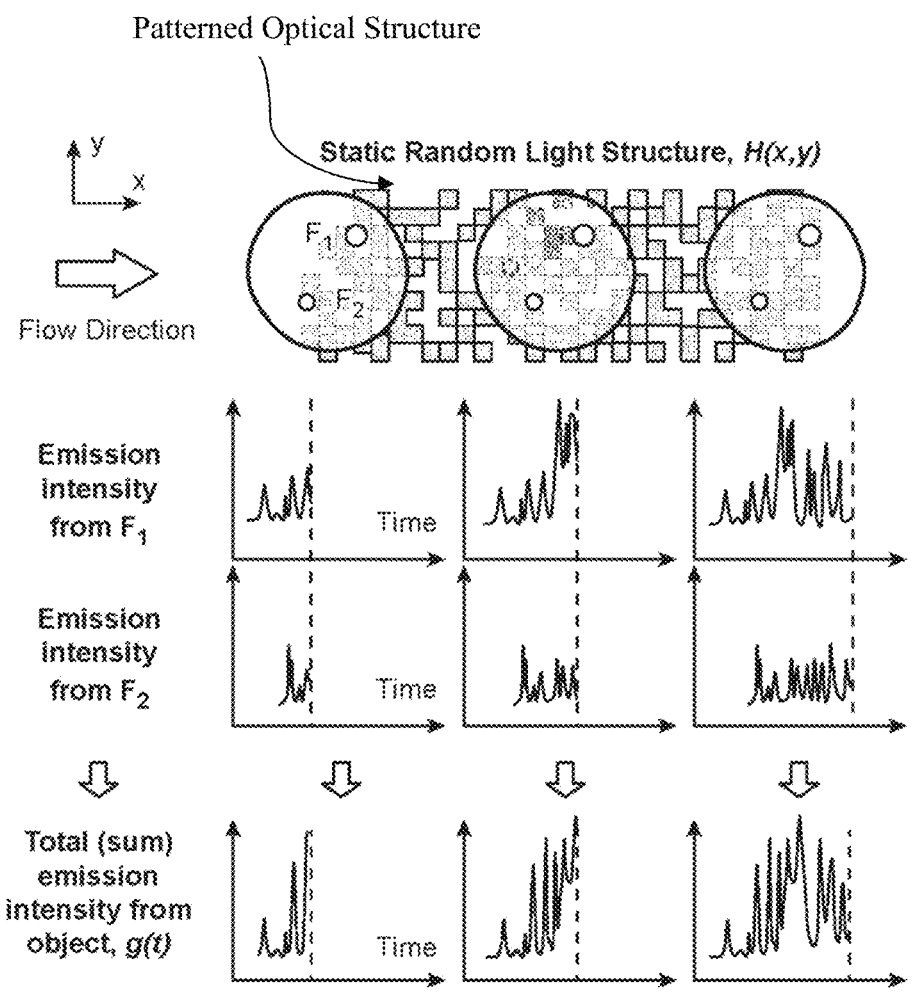
FIG. 1A shows a schematic of an optical compressive sensing process to be used in a ghost cytometry (GC) process.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than," "less than or equal to," or "at most" applies to each of the numerical values in that series of numerical values. For example, less than or equal to 3, 2, or 1 is equivalent to less than or equal to 3, less than or equal to 2, or less than or equal to 1.

As used herein, the term "optical spatial information" generally refers to information derived from an optical sensing process that pertains to a spatial arrangement of parts or components of an object. For instance, "optical spatial information" may refer to the spatial arrangement or organization of cellular components (such as organelles, membranes, or cytoplasm) within a cell, to the spatial arrangement or organization of cells within tissue, to the spatial arrangement or organization of microstructures within materials, and the like.

As used herein, the terms "compressive sensing," "compressed sensing," "compressive sampling," "compressed sampling,", "sparse sensing," and "sparse sampling" generally refer to signal processing techniques for efficiently acquiring and reconstructing signals containing optical spatial information by recovering the optical spatial information from fewer samples of the signal than would otherwise be required by the Nyquist-Shannon sampling theorem. Compressive sampling may exploit sparsity in the optical spatial information in some domain, such as the time domain, the temporal frequency domain, the spatial domain, the spatial frequency domain, the wavelet transform domain, the discrete cosine transform domain, or the discrete sine transform domain.

As used herein, the term "random" generally refers to a process that lacks a pattern or predictability, or a product of such a process. A random process may have no discernible order and/or may not follow a readily intelligible pattern. A random process may comprise a sequence of events whose outcomes do not follow a deterministic pattern. A random process may comprise a sequence of events whose outcomes follow a probabilistic or stochastic pattern.

As used herein, the term "pseudo-random" generally refers to a deterministic or partially deterministic process that produces a product that is nearly random, or a product of such a process.

The present disclosure provides methods and systems for biological analysis. Such methods and systems may be used to analyze particles, such as cells, or biological materials, such as proteins or nucleic acids.

The particles analyzed and/or processed using the methods described herein may be biological particles, such as cells. Cells may be of any type and have any characteristics. Cells may have any size and volume. Cells may be derived from any possible source. For instance, cells may be human cells, animal cells, non-human primate cells, equine cells, porcine cells, canine cells, feline cells, murine cells, plant cells, bacterial cells, or other cells. Cells may derive from tissue or an organ. For instance, cells may be derived from a heart, artery, vein, brain, nerve, lung, spine, spinal cord, bone, connective tissue, trachea, esophagus, stomach, small or large intestine, bladder, liver, kidney, spleen, urethra, ureter, prostate, vas deferens, penis, ovary, uterus, endometrium, fallopian tube, or vagina, or any tissue associated with any of the preceding. The cells may be or may be suspected of being cancerous (e.g., tumor cells). For example, cells may derive from tumor tissue. Cells may include natural or non-natural components. For example, cells may include nucleic acids, such as deoxyribonucleic acid (DNA) or ribonucleic acid (RNA), proteins, or carbohydrates. Cells may include one or more optically detectable elements such as one or more fluorophores. The fluorophores may be native or non-native to the cell. For instance, the fluorophores may be non-native fluorophores that have been introduced to the cell, such as by one or more cell staining or labeling techniques.

In some cases, a plurality of particles may be analyzed using the methods described herein. The particles of the plurality of particles may derive from the same source or from different sources. The particles may have the same or different characteristics. For example, a first particle may have a first size and a second particle may have a second size, where the first size and the second size are not the same. The methods and systems described herein may be used to characterize and/or identify the plurality of particles. For example, the methods and systems may characterize the first particle and the second particle and provide information about the size and morphology of the particles, thereby identifying the first particle as being different from the second particle.

Imaging and analyzing many single cells holds the potential to substantially increase understanding of heterogeneous systems involved in immunology (1), cancer (2), neuroscience (3), hematology (4), and development (5). Many key applications in these fields require accurate and high throughput isolation of specific populations of the cells according to information contained in the high content images. This raises several challenges. First, despite recent developments (6-10), simultaneously meeting the needs of high sensitivity, polychromaticity, high shutter speed, high frame rates, continuous acquisition, and low cost remains difficult. Second, ultrafast and continuous image acquisition subsequently requires computational image reconstruction and analysis that is costly in terms of both time and money (11). Due to such challenges, fluorescence imaging-activated cell sorting (FiCS) has not been realized prior to the methods and systems disclosed herein. Disclosed herein are methods and systems that may apply machine learning methods to compressed imaging signals measured using a single pixel detector to enable ultrafast, sensitive, and accurate morphology-based cell analysis. The methods and systems may be image-free (not requiring image production), though the methods and systems may incorporate image production if desired. The methods and systems may be further configured to sort particles in real time. Such methods and systems may be referred to as "ghost cytometry" (GC).

FIG. 1A shows a schematic of an example of an optical compressive sensing process to be used in a GC process. A relative motion of an object across a patterned optical structure may be employed to compressively map the object's spatial information into a train of temporal signals. The patterned optical structure may be defined by a matrix H(x, y) comprising values of an optical property (such as a transmissivity, absorptivity, reflectivity, or an indication thereof) at each region within the optical structure, As shown in FIG. 1A, $F_1$ and $F_2$ may depict representative features (such as fluorescent features) in the object. Based on the object's motion, the spatially-varying optical properties of H(x, y) may be encoded as temporal modulation of light intensities (such as fluorescence emission intensities) from the fluorophores $F_1$ and $F_2$ (denoted as "Emission intensity from $F_1$" and "Emission intensity from $F_2$", respectively, in FIG. 1A). Their sum g (t) may be recorded using a single pixel detector, as shown in the bottom part of FIG. 1A. In an imaging mode, the object's two-dimensional (2D) image may be computationally reconstructed by a combinatorial use of the multiplexed temporal waveform g(t) and the intensity distribution of the optical structure H(x, y). In an image-free mode, directly applying machine learning methods to the compressive temporal waveform may yield high-throughput, highly accurate, image-free morphology-based cell classification. The schematics depicted in FIG. 1A are not to scale.

In GC, as an object passes through the patterned optical structure, each arranged spot in the structure may sequentially different locations of the object. For instance, each arranged spot in the structure may sequentially excite fluorophores at different locations of the object. The encoded intensities from each location may be multiplexed and measured compressively and continuously as a single temporal waveform measured using a detector (for instance, a single pixel detector such as a photomultiplier tube (PMT)). Assuming the object is in constant unidirectional motion with velocity v, the signal acquisition may be mathematically described as:

$$g(t)=\iint H(x, y)I(x-vt, y)dxdy \quad (1)$$

where g(t) is the multiplexed temporal waveform, H(x, y) is the intensity distribution of the optical structure, and I(x, y) is the intensity distribution of the moving object. Note that H(x, y), acting as a spatial encoding operator, may be static, so that no scanning or sequential light projection may be needed in GC. A binary random pattern for the optical structure is described herein as a simple implementation. In the measurement process of GC, the object may be convolved with the optical structure along the x-direction, and the resultant signals may be integrated along the y-direction.

In the compressive sensing literature, randomized convolutions may be regarded as imaging modalities (12). Given equation (1) as a forward model, the image reconstruction process may amount to solving an inverse problem. A solution may be iteratively estimated by minimizing an objective function that may be computed by combinatorial use of the multiplexed temporal waveform g(t) and the intensity distribution of the optical structure H (x, y). For sparse events in a regularization domain, the moving object may be reasonably estimated from the measured signal g(t) by adopting a compressed-sensing algorithm such as two-step iterative shrinkage/thresholding (TwIST) (13). Such a reconstruction process may share its concept with ghost imaging, in which the original image is computationally recovered after sequentially projecting many random optical patterns onto the object and recording the resultant signals using a single pixel detector (14-19). Although ghost imaging has attracted significant attention in scientific community, the sequential projection of light patterns makes it slow and has hampered its practical use. Even when compressive sensing was employed to reduce the time required for the light projections, the method was still slower than conventional arrayed pixel cameras (18). In contrast, GC may not require any movement of equipment and the speed of image acquisition may increase with the object's motion. The speed of image acquisition in GC may be limited only by the bandwidth of single pixel detectors. Such bandwidths may be very high, such as at least about 1 megahertz (MHz), 10 MHz, 100 MHz, 1 gigahertz (GHz), or more. The use of motion in GC may thus transform slow ghost imaging into a practical, ultrafast, and continuous imaging procedure. For instance, GC may reach acquisition speeds at least ten thousand times faster than prior fluorescence ghost imaging methods.

In an aspect, the present disclosure provides a method for particle analysis. The method may comprise obtaining spatial information from motion of particles relative to a patterned optical structure. Next, the spatial information may be compressively converted into signals that arrive sequentially at a detector. The signals may then be used to analyze the particles.

Figure 1B:
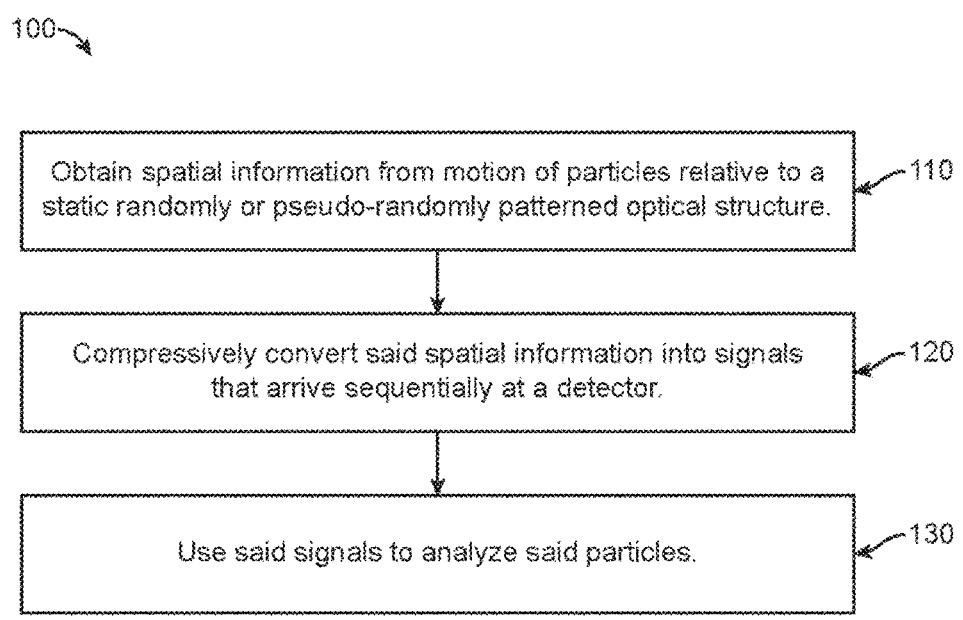
FIG. 1B shows a flowchart for an example of a method of particle analysis.

FIG. 1B shows a flowchart for a method 100 of particle analysis. In a first operation 110, the method 100 may comprise obtaining spatial information from motion of particles relative to a patterned optical structure. The spatial information may comprise optical spatial information, which may be spatial information obtained by optical sensing approaches. Alternatively or in combination, spatial information may comprise non-optical spatial information, which may be obtained by non-optical sensing approaches, such as impedance measurements.

The particles may comprise one or more biological particles. The particles may comprise one or more cells.

The particles may comprise one or more rare cells. A rare cell may be present (compared to other cells under analysis) at a concentration of at most about 1 in 10, 1 in 20, 1 in 30, 1 in 40, 1 in 50, 1 in 60, 1 in 70, 1 in 80, 1 in 90, 1 in 100, 1 in 200, 1 in 300, 1 in 400, 1 in 500, 1 in 600, 1 in 700, 1 in 800, 1 in 900, 1 in 1,000, 1 in 2,000, 1 in 3,000, 1 in 4,000, 1 in 5,000, 1 in 6,000, 1 in 7,000, 1 in 8,000, 1 in 9,000, 1 in 10,000, 1 in 20,000, 1 in 30,000, 1 in 40,000, 1 in 50,000, 1 in 60,000, 1 in 70,000, 1 in 80,000, 1 in 90,000, 1 in 100,000, 1 in 200,000, 1 in 300,000, 1 in 400,000, 1 in 500,000, 1 in 600,000, 1 in 700,000, 1 in 800,000, 1 in 900,000, 1 in 1,000,000, 1 in 2,000,000, 1 in 3,000,000, 1 in 4,000,000, 1 in 5,000,000, 1 in 6,000,000, 1 in 7,000,000, 1 in 8,000,000, 1 in 9,000,000, 1 in 10,000,000, 1 in 20,000, 000, 1 in 30,000,000, 1 in 40,000,000, 1 in 50,000,000, 1 in 60,000,000, 1 in 70,000,000, 1 in 80,000,000, 1 in 90,000,000, 1 in 100,000,000, 1 in 200,000,000, 1 in 300,000,000, 1 in 400,000,000, 1 in 500,000,000, 1 in 600,000,000, 1 in 700,000,000, 1 in 800,000,000, 1 in 900,000,000, 1 in 1,000,000,000, or more. A rare cell may be present at a concentration of at least about 1 in 1,000,000,000, 1 in 900,000,000, 1 in 800,000,000, 1 in 700,000,000, 1 in 600,000,000, 1 in 500,000,000, 1 in 400,000,000, 1 in 300,000,000, 1 in 200,000,000, 1 in 100,000,000, 1 in 90,000,000, 1 in 80,000,000, 1 in 70,000,000, 1 in 60,000,000, 1 in 50,000,000, 1 in 40,000,000, 1 in 30,000,000, 1 in 20,000,000, 1 in 10,000,000, 1 in 9,000,000, 1 in 8,000,000, 1 in 7,000,000, 1 in 6,000,000, 1 in 5,000,000, 1 in 4,000,000, 1 in 3,000,000, 1 in 2,000,000, 1 in 1,000,000, 1 in 900,000, 1 in 800,000, 1 in 700,000, 1 in 600,000, 1 in 500,000, 1 in 400,000, 1 in 300,000, 1 in 200,000, 1 in 100,000, 1 in 90,000, 1 in 80,000, 1 in 70,000, 1 in 60,000, 1 in 50,000, 1 in 40,000, 1 in 30,000, 1 in 20,000, 1 in 10,000, 1 in 9,000, 1 in 8,000, 1 in 7,000, 1 in 6,000, 1 in 5,000, 1 in 4,000, 1 in 3,000, 1 in 2,000, 1 in 1,000, 1 in 900, 1 in 800, 1 in 700, 1 in 600, 1 in 500, 1 in 400, 1 in 300, 1 in 200, 1 in 100, 1 in 90, 1 in 80, 1 in 70, 1 in 60, 1 in 50, 1 in 40, 1 in 30, 1 in 20, 1 in 10, or more. A rare cell may be present in a concentration that is within a range defined by any two of the preceding values.

The particles may comprise one or more cancer cells. The particles may comprise one or more circulating tumor cells. The particles may comprise any cells described herein. The cells may be derived from any source described herein. The cells may comprise any natural or non-natural components described herein.

The patterned optical structure may comprise a plurality of regions. For instance, the patterned optical structure may comprise at least about 1, 2, 3, 4, 5, 6, 7, 8, 9, 10, 20, 30, 40, 50, 60, 70, 80, 90, 100, 200, 300, 400, 500, 600, 700, 800, 900, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, 1,000,000, or more regions. The patterned optical structure may comprise at most about 1,000,000, 900,000, 800,000, 700,000, 600,000, 500,000, 400,000, 300,000, 200,000, 100,000, 90,000, 80,000, 70,000, 60,000, 50,000, 40,000, 30,000, 20,000, 10,000, 9,000, 8,000, 7,000, 6,000, 5,000, 4,000, 3,000, 2,000, 1,000, 900, 800, 700, 600, 500, 400, 300, 200, 100, 90, 80, 70, 60, 50, 40, 30, 20, 10, 9, 8, 7, 6, 5, 4, 3, 2, or 1 regions. The patterned optical structure may comprise a number of regions that is within a range defined by any two of the preceding values.

Each region of the plurality of regions may comprise one or more particular optical characteristics, such as one or more transmissivities, absorptivities, or reflectivities. For instance, each region may comprise a transmissivity, absorptivity, or reflectivity of at least about 0%, 1%, 2%, 3%, 4%, 5%, 60%, 7%, 8%, 9%, 10%, 20%, 30%, 40%, 50%, 60%, 70%, 80%, 90%, 91%, 92%, 93%, 94%, 95%, 96%, 97%, 98%, 99%, or 100%. Each region may comprise a transmissivity, absorptivity, or reflectivity of at most about 100%, 99%, 98%, 97%, 96%, 95%, 94%, 93%, 92%, 91%, 90%, 80%, 70%, 60%, 50%, 40%, 30%, 20%, 10%, 9%, 8%, 7%, 6%, 5%, 4%, 3%, 2%, 1%, or 0%. Each region may comprise a transmissivity, absorptivity, or reflectivity that is within a range defined by any two of the preceding values.

The optical characteristics may vary from one region to another. For instance, any two regions may comprise the same or different transmissivities, absorptivities, or reflectivities. The optical characteristics may vary from region to region.

The patterned optical structure may comprise a spatial light modulator (SLM), a digital micromirror device (DMD), a liquid crystal (LC) device, or a photomask.

The patterned optical structure may be fabricated using microfabrication or nanofabrication techniques. For instance, the patterned optical structure may be fabricated using any one or more of solvent cleaning, Piranha cleaning, RCA cleaning, ion implantation, ultraviolet photolithography, deep ultraviolet photolithography, extreme ultraviolet photolithography, electron beam lithography, nanoimprint lithography, wet chemical etching, dry chemical etching, plasma etching, reactive ion etching, deep reactive ion etching, electron beam milling, thermal annealing, thermal oxidation, thin film deposition, chemical vapor deposition, molecular organic chemical deposition, low pressure chemical vapor deposition, plasma enhanced chemical vapor deposition, physical vapor deposition, sputtering, atomic layer deposition, molecular beam epitaxy, electrochemical deposition, wafer bonding, wire bonding, flip chip bonding, thermosonic bonding, wafer dicing, or any other microfabrication or nanofabrication manufacturing technique.

The patterned optical structure may comprise an ordered patterned optical structure. An ordered patterned optical structure may comprise a periodic or other ordered arrangement of regions of different optical characteristics. The patterned optical structure may comprise a disordered patterned optical structure. A disordered patterned optical structure may comprise a disordered arrangement of regions of different optical characteristics. The patterned optical structure may comprise an aperiodic patterned optical structure. An aperiodic patterned optical structure may comprise an aperiodic arrangement of regions of different optical characteristics. The patterned optical structure may comprise a randomly or pseudo-randomly patterned optical structure. A randomly or pseudo-randomly patterned optical structure may comprise a random or pseudo-random arrangement of regions of different optical characteristics.

A disordered or aperiodic optical structure, such as a randomly or pseudo-randomly patterned optical structure, may allow the acquisition of optical spatial information with greater fidelity to the object under study (such as more accurate reconstruction of an image corresponding to the object) by, for instance, reducing attenuation across the frequency (or Fourier) domain. Signals measured using the systems and methods of the present disclosure may be regarded as a one-dimensional convolution of the patterned optical structure and the object under study. When the measurement is interpreted in the frequency domain, this may correspond to multiplication of the Fourier transform of the patterned optical structure and the Fourier transform of the object under study, due to the convolution theorem. Therefore, it may be beneficial to obtain a Fourier transform for the patterned optical structure that is close to a uniform distribution in order to measure optical spatial information corresponding to the object under study without attenuation. The Fourier transform of a disordered or aperiodic function is a uniform distribution. Thus, a disordered or aperiodic patterned optical structure, such as a randomly or pseudo-randomly patterned optical structure, may allow the acquisition of optical spatial information with greater fidelity to the object under study.

In a second operation 120, the method 100 may comprise compressively converting the spatial information into signals that arrive sequentially at a detector. The detector may comprise one or more single pixel detectors. The detector may comprise one or more multi-pixel detectors. The detector may comprise at least about 1, 2, 3, 4, 5, 6, 7, 8, 9, 10, 20, 30, 40, 50, 60, 70, 80, 90, 100, 200, 300, 400, 500, 600, 700, 800, 900, 1,000, 2,000, 3,000, 4,000, 5,000, 6,000, 7,000, 8,000, 9,000, 10,000, 20,000, 30,000, 40,000, 50,000, 60,000, 70,000, 80,000, 90,000, 100,000, 200,000, 300,000, 400,000, 500,000, 600,000, 700,000, 800,000, 900,000, 1,000,000, or more pixel. The detector may comprise at most about 1,000,000, 900,000, 800,000, 700,000, 600,000, 500,000, 400,000, 300,000, 200,000, 100,000, 90,000, 80,000, 70,000, 60,000, 50,000, 40,000, 30,000, 20,000, 10,000, 9,000, 8,000, 7,000, 6,000, 5,000, 4,000, 3,000, 2,000, 1,000, 900, 800, 700, 600, 500, 400, 300, 200, 100, 90, 80, 70, 60, 50, 40, 30, 20, 10, 9, 8, 7, 6, 5, 4, 3, 2, or 1 pixels. The detector may comprise a number of pixels that is within a range defined by any two of the preceding values.

The detector may comprise one or more photomultiplier tubes (PMT), photodiodes, avalanche photodiodes, phototransistors, reverse-biased light emitting diodes (LED), charge coupled devices (CCD), or complementary metal oxide semiconductor (CMOS) cameras.

The detector may be configured to detect light. The light may comprise infrared (IR), visible, or ultraviolet (UV) light. The light may comprise a plurality of wavelengths. The light may comprise one or more wavelengths of at least about 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more.

The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, 390 nm, 380 nm, 370 nm, 360 nm, 350 nm, 340 nm, 330 nm, 320 nm, 310 nm, 300 nm, 290 nm, 280 nm, 270 nm, 260 nm, 250 nm, 240 nm, 230 nm, 220 nm, 210 nm, 200 nm, or less. The light may comprise one or more wavelengths that are within a range defined by any two of the preceding values.

The light may have a bandwidth of at least about 0.001 nm, 0.002 nm, 0.003 nm, 0.004 nm, 0.005 nm, 0.006 nm, 0.007 nm, 0.008 nm, 0.009 nm, 0.01 nm, 0.02 nm, 0.03 nm, 0.04 nm, 0.05 nm, 0.06 nm, 0.07 nm, 0.08 nm, 0.09 nm, 0.1 nm, 0.2 nm, 0.3 nm, 0.4 nm, 0.5 nm, 0.6 nm, 0.7 nm, 0.8 nm, 0.9 nm, 1 nm, 2 nm, 3 nm, 4 nm, 5 nm, 6 nm, 7 nm, 8 nm, 9 nm, 10 nm, 20 nm, 30 nm, 40 nm, 50 nm, 60 nm, 70 nm, 80 nm, 90 nm, 100 nm, or more. The light may have a bandwidth of at most about 100 nm, 90 nm, 80 nm, 70 nm, 60 nm, 50 nm, 40 nm, 30 nm, 20 nm, 10 nm, 9 nm, 8 nm, 7 nm, 6 nm, 5 nm, 4 nm, 3 nm, 2 nm, 1 nm, 0.9 nm, 0.8 nm, 0.7 nm, 0.6 nm, 0.5 nm, 0.4 nm, 0.3 nm, 0.2 nm, 0.1 nm, 0.09 nm, 0.08 nm, 0.07 nm, 0.06 nm, 0.05 nm, 0.04 nm, 0.03 nm, 0.02 nm, 0.01 nm, 0.009 nm, 0.008 nm, 0.007 nm, 0.006 nm, 0.005 nm, 0.004 nm, 0.003 nm, 0.002 nm, 0.001 nm, or less.

The light may have a bandwidth that is within a range defined by any two of the preceding values.

The detector may have a refresh rate of at least about 1 MHz, 2 MHz, 3 MHz, 4 MHz, 5 MHz, 6 MHz, 7 MHz, 8 MHz, 9 MHz, 10 MHz, 20 MHz, 30 MHz, 40 MHz, 50 MHz, 60 MHz, 70 MHz, 80 MHz, 90 MHz, 100 MHz, 200 MHz, 300 MHz, 400 MHz, 500 MHz, 600 MHz, 700 MHz, 800 MHz, 900 MHz, 1 GHz, 2 GHz, 3 GHz, 4 GHz, 5 GHz, 6 GHz, 7 GHz, 8 GHz, 9 GHz, 10 GHz, 20 GHz, 30 GHz, 40 GHz, 50 GHz, 60 GHz, 70 GHz, 80 GHz, 90 GHz, 100 GHz, 200 GHz, 300 GHz, 400 GHz, 500 GHz, 600 GHz, 700 GHz, 800 GHz, 900 GHz, 1,000 GHz, or more.

The detector may have a refresh rate of at most about 1,000 GHz, 900 GHz, 800 GHz, 700 GHz, 600 GHz, 500 GHz, 400 GHz, 300 GHz, 200 GHz, 100 GHz, 90 GHz, 80 GHz, 70 GHz, 60 GHz, 50 GHz, 40 GHz, 30 GHz, 20 GHz, 10 GHz, 9 GHz, 8 GHz, 7 GHz, 6 GHz, 5 GHz, 4 GHz, 3 GHz, 2 GHz, 1 GHz, 900 MHz, 80 MHz, 700 MHz, 600 MHz, 500 MHz, 400 MHz, 300 MHz, 200 MHz, 100 MHz, 90 MHz, 80 MHz, 70 MHz, 60 MHz, 50 MHz, 40 MHz, 30 MHz, 20 MHz, 10 MHz, 9 MHz, 8 MHz, 7 MHz, 6 MHz, 5 MHz, 4 MHz, 3 MHz, 2 MHz, 1 MHz, or less. The detector may have a refresh rate that is within a range defined by any two of the preceding values.

The second operation 120 may comprise applying a two-step iterative shrinkage/thresholding (TwIST) procedure.

In a third operation 130, the method 100 may comprise using the signals to identify at least a subset of the particles. The third operation 130 may comprise computationally reconstructing morphologies of the particles at least in part through combinatorial use of one or more temporal waveforms comprising one or more light intensity distributions imparted by the patterned optical structure, as described herein (for instance, with respect to FIG. 1A).

The first operation 110 may comprise: (i) directing light from a light source through the patterned optical structure, (ii) directing light from the patterned optical structure to the particles, and (iii) directing light from the particles to the detector. In such a scenario, the patterned optical structure may impart an optical encoding onto light from the light source prior to interaction of the light with the particles. Such a scenario may be referred to as structured illumination (SI).

Alternatively or in combination, the first operation 110 may comprise: (i) directing light from a light source to the particles, (ii) directing light from the particles through the patterned optical structure, and (iii) directing light from the patterned optical structure to the detector. In such a scenario, the patterned optical structure may impart an optical encoding onto light from the light source after interaction of the light with the particles. Such a scenario may be referred to as structured detection (SD).

The light source may comprise a laser. For instance, the light source may comprise a continuous wave laser. The light source may comprise a pulsed laser. The light source may comprise a gas laser, such as a helium-neon (HeNe) laser, an argon (Ar) laser, a krypton (Kr) laser, a xenon (Xe) ion laser, a nitrogen ($N_2$) laser, a carbon dioxide ($CO_2$) laser, a carbon monoxide (CO) laser, a transversely excited atmospheric (TEA) laser, or an excimer laser. For instance, the light source may comprise an argon dimer ($Ar_2$) excimer laser, a krypton dimer ($Kr_2$) excimer laser, a fluorine dimer ($F_2$) excimer laser, a xenon dimer ($Xe_2$) excimer laser, an argon fluoride (ArF) excimer laser, a krypton chloride (KrCl) excimer laser, a krypton fluoride (KrF) excimer laser, a xenon bromide (XeBr) excimer laser, a xenon chloride (XeCl) excimer laser, or a xenon fluoride (XeF) excimer laser. The light source may comprise a dye laser.

The light source may comprise a metal-vapor laser, such as a helium-cadmium (HeCd) metal-vapor laser, a helium-mercury (HeHg) metal-vapor laser, a helium-selenium (HeSe) metal-vapor laser, a helium-silver (HeAg) metal-vapor laser, a strontium (Sr) metal-vapor laser, a neon-copper (NeCu) metal-vapor laser, a copper (Cu) metal-vapor laser, a gold (Au) metal-vapor laser, a manganese (Mn) metal-vapor, or a manganese chloride ($MnCl_2$) metal-vapor laser.

The light source may comprise a solid-state laser, such as a ruby laser, a metal-doped crystal laser, or a metal-doped fiber laser. For instance, the light source may comprise a neodymium-doped yttrium aluminum garnet (Nd:YAG) laser, a neodymium/chromium doped yttrium aluminum garnet (Nd/Cr:YAG) laser, an erbium-doped yttrium aluminum garnet (Er:YAG) laser, a neodymium-doped yttrium lithium fluoride (Nd:YLF) laser, a neodymium-doped yttrium orthovanadate ($ND:YVO_4$) laser, a neodymium-doped yttrium calcium oxoborate (Nd:YCOB) laser, a neodymium glass (Nd:glass) laser, a titanium sapphire (Ti:sapphire) laser, a thulium-doped ytrrium aluminum garnet (Tm:YAG) laser, a ytterbium-doped ytrrium aluminum garnet (Yb:YAG) laser, a ytterbium-doped glass (Yt:glass) laser, a holmium ytrrium aluminum garnet (Ho:YAG) laser, a chromium-doped zinc selenide (Cr:ZnSe) laser, a cerium-doped lithium strontium aluminum fluoride (Ce:LiSAF) laser, a cerium-doped lithium calcium aluminum fluoride (Ce:LiCAF) laser, a erbium-doped glass (Er:glass), an erbium-ytterbium-codoped glass (Er/Yt:glass) laser, a uranium-doped calcium fluoride ($U:CaF_2$) laser, or a samarium-doped calcium fluoride ($Sm:CaF_2$) laser.

The light source may comprise a semiconductor laser or diode laser, such as a gallium nitride (GaN) laser, an indium gallium nitride (InGaN) laser, an aluminum gallium indium phosphide (AlGaInP) laser, an aluminum gallium arsenide (AlGaAs) laser, an indium gallium arsenic phosphide (InGaAsP) laser, a vertical cavity surface emitting laser (VCSEL), or a quantum cascade laser.

The light source may be configured to emit light. The light may comprise infrared (IR), visible, or ultraviolet (UV) light. The light may comprise a plurality of wavelengths. The light may comprise one or more wavelengths of at least about 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, or more.

The light may comprise one or more wavelengths of at most about 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, 390 nm, 380 nm, 370 nm, 360 nm, 350 nm, 340 nm, 330 nm, 320 nm, 310 nm, 300 nm, 290 nm, 280 nm, 270 nm, 260 nm, 250 nm, 240 nm, 230 nm, 220 nm, 210 nm, 200 nm, or less. The light may comprise one or more wavelengths that are within a range defined by any two of the preceding values.

The light may have a bandwidth of at least about 0.001 nm, 0.002 nm, 0.003 nm, 0.004 nm, 0.005 nm, 0.006 nm, 0.007 nm, 0.008 nm, 0.009 nm, 0.01 nm, 0.02 nm, 0.03 nm, 0.04 nm, 0.05 nm, 0.06 nm, 0.07 nm, 0.08 nm, 0.09 nm, 0.1 nm, 0.2 nm, 0.3 nm, 0.4 nm, 0.5 nm, 0.6 nm, 0.7 nm, 0.8 nm, 0.9 nm, 1 nm, 2 nm, 3 nm, 4 nm, 5 nm, 6 nm, 7 nm, 8 nm, 9 nm, 10 nm, 20 nm, 30 nm, 40 nm, 50 nm, 60 nm, 70 nm, 80 nm, 90 nm, 100 nm, or more. The light may have a bandwidth of at most about 100 nm, 90 nm, 80 nm, 70 nm, 60 nm, 50 nm, 40 nm, 30 nm, 20 nm, 10 nm, 9 nm, 8 nm, 7 nm, 6 nm, 5 nm, 4 nm, 3 nm, 2 nm, 1 nm, 0.9 nm, 0.8 nm, 0.7 nm, 0.6 nm, 0.5 nm, 0.4 nm, 0.3 nm, 0.2 nm, 0.1 nm, 0.09 nm, 0.08 nm, 0.07 nm, 0.06 nm, 0.05 nm, 0.04 nm, 0.03 nm, 0.02 nm, 0.01 nm, 0.009 nm, 0.008 nm, 0.007 nm, 0.006 nm, 0.005 nm, 0.004 nm, 0.003 nm, 0.002 nm, 0.001 nm, or less. The light may have a bandwidth that is within a range defined by any two of the preceding values.

The light may have an average optical power of at least about 1 microwatt (μW), 2μW, 3 μW, 4, μW, 5 μW, 6 μW, 7 μW, 8 μW, 9 μW, 10 μW, 20 μW30 μW, 40 μW, 50 μW, 60 μW, 70 μW, 80 μW, 90 μW, 100 μW, 200 μW, 300 μW, 400 μW, 500 μW, 600 μW, 700 μW, 800 μW, 900 μW, 1 milliwatt (mW), 2 mW, 3 mW, 4 mW, 5 mW, 6 mW, 7 mW, 8 mW, 9 mW, 10 mW, 20 mW, 30 mW, 40 mW, 50 mW, 60 mW, 70 mW, 80 mW, 90 mW, 100 mW, 200 mW, 300 mW, 400 mW, 500 mW, 600 mW, 700 mW, 800 mW, 900 mW, 1 watt (W), 2 W, 3 W, 4 W, 5 W, 6 W, 7 W, 8 W, 9 W, 10 W, or more.

The light may have an average optical power of at most about 10 W, 9 W, 8 W, 7 W, 6 W, 5 W, 4 W, 3 W, 2 W, 1 W, 900 mW, 800 mW, 700 mW, 600 mW, 500 mW, 400 mW, 300 mW, 200 mW, 100 mW, 90 mW, 80 mW, 70 mW, 60 mW, 50 mW, 40 mW, 30 mW, 20 mW, 10 mW, 9 mW, 8 mW, 7 mW, 6 mW, 5 mW, 4 mW, 3 mW, 2 mW, 1 mW, 900 μW, 800 μW, 700 μW, 600 μW, 500 μW, 400μW, 300 μW, 200 μW, 100 μW, 90 μW, 80 μW, 70 μW, 60 μW, 50 μW, 40 μW, 20 μW, 10 μW, 9 μW, 8 μW, 7 μW, 6 μW, 5 μW, 4 μW, 3 μW, 2 μW, 1 μW, or less. The light may have an optical power that is within a range defined by any two of the preceding values.

The light may have a peak optical power of at least about 1 mW, 2 mW, 3 mW, 4 mW, 5 mW, 6 mW, 7 mW, 8 mW, 9 mW, 10 mW, 20 mW, 30 mW, 40 mW, 50 mW, 60 mW, 70 mW, 80 mW, 90 mW, 100 mW, 200 mW, 300 mW, 400 mW, 500 mW, 600 mW, 700 mW, 800 mW, 900 mW, 1 W, 2 W, 3 W, 4 W, 5 W, 6 W, 7 W, 8 W, 9 W, 10 W, 10 W, 20 W, 30 W, 40 W, 50 W, 60 W, 70 W, 80 W, 90 W, 100 W, 200 W, 300 W, 400 W, 500 W, 600 W, 700 W, 800 W, 900 W, 1,000 W, or more.

The light may have a peak optical power of at most about 1,000 W, 900 W, 800 W, 700 W, 600 W, 500 W, 400 W, 300 W, 200 W, 100 W, 90 W, 80 W, 70 W, 60 W, 50 W, 40 W, 30 W, 20 W, 10 W, 9 W, 8 W, 7 W, 6 W, 5 W, 4 W, 3 W, 2 W, 1 W, 900 mW, 800 mW, 700 mW, 600 mW, 500 mW, 400 mW, 300 mW, 200 mW, 100 mW, 90 mW, 80 mW, 70 mW, 60 mW, 50 mW, 40 mW, 30 mW, 20 mW, 10 mW, 9 mW, 8 mW, 7 mW, 6 mW, 5 mW, 4 mW, 3 mW, 2 mW, 1 mW, or less. The light may have a peak optical power that is within a range defined by any two of the preceding values.

The light may have a pulse length of at least about 100 femtoseconds (fs), 200 fs, 300 fs, 400 fs, 500 fs, 600 fs, 700 fs, 800 fs, 900 fs, 1 picosecond (ps), 2 ps, 3 ps, 4 ps, 5 ps, 6 ps, 7 ps, 8 ps, 9 ps, 10 ps, 20 ps, 30 ps, 40 ps, 50 ps, 60 ps, 70 ps, 80 ps, 90 ps, 100 ps, 200 ps, 300 ps, 400 ps, 500 ps, 600 ps, 700 ps, 800 ps, 900 ps, 1 nanosecond (ns), 2 ns, 3 ns, 4 ns, 5 ns, 6 ns, 7 ns, 8 ns, 9 ns, 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1 microsecond (μs), 2 μs, 3 μs, 4 μs, 5 μs, 6 μs, 7 μs, 8 μs, 9 μs, 10 μs, 20 μs, 30 μs, 40 μs, 50 μs, 60 μs, 70 μs, 80 μs, 90 μs, 100 μs, 200 μs, 300 μs, 400 μs, 500 μs, 600 μs, 700 μs, 800 μs, 900 μs, 1 millisecond (1 ms), or more.

The light may have a pulse length of at most about 1 ms, 900 μs, 800 μs, 700 μs, 600 μs, 500 μs, 400 μs, 300 μs, 200 μs, 100 μs, 90 μs, 80 μs, 70 μs, 60 μs, 50 μs, 40 μs, 30 μs, 20 μs, 10 μs, 9 μs, 8 μs, 7 μs, 6 μs, 5 μs, 4 μs, 3 μs, 2 μs, 1 μs, 900 ns, 800 ns, 700 ns, 600 ns, 500 ns, 400 ns, 300 ns, 200 ns, 100 ns, 90 ns, 80 ns, 70 ns, 60 ns, 50 ns, 40 ns, 30 ns, 20 ns, 10 ns, 9 ns, 8 ns, 7 ns, 6 ns, 5 ns, 4 ns, 3 ns, 2 ns, 1 ns, 900 ps, 800 ps, 700 ps, 600 ps, 500 ps, 400 ps, 300 ps, 200 ps, 100 ps, 90 ps, 80 ps, 70 ps, 60 ps, 50 ps, 40 ps, 30 ps, 20 ps, 10 ps, 9 ps, 8 ps, 7 ps, 6 ps, 5 ps, 4 ps, 3 ps, 2 ps, 1 ps, 900 fs, 800 fs, 700 fs, 600 fs, 500 fs, 400 fs, 300 fs, 200 fs, 100 fs, or less. The light may have a pulse length that is within a range defined by any two of the preceding values.

The method 100 may further comprise applying one or more machine learning classifiers to one or more compressed waveforms corresponding to the signals. The method 100 may further comprise applying one or more machine learning classifiers to the one or more temporal waveforms described herein, or to compressed waveforms associated with the one or more temporal waveforms described herein.

The one or more machine learning classifiers may be applied to the waveforms to identify one or more of the particles described herein. The one or more machine learning classifiers may be configured to identify the one or more particles to obtain at least 1, 2, or 3 of a sensitivity, a specificity, and an accuracy of at least about 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, or more.

The one or more machine learning classifiers may be configured to identify the one or more particles to obtain at least 1, 2, or 3 of a sensitivity, a specificity, and an accuracy of at most about 99.99%, 99.98%, 99.97%, 99.96%, 99.95%, 99.94%, 99.93%, 99.92%, 99.91%, 99.9%, 99.8%, 99.7%, 99.6%, 99.5%, 99.4%, 99.3%, 99.2%, 99.1%, 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, or less. The machine learning classifiers may be configured to identify the one or more particles to obtain at least 1, 2, or 3 of a sensitivity, a specificity, and an accuracy that is within a range defined by any two of the preceding values.

The one or more machine learning classifiers may comprise any methods and technologies for using statistical techniques to infer one or more traits from one or more sets of data. Such methods and technologies may comprise supervised, supervised, semi-supervised, or unsupervised machine learning techniques. Machine learning techniques may comprise regression analysis, regularization, classification, dimensionality reduction, ensemble learning, meta learning, reinforcement learning, association rule learning, cluster analysis, anomaly detection, or deep learning. Machine learning techniques may comprise, but are not limited to: k-means, k-means clustering, k-nearest neighbors, learning vector quantization, linear regression, non-linear regression, least squares regression, partial least squares regression, logistic regression, stepwise regression, multivariate adaptive regression splines, ridge regression, principle component regression, least absolute shrinkage and selection operation, least angle regression, canonical correlation analysis, factor analysis, independent component analysis, linear discriminant analysis, multidimensional scaling, non-negative matrix factorization, principal components analysis, prinicipal coordinates analysis, projection pursuit, Sammon mapping, t-distributed stochastic neighbor embedding, AdaBoost, boosting, bootstrap aggregation, ensemble averaging, decision trees, conditional decision trees, boosted decision trees, gradient boosted decision trees, random forests, stacked generalization, Bayesian networks, Bayesian belief networks, naïve Bayes, Gaussian naïve Bayes, multinomial naïve Bayes, hidden Markov models, hierarchical hidden Markov models, support vector machines, encoders, decoders, auto-encoders, stacked auto-encoders, perceptrons, multi-layer perceptrons, artificial neural networks, feedforward neural networks, convolutional neural networks, recurrent neural networks, long short-term memory, deep belief networks, deep Boltzmann machines, deep convolutional neural networks, deep recurrent neural networks, or generative adversarial networks.

The one or more machine learning classifiers may be trained to learn an identification of the particles directly from the temporal waveforms or compressed temporal waveforms. As such, the particles may be analyzed without image reconstruction.

Alternatively or in combination, the one or more machine learning classifiers may be trained to learn an identification of the particles from one or more images reconstructed from the temporal waveforms or compressed temporal waveforms. As such, the method 100 may further comprise reconstructing one or more images of the particles and the particles may be analyzed based on the reconstructed images. The one or more images may comprise one or more bright-field, cross-polarized, dark-field, phase contrast, differential interference contrast (DIC), reflected interference, Sarfus, fluorescence, epifluorescence, confocal, light sheet, multi-photon, super-resolution, near-field scanning optical, near-field optical random mapping (NORM), structured illumination (SIM), spatially-modulated illumination (SMI), 4-pi, stimulated emission depletion (STED), ground-state depletion (GSD), reversible saturable optical linear fluorescence transition (RESOLFT), binding-activated localization (BALM), photo-activated localization (PALM), stochastic optical reconstruction (STORM), direct stochastic optical reconstruction (dSTORM), super-resolution optical fluctuation (SOFI), or omnipresent localization (OLM) images.

The method 100 may further comprise reconstructing a plurality of images of the particles, such as at least about 1, 2, 3, 4, 5, 6, 7, 8, 9, 10, 20, 30, 40, 50, 60, 70, 80, 90, 100, or more images of the particles, at most about 100, 90, 80, 70, 60, 50, 40, 30, 20, 10, 9, 8, 7, 6, 5, 4, 3, 2, or 1 images of the particles, or a number of images of the particles that is within a range defined by any two of the preceding values. Each image of the plurality may comprise a different wavelength or range of wavelengths.

The one or more images may be free of blur artifacts. For instance, the one or more images may be free of blur artifacts when the particles move at a rate of at least about 1 millimeter per second (mm/s), 2 mm/s, 3 mm/s, 4 mm/s, 5 mm/s, 6 mm/s, 7 mm/s, 8 mm/s, 9 mm/s, 10 mm/s, 20 mm/s, 30 mm/s, 40 mm/s, 50 mm/s, 60 mm/s, 70 mm/s, 80 mm/s, 90 mm/s, 100 mm/s, 200 mm/s, 300 mm/s, 400 mm/s, 500 mm/s, 600 mm/s, 700 mm/s, 800 mm/s, 900 mm/s, 1 meter per second (m/s), 2 m/s, 3 m/s, 4 m/s, 5 m/s, 6 m/s, 7 m/s, 8 m/s, 9 m/s, 10 m/s, 20 m/s, 30 m/s, 40 m/s, 50 m/s, 60 m/s, 70 m/s, 80 m/s, 90 m/s, 100 m/s, 200 m/s, 300 m/s, 400 m/s, 500 m/s, 600 m/s, 700 m/s, 800 m/s, 900 m/s, 1,000 m/s, or more, relative to the patterned optical structure.

The one or more images may be free of blur artifacts when the particles move at a rate of at most about 1,000 m/s, 900 m/s, 800 m/s, 700 m/s, 600 m/s, 500 m/s, 400 m/s, 300 m/s, 200 m/s, 100 m/s, 90 m/s, 80 m/s, 70 m/s, 60 m/s, 50 m/s, 40 m/s, 30 m/s, 20 m/s, 10 m/s, 9 m/s, 8 m/s, 7 m/s, 6 m/s, 5 m/s, 4 m/s, 3 m/s, 2 m/s, 1 m/s, 900 mm/s, 800 mm/s, 700 mm/s, 600 mm/s, 500 mm/s, 400 mm/s, 300 mm/s, 200 mm/s, 100 mm/s, 90 mm/s, 80 mm/s, 70 mm/s, 60 mm/s, 50 mm/s, 40 mm/s, 30 mm/s, 20 mm/s, 10 mm/s, 9 mm/s, 8 mm/s, 7 mm/s, 6 mm/s, 5 mm/s, 4 mm/s, 3 mm/s, 2 mm/s, 1 mm/s, or less, relative to the patterned optical structure. The one or more images may be free of blur articles when the particles move at a rate that is within a range defined by any two of the preceding values, relative to the patterned optical structure.

The method 100 may further comprise sorting at least a subset of the particles into one or more groups of sorted particles. For instance, the method may further comprise sorting the particles into one or more groups of sorted particles based on morphologies of the particles. Particles (e.g., cells) may be identified and separated, isolated, or sorted by activating one or more actuators (e.g., a piezoelectric unit) to direct or divert one or more of the particles or a fluid stream comprising one or more of the particles, such as, for example, from one channel to another channel. Such one or more actuators may provide a fluid or pressure pulse (e.g., via ultrasound signals), for example.

Particles (e.g., cells) may be identified and separated, isolated, or sorted at a rate of at least about 1 particles per second, 2 particles per second, 3 particles per second, 4 particles per second, 5 particles per second, 6 particles per second, 7 particles per second, 8 particles per second, 9 particles per second, 10 particles per second, 20 particles per second, 30 particles per second, 40 particles per second, 50 particles per second, 60 particles per second, 70 particles per second, 80 particles per second, 90 particles per second, 100 particles per second, 200 particles per second, 300 particles per second, 400 particles per second, 500 particles per second, 600 particles per second, 700 particles per second, 800 particles per second, 900 particles per second, 1,000 particles per second, 2,000 particles per second, 3,000 particles per second, 4,000 particles per second, 5,000 particles per second, 6,000 particles per second, 7,000 particles per second, 8,000 particles per second, 9,000 particles per second, 10,000 particles per second, 20,000 particles per second, 30,000 particles per second, 40,000 particles per second, 50,000 particles per second, 60,000 particles per second, 70,000 particles per second, 80,000 particles per second, 90,000 particles per second, 100,000 particles per second, 200,000 particles per second, 300,000 particles per second, 400,000 particles per second, 500,000 particles per second, 600,000 particles per second, 700,000 particles per second, 800,000 particles per second, 900,000 particles per second, 1,000,000 particles per second, or more.

Particles (e.g., cells) may be identified and separated, isolated, or sorted at a rate of at most 1,000,000 particles per second, 900,000 particles per second, 800,000 particles per second, 700,000 particles per second, 600,000 particles per second, 500,000 particles per second, 400,000 particles per second, 300,000 particles per second, 200,000 particles per second, 100,000 particles per second, 90,000 particles per second, 80,000 particles per second, 70,000 particles per second, 60,000 particles per second, 50,000 particles per second, 40,000 particles per second, 30,000 particles per second, 20,000 particles per second, 10,000 particles per second, 9,000 particles per second, 8,000 particles per second, 7,000 particles per second, 6,000 particles per second, 5,000 particles per second, 4,000 particles per second, 3,000 particles per second, 2,000 particles per second, 1,000 particles per second, 900 particles per second, 800 particles per second, 700 particles per second, 600 particles per second, 500 particles per second, 400 particles per second, 300 particles per second, 200 particles per second, 100 particles per second, 90 particles per second, 80 particles per second, 70 particles per second, 60 particles per second, 50 particles per second, 40 particles per second, 30 particles per second, 20 particles per second, 10 particles per second, 9 particles per second, 8 particles per second, 7 particles per second, 6 particles per second, 5 particles per second, 4 particles per second, 3 particles per second, 2 particles per second, 1 particles per second, or less. Particles (e.g., cells) may be identified and separated, isolated, or sortedmay be achieved at a rate that is within a range defined by any two of the preceding values.

The method 100 may further comprise collecting one or more of the groups of sorted particles to generate an enriched particle mixture. One or more of the groups of sorted particle may have a purity of at least about 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, 99.98%, 99.99%, or more.

One or more of the groups of sorted particles may have a purity of at most about 99.99%, 99.98%, 99.97%, 99.96%, 99.95%, 99.94%, 99.93%, 99.92%, 99.91%, 99.9%, 99.8%, 99.7%, 99.6%, 99.5%, 99.4%, 99.3%, 99.2%, 99.1%, 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, or less. One or more of the groups of sorted particles may have a purity that is within a range defined by any two of the preceding values.

The method 100 may further comprise subjecting one or more particles from the one or more groups of sorted particles to one or more assays. The one or more assays may comprise one or more members selected from the group consisting of: lysis, nucleic acid extraction, nucleic acid amplification, nucleic acid sequencing, and protein sequencing.

The method 100 may further comprise subjecting the particles to hydrodynamic flow focusing. The particles may be subjected to hydrodynamic flow focusing prior to operation 110, during operation 110, subsequent to operation 110, prior to operation 120, during operation 120, subsequent to operation 120, prior to operation 130, during operation 130, and/or subsequent to operation 130.

The method 100 may further comprise collecting a partial transmissive speckle pattern of the particles as the particles move relative to the patterned optical structure. The speckle pattern may be generated by the diffraction of light that has passed through the patterned optical structure. For instance, coherent light may interact with the patterned optical structure to produce structured illumination, which may be directed to a focus of an objective. After the focus, the coherent light may spread out and creates a speckle pattern due to diffraction. At a substantial length away from the focus, the speckle pattern may be large enough that a first portion of the speckle pattern may be blocked while a second portion of the speckle pattern is transmitted. Such blocking may be implemented using, for instance, an iris. This small portion of the original speckle pattern may be detected using any detector described herein. When a cell particle passes through the structured illumination, the phase and intensity changes in the transmitted light may result in a change in the speckle pattern, which may give rise to a change in intensity of the light detected at the detector. From the modulation of the detected signal, phase and/or intensity information for the particle may be be obtained.

The systems and methods described herein may be used in a variety of therapeutic applications.

In some cases, the method 100 may be utilized to identify one or more target cells from a plurality of cells. A method for identifying one or more target cells from a plurality of cells may comprise any one or more operations of method 100 described herein, such as any of one or more of operations 110, 120, and 130 of method 100. For instance, a method for identifying one or more target cells from a plurality of cells may comprise: (a) obtaining spatial information from motion of the plurality of cells relative to a patterned optical structure (for instance, as described herein with respect to operation 110 of method 100), and (b) using the spatial information to identify the one or more target cells from the plurality of cells.

Using the spatial information to identify the one or more target cells from the plurality of cells may comprise using the spatial information to analyze the one or more target cells (for instance, as described herein with respect to operation 130 of method 100). For instance, morphologies of the particles may be computationally reconstructed at least in part through combinatorial use of one or more temporal waveforms comprising one or more light intensity distributions imparted by the patterned optical structure, as described herein (for instance, with respect to FIG. 1A).

Using the spatial information to identify the one or more target cells from the plurality of cells may comprise applying one or more machine learning classifiers to identify the target cells from the plurality of cells. The one or more machine learning classifiers may comprise any machine learning classifiers described herein. The one or more machine learning classifiers may utilize the spatial information (or signals associated with the spatial information) to identify the target cells. For instance, the one or more machine learning classifiers may be applied to the spatial information (or to signals associated with the spatial information), as described herein with reference to method 100.

The one or more machine learning classifiers may be trained to learn an identification of the plurality of cells (or of the target cells) directly from the spatial information (or from signals associated with the spatial information). As such, the plurality of cells (or the target cells) may be analyzed without image reconstruction.

Alternatively or in combination, the one or more machine learning classifiers may be trained to learn an identification of the plurality of cells (or of the target cells) from one or more images reconstructed from the spatial information (or from signals associated with the spatial information). As such, using the signals to identify the one or more target cells may further comprise reconstructing one or more images of the plurality of cells (or the target cells). The plurality of cells (or the target cells) may be analyzed based on the reconstructed images. The one or more images may comprise any images described herein (for instance, with respect to method 100).

The spatial information may correspond with characteristics, properties, or information pertaining to the plurality of cells. The spatial information may correspond one-to-one with the characteristics, properties, or information pertaining to the plurality of cells. The characteristics, properties, or information pertaining to the plurality of cells may comprise one or more members selected from the group consisting of: metabolic states, proliferation states, differentiation states, maturity states, expression of marker proteins, expression of marker genes, morphology of cells, morphology of organelles, positioning of organelles, size or extent of organelles, morphology of cytoplasm, positioning of cytoplasm, size or extent of cytoplasm, morphology of nucleus, positioning of nucleus, size or extent of nucleus, morphology of mitochondria, positioning of mitochondria, size or extent of mitochondria, morphology of lysosome, positioning of lysozyme, size or extent of lysozyme, distribution of molecules inside cells, distribution of peptides, polypeptides, or proteins inside cells, distribution of nucleic acids inside cells, distribution of glycans or polysaccharides inside cells, and distribution of lipids inside cells.

Using the signals to isolate the one or more target cells may further comprise sorting the plurality of cells into one or more groups of sorted cells based on morphologies of the plurality of cells, as described herein (for instance, with respect to method 100 or any of FIGS. 5A, 5B, 5C, 12A, 12B, 12C, 12D, and 14). One or more of the groups of sorted cells may comprise the target cells.

Figure 5A:
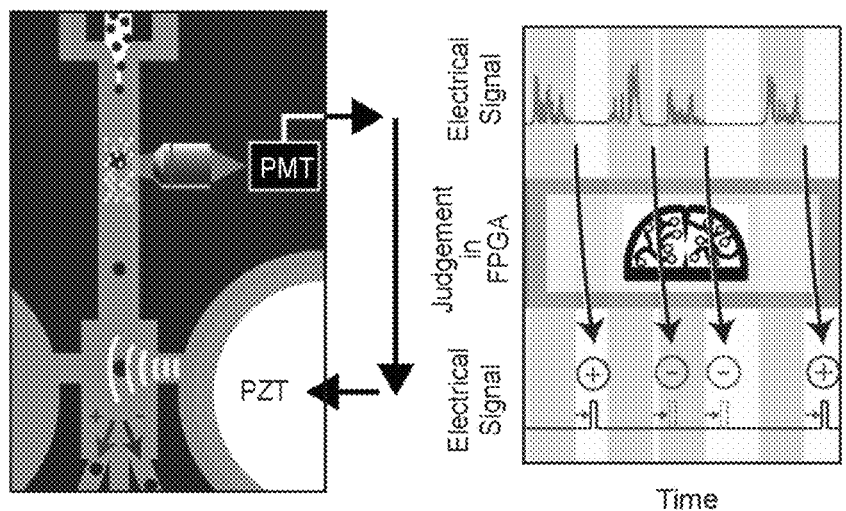
FIG. 5A shows an example of a microfluidic device for use with the systems and methods of the present disclosure.
Figure 5B:
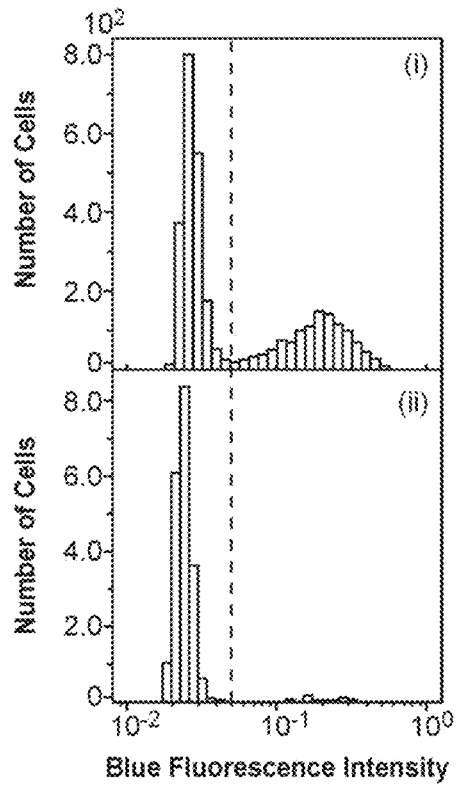
FIG. 5B shows accurate isolation of MIA PaCa-2 cells against morphologically similar MCF-7 cells using the systems and methods of the present disclosure.
Figure 5C:
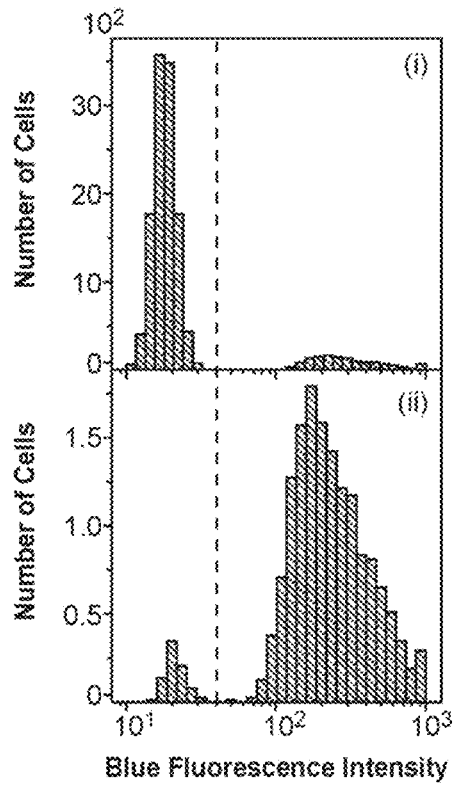
FIG. 5C shows an example of accurate isolation of model cancer (MIA PaCa-2) cells against a complex mixture of peripheral blood mononuclear cells (PBMCs) using the systems and methods of the present disclosure.

Using the signals to isolate the one or more target cells may further comprise collecting one or more of the groups of sorted cells to generate an enriched cell mixture, as described herein (for instance, with respect to method 100 or any of FIGS. 5A, 5B, and 5C).

The spatial information may be compressively converted into signals that arrive sequentially at a detector, as described herein with respect to method 100.

The one or more target cells may be isolated from the plurality of cells based on the spatial information (or signals associated with the spatial information). Isolating the one or more target cells may comprise: (i) using the spatial information (or signals associated with the spatial information) to analyze the plurality of cells; (ii) sorting the plurality of cells into one or more groups of sorted cells based on results of analyzing the plurality of cells; and (iii) collecting the one or more target cells from the one or more groups of sorted cells.

Using the spatial information (or signals associated with the spatial information) to isolate the one or more target cells from the plurality of cells may comprise using the spatial information (or signals associated with the spatial information) to analyze the one or more target cells (for instance, as described herein with respect to operation 130 of method 100). For instance, morphologies of the particles may be computationally reconstructed at least in part through combinatorial use of one or more temporal waveforms comprising one or more light intensity distributions imparted by the patterned optical structure, as described herein (for instance, with respect to FIG. 1A).

Using the spatial information (or signals associated with the spatial information) to isolate the one or more target cells from the plurality of cells may comprise applying one or more machine learning classifiers to one or more temporal waveforms or compressed temporal waveforms corresponding to the spatial information (or to signals associated with the spatial information), as described herein (for instance, with reference to method 100).

Using the spatial information (or signals associated with the spatial information) to isolate the one or more target cells may further comprise sorting the plurality of cells into one or more groups of sorted cells based on results of analyzing the plurality of cells. For instance, the one or more groups of sorted cells may be based on morphologies of the plurality of cells, as described herein (for instance, with respect to method 100 or any of FIGS. 5A, 5B, 5C, 12A, 12B, 12C, 12D, and 14). One or more of the groups of sorted cells may comprise the target cells.

Using the spatial information (or signals associated with the spatial information) to isolate the one or more target cells may further comprise collecting the one or more target cells from the one or more groups of sorted cells. For instance, one or more of the groups of sorted cells may be collected to generate an enriched cell mixture, as described herein (for instance, with respect to method 100 or any of FIGS. 5A, 5B, and 5C).

The target cells may comprise one or more therapeutic cells. The target cells may one or more members selected from the group consisting of: stem cells, mesenchymal stem cells, induced pluripotent stem cells, embryonic stem cells, cells differentiated from induced pluripotent stem cells, cells differentiated from embryonic stem cells, genetically engineered cells, blood cells, red blood cells, white blood cells, T cells, B cells, natural killer cells, chimeric antigen receptor T cells, chimeric antigen receptor natural killer cells, cancer cells, and blast cells.

In another aspect, the present disclosure provides an image-free method for classifying or sorting particles based at least in part on morphologies of the particles without use of non-native labels at an accuracy of at least 80% or more.

Figure 1C:
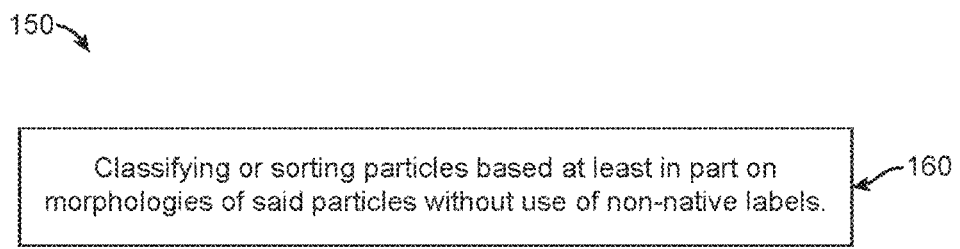
FIG. 1C shows a flowchart for an example of an image-free optical method for classifying or sorting particles.

FIG. 1C shows a flowchart for an example of an image-free optical method 150 for classifying or sorting particles. In a first operation 160, the method 150 may comprise classifying or sorting particles based at least in part on morphologies of the particles without use of non-native labels. The operation 160 may comprise any one or more of operations of method 100 described herein, such as any one or more of operations 110, 120, and 130 described herein.

Many variations, alterations, and adaptations based on the methods 100 or 150 provided herein are possible. For example, the order of the operations of the methods 100 or 150 may be changed, some of the operations removed, some of the operations duplicated, and additional operations added as appropriate. Some of the operations may be performed in succession. Some of the operations may be performed in parallel. Some of the operations may be performed once. Some of the operations may be performed more than once. Some of the operations may comprise sub-operations. Some of the operations may be automated and some of the operations may be manual.

In another aspect, the present disclosure provides a system for particle analysis. The system may comprise a fluid flow path configured to direct particles. The system may further comprise a detector in sensing communication with at least a portion of the fluid flow path, and one or more computer processors operatively coupled to the detector. The one or more computer processors may be individually or collectively programmed to implement the method 100 or 150 described herein. For instance, the one or more computer processors may be individually or collectively programmed to (i) obtain spatial information from motion of particles relative to a randomly of pseudo-randomly patterned optical structure, (ii) compressively convert the spatial information into signals that arrive sequentially at the detector, and (iii) use the signals to analyze the particles. In some embodiments, the detector is a multi-pixel detector. Alternatively, the detector may be a single pixel detector.

Computer Systems

Figure 13:
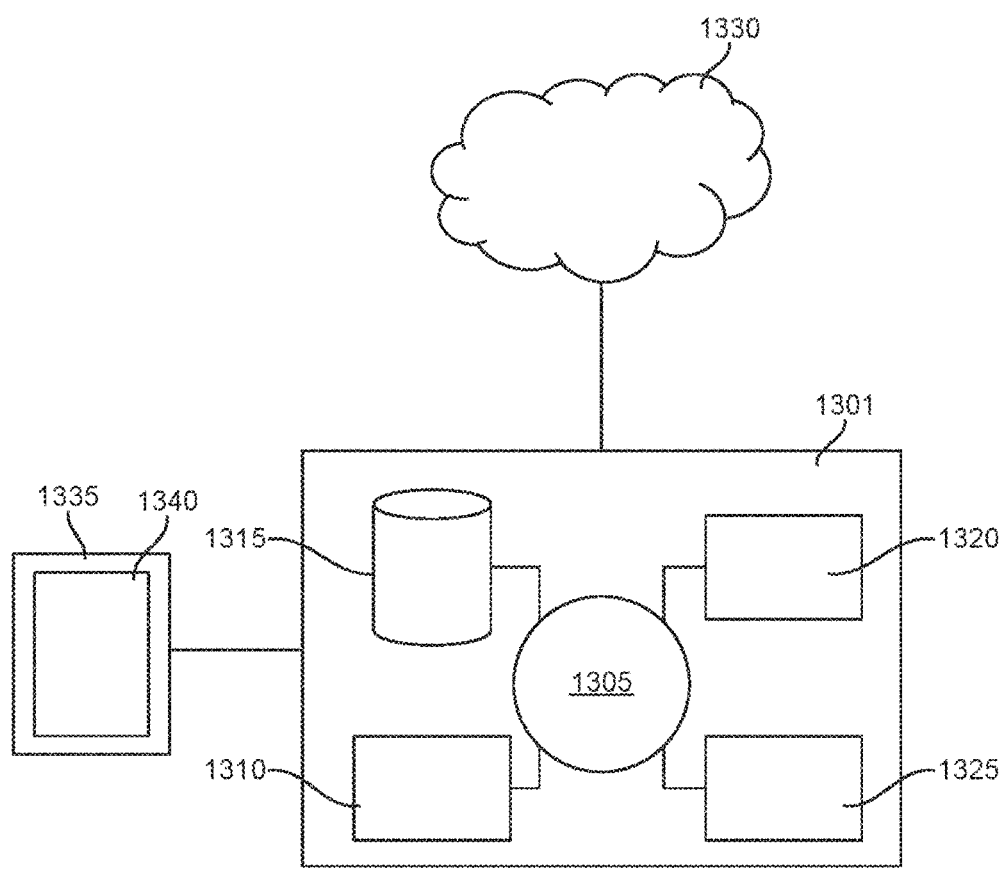
FIG. 13 shows an example of computer system that is programmed or otherwise configured to implement methods and systems of the present disclosure.

The present disclosure provides computer systems that are programmed to implement methods and systems of the disclosure. FIG. 13 shows a computer system 1301 that includes a central processing unit (CPU, also "processor" and "computer processor" herein) 1305, which can be a single core or multi core processor, or a plurality of processors for parallel processing. The computer system 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 can be a data storage unit (or data repository) for storing data. The computer system 1301 can be operatively coupled to a computer network ("network") 1330 with the aid of the communication interface 1320. The network 1330 can be the Internet, an internet and/or extranet, or an intranet and/or extranet that is in communication with the Internet. The network 1330 in some cases is a telecommunication and/or data network. The network 1330 can include one or more computer servers, which can enable distributed computing, such as cloud computing. The network 1330, in some cases with the aid of the computer system 1301, can implement a peer-to-peer network, which may enable devices coupled to the computer system 1301 to behave as a client or a server.

The CPU 1305 can execute a sequence of machine-readable instructions, which can be embodied in a program or software. The instructions may be stored in a memory location, such as the memory 1310. The instructions can be directed to the CPU 1305, which can subsequently program or otherwise configure the CPU 1305 to implement methods of the present disclosure. Examples of operations performed by the CPU 1305 can include fetch, decode, execute, and writeback.

The CPU 1305 can be part of a circuit, such as an integrated circuit. One or more other components of the system 1301 can be included in the circuit. In some cases, the circuit is an application specific integrated circuit (ASIC).

The storage unit 1315 can store files, such as drivers, libraries and saved programs. The storage unit 1315 can store user data, e.g., user preferences and user programs. The computer system 1301 in some cases can include one or more additional data storage units that are external to the computer system 1301, such as located on a remote server that is in communication with the computer system 1301 through an intranet or the Internet.

The computer system 1301 can communicate with one or more remote computer systems through the network 1330. For instance, the computer system 1301 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1301 via the network 1330.

Methods as described herein (such as one or more methods for particle analysis, image-free optical methods, or methods for identifying one or more target cells from a plurality of cells, as described herein) can be implemented by way of machine (e.g., computer processor) executable code stored on an electronic storage location of the computer system 1301, such as, for example, on the memory 1310 or electronic storage unit 1315. The machine executable or machine readable code can be provided in the form of software. During use, the code can be executed by the processor 1305. In some cases, the code can be retrieved from the storage unit 1315 and stored on the memory 1310 for ready access by the processor 1305. In some situations, the electronic storage unit 1315 can be precluded, and machine-executable instructions are stored on memory 1310.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1301 can include or be in communication with an electronic display 1335 that comprises a user interface (UI) 1340 for providing, for example, information to a user. Examples of UI's include, without limitation, a graphical user interface (GUI) and web-based user interface.

Methods and systems of the present disclosure can be implemented by way of one or more algorithms, such as one or more algorithms corresponding to one or more methods for particle analysis, image-free optical methods, or methods for identifying one or more target cells from a plurality of cells described herein. An algorithm can be implemented by way of software upon execution by the central processing unit 1305.

Methods and systems may be combined with or modified by other methods and systems, such as, for example, those described in WO2016136801 and WO2017073737, each of which is entirely incorporated herein by reference.

EXAMPLES

Example 1: Materials and Methods

All photomultiplier tubes used in this work were purchased from Hamamatsu Photonics Inc. In FIG. 2 and FIGS. 3B and 3C, the PMT signal was recorded using a $10^6$ Ohm resistance using an oscilloscope (8 bits, 1 GHz, Tektronix). PMTs having bandwidths of 10 MHz with built-in amplifiers (H10723-210MOD2) were used for detecting blue and green signals while another PMT (7422-40) connected to a current amplifier (HCA-40M-100K-C, FEMTO) was used to detect red signals.

Figure 3A:
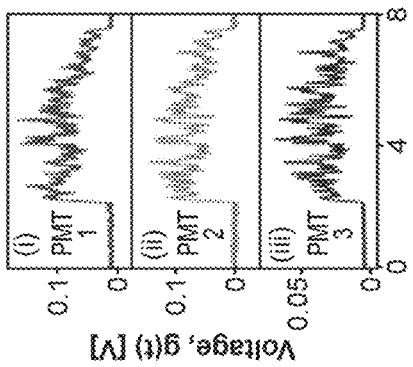
FIG. 3A shows an optical setup for multicolor motion-based compressive fluorescence imaging comprising a SD element.
Figure 3B:
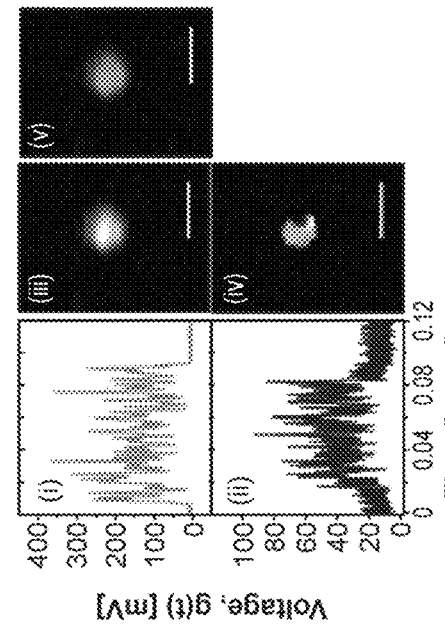
FIG. 3B shows an example of temporal waveforms associated with moving fluorescent cells that have been acquired using an optical setup for multicolor motion-based compressive fluorescence imaging.
Figure 3C:
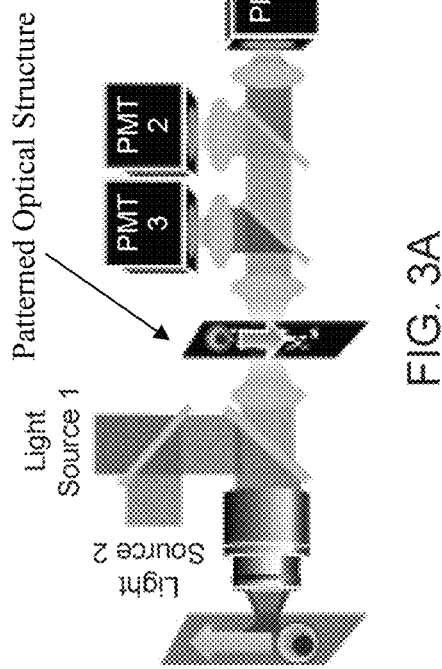
FIG. 3C shows an example of 2D fluorescence images of the moving fluorescent cells that have been computationally reconstructed from the temporal waveforms acquired by the optical setup for multicolor motion-based compressive fluorescence imaging.
Figure 3D:
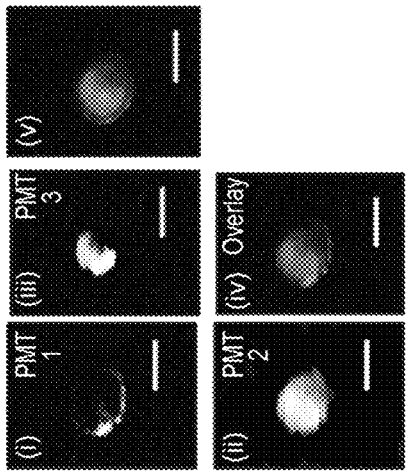
FIG. 3D shows an example of multicolor sub-millisecond fluorescence imaging of the cells under flow at a throughput rate greater than 10,000 cells/s.

In FIGS. 3D, 4, and 5, the PMT signal was recorded with electronic filters using a digitizer (M4i.4451 or M2i.4932-Expa, Spectrum, Germany) or a FPGA development board (TR4, Terasic) with an analog/digital converter (ADC, partially modified, Texas Instruments, AD11445EVM). The digitizer and/or FPGA continually collected a fixed length of signal segments from each color channel at the same time, with a fixed trigger condition applied to the green signals.

In FIGS. 17A-E, FIGS. 18A-F, and FIGS. 19A-19D, PMTs having a bandwidth of 10 MHz with a built-in amplifier (H10723-210 MOD2) were used to detect the GC signals, while PMTs having a bandwidth of 1 MHz (H10723-210 MOD3) or 10 MHz (H10723-210 MOD2) were used to detect fluorescence and side scattering (SSC) signals. Forward scattering (FSC) signals were obtained using a photodetector (PDA100A or PDA100A2, Thorlabs) .Tthe PMT signal was recorded with electronic filters using a digitizer (M4i.4451 or M2i.4932-Expa, Spectrum, Germany) or a FPGA development board (TR4, Terasic) with an analog/digital converter (partially modified, Texas Instrument, AD11445EVM). The digitizer and/or FPGA continually collected a fixed length of signal segments from each color channel at the same time, with a fixed trigger condition applied to the green signals.

Images of objects were reconstructed from the temporal signals measured using GC, as prescribed in equation (1), by solving the following optimization problem using the TwIST procedure (13):

$$\arg\min_i \|g - H(x,y)i\| + \tau R(i) \quad (2)$$

where g is the vector of the measured temporal signal, H(x, y) is the system matrix of GC, i is a vector reshaped from the input object image I, R is a regularizer with a sparsity, and $\tau$ is a constant for the regularization. $\|\cdot\|$ denotes $\ell_2$ norm. In CS, the image objects may be sparse in a regularizer space, which is incoherent with the randomized convolutional measurement process shown in Equation (1) (32).

In reconstructing the image in panel (i) of FIG. 3C, a wavelet transformation was chosen with the Fejer-Korovkin scaling filter as the regularizer (33). In reconstructing the other images, the total variation was chosen as the regularizer (34). The two-dimensional total variation $R_{TV}$ is written as $$R_{TV}(I) = \Sigma_x \Sigma_y \sqrt{(I_{x+1,y} - I_{x,y})^2 + (I_{x,y+1} - I_{x,y})^2} \quad (3)$$

The total variation enhances the smoothness while preserving the edges in the object's image. The TwIST codes with the wavelet transform or the total variation.

The reconstructed image I in panel (iv) of FIG. 3C was evaluated with the baseline image I' in panel (v) of FIG. 3C taken by an arrayed-pixel color camera based on the peak signal-to-noise ratio (PSNR). PSNR is calculated as:

$$PSNR(I, I') = 20 \cdot \log_{10} \frac{MAX(I')}{\sqrt{MSE(I, I')}} \quad (4)$$

where MAX(I') is the maximal pixel intensity in I' and MSE(I, I') is the mean square error between I and I'. A larger PSNR means better reconstruction and its maximal value is infinity.

All reagents were purchased from either Wako, Sigma-Aldrich or Invitrogen unless otherwise specified. D-PBS(-) (Wako) was used for phosphate buffer saline (PBS) solution.

Stem Fit AK02N (Ajinomoto) with all supplements and with 10 µM Y-27632 (Wako) and 0.25 µg/cm² iMatrix-511 silk (Nippi) was used as an induced pluripotent stem cell (iPSC) culture medium. Stem Fit AK02N without supplement C and with 10 µM SB431542 (Wako) and 10 µM DMH (Wako) was used as a neural progenitor cell (NPC) differentiation medium. Stem Fit AK02N without supplement C and with 10 ng/mL Activin A (Wako) and 3 µM CHIR99021 (Wako) was used as an endoderm differentiation medium. Stemsure DMEM (Wako) with 20% Stemsure Serum Replacement (Wako), 1% L-alanyl L-glutamine solution (Nacalai Tesque), 1% Monothioglycerol solution (Wako), 1% MEM non-essential amino acids solution (Nacalai Tesque) and 1% DMSO (Sigma-Aldrich) was used as a hepatoblast differentiation medium.

MCF-7 and MIA PaCa-2 cells were purchased from RIKEN BRC CELL BANK. Peripheral blood mononuclear cells (PBMCs) were purchased from Astarte Biologics, Inc. Jurkat cells, Y-79 retinoblastoma cells, and Raji cells were purchased from JCRB. T cells were purchased from ProMab. iPSCs were prepared as previously reported and can be purchased from Coriell Institute (GM25256).

MIA PaCa-2 cells were cultured in D-MEM (High Glucose) with L-Glutamine, Phenol Red and Sodium Pyruvate (Wako) with 10% FBS. Jurkat and Raji cells were cultured in RPMI-1640 with L-Glutamine and Phenol Red (Wako) with 10% and 20% FBS, respectively. Y-79 cells were cultured in RPMI 1640 medium (Gibco) with 20% FBS.

NPCs were differentiated from the iPSCs with the following procedures. iPSCs were seeded at 2,500 cells/cm² in iPS culture medium (day 0). On day 1, the medium was exchanged to NPC differentiation medium. The medium was changed to the same medium on day 3 and 5. On day 6, over 90% of the cells were PAX6-positive NPCs.

Hepatoblasts were differentiated from the iPSCs with the following procedures. iPSCs were seeded at 2,500 cells/cm² in iPS culture medium (day 0). On day 1, the medium was exchanged to endoderm differentiation medium. On day 3, the medium was changed to the same medium. On day 5, the medium was exchanged to hepatoblast differentiation medium, and the medium was changed to the same medium on day 7 and 9. On day 10, the cells showed AFP positive under an immunostaining test.

MIA PaCa-2 cells were detached from the culture flask using trypsin. Jurkat cells were taken out from the culture flask by pipetting. After washing with PBS solution, each of the types of cells were fixed with 4% paraformaldehyde PBS solution (Wako) for 15 min. The cells were subsequently washed with PBS solution. To the Jurkat cells, FITC mouse anti-human CD45 (BD Biosciences) was added and incubated for 30 min. The stained Jurkat cells were washed with PBS solution. Each of the types of cells were then mixed to be allowed to flow through the sorting system.

Either iPSCs, T cells, or raji cells were used for each experiment. Before detaching, the culture medium for the iPSCs were exchanged to 0.5 mM EDTA in PBS solution and incubated for 3 min. Then medium was exchanged back to iPSC culture medium, and the cells were detached using a cell scraper. T cells and raji cells were taken out from the culture flask by pipetting. After washing with binding buffer, the cells were stained with PI (Medical & Biological Laboratories) and Annexin V-FITC (Medical & Biological Laboratories) for 15 min and then allowed to flow through the system without washing. The cells were first gated using the FSC-SSC scatter plot to remove debris and then gated using the FSC height vs width scatter plot to remove doublets. The gated cells were further gated and labeled as alive, dead or apoptotic cells according to the fluorescence intensity of PI and Annexin V-FITC. 1,000 cells each selected randomly (without overlap) with equal number of undifferentiated and differentiated cells were used as training and testing data.

iPSCs, NPCs, and hepatoblasts were each detached from the culture flask using a cell scraper. After washing with buffer solution (1% FBS, X% EDTA in D-PBS), each were stained with Calcein AM (Dojindo) and rBC2LCN-635 (Wako) and then washed with buffer solution. For the classification of undifferentiated cells (iPSCs) and differentiated cells (NPCs or hepatoblasts), each of the cells were mixed at equal concentration. The mixed suspension was allowed to flow through the iSGC system. The cells were first gated using FSC-SSC scatter plot to remove dead cells and debris, then gated using the FSC height vs width scatter plot to remove doublets, and again gated using FSC-Calcein AM scatter plot to remove remaining dead cells. The gated cells were further gated and labeled as undifferentiated or differentiated cells according to the fluorescence intensity of rBC2LCN-635 and Calcein AM. 5,000 and 1,000 cells selected randomly (without overlap) with equal number of undifferentiated and differentiated cells were used as training and testing data, respectively.

The cells were flowed through either a quartz flow cell (Hamamatsu) or a PDMS microfluidic device using a customized pressure pump for the sheath fluid (IsoFlow, Beckman Coulter) and a syringe pump (KD Scientific) for the sample fluid. The quartz flow cell had a channel cross section dimension of 250 μm×500 μm at the measurement position, and when using this, the sheath flow was driven at a pressure of about 25 kPa unless otherwise noted. The PDMS device had a channel cross section dimension of 50×50 μm at the measurement position, and when using this, the sheath flow was driven at a pressure of about 170 kPa unless otherwise noted. The sample fluid was driven at a flow rate of 20 μL/min unless otherwise noted.

Before cell-staining, the number of cells was adjusted to be about $8 \times 10^6$ cells per test by using cell counter chips. After staining, the concentrations of the cells were adjusted to prepare cell suspensions of about $1 \times 10^6$ cells/mL in PBS. When staining MCF-7 cells in multiple colors (as shown in FIGS. 3B-D), their membranes were first labeled with PE-CF594-EpCAM (BD, PE-CF594 mouse anti-human CD326 antibody) by adding 100 μL of 0.5% BSA in PBS and then 5 μL of the PE-CF594-EpCAM antibody solution, followed by incubation for 15 min at room temperature. After fixing the cells using formaldehyde, the cells' nuclei were labeled with DAPI (Invitrogen, DAPI nucleic acid stain) by adding 2 mL of the 3-60 μM DAPI stock solution in PBS to cell pellets and incubating them for 15 min at room temperature. After rigorous washing of the cells with PBS, the cytoplasm was finally labeled with FG (Thermo Fisher Scientific, LIVE/DEAD® Fixable Green Dead Cell Stain Kit, for a 488-nm-wavelength excitation) by adding 200 μL of 1% Tween 20 in PBS and then 5 μL of FG fluorescent reactive dye solution to the cell pellets and incubated for more than an hour at room temperature. For cell imaging, the cell suspension was sandwiched between a pair of cover slides to fix the cells' positions and mounted the sample onto an electronic stage (Sigma Koki, Japan) for moving the cells in the desired direction at a constant speed of 0.2 mm/s.

Figure 4C:
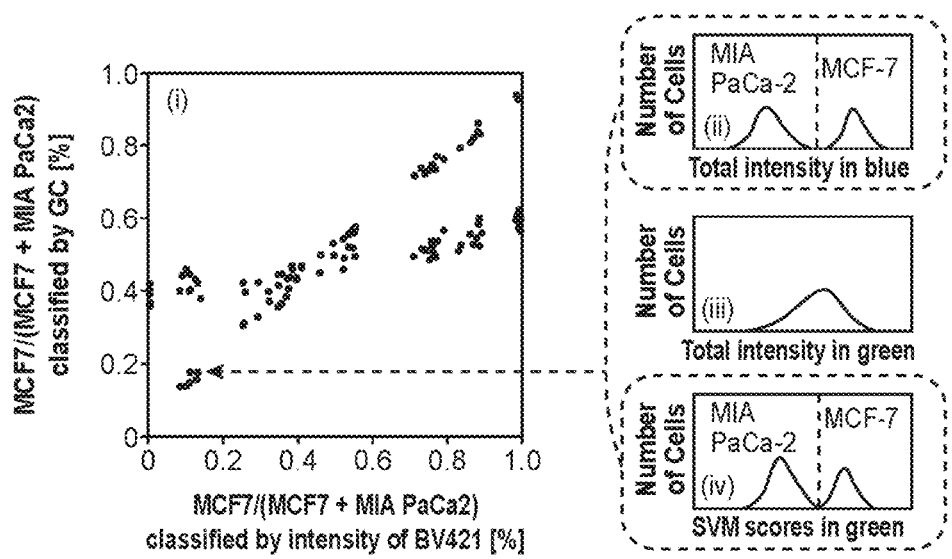
FIG. 4C shows an example of concentration ratios of MCF-7 cells in a variety of samples.
Figures 4D, 4E:
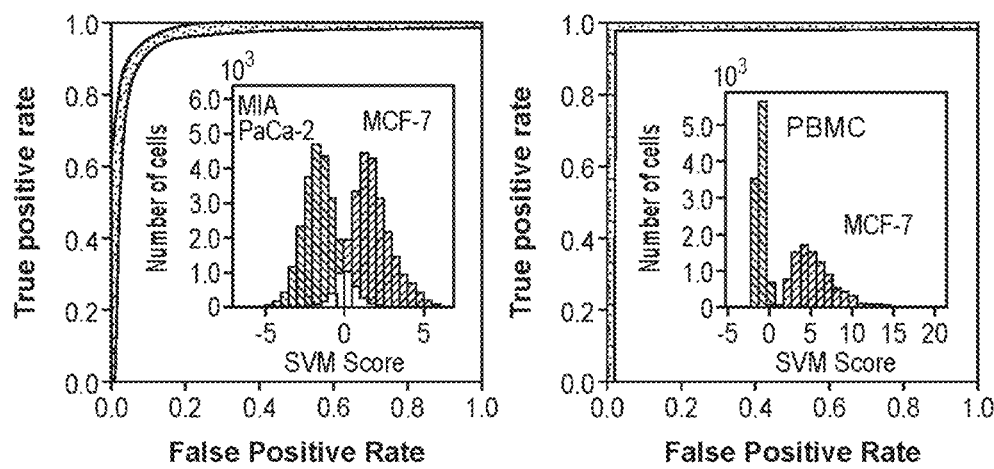
FIG. 4D shows an example of a correlation between the true and false positive rates associated with the classifier model.
FIG. 4E shows an example of a correlation between the true and false positive rates associated with the classifier model based on the ability to classify model cancer (MCF-7) cells against a complex mixture of peripheral blood mononuclear cells.

In the image-free GC analysis experiment shown in FIGS. 4C-4E, the cytoplasm of all MCF-7, MIA PaCa-2 cells and PBMCs was labeled in green using FG. The reaction time and dye concentrations were adjusted so that the total fluorescence intensity was comparable between different cell types. This confirmed that accurate classification was due to the morphological information but not due to the total intensity. The membranes of MCF-7 cells were labeled for blue emission using BV421-EpCAM (BV421-conjugated mouse anti-human CD326 antibody, BD) by adding 420 μL of 0.5% BSA in PBS and 80 μL of the BV421-EpCAM antibody solution to the cell pellets after fixation with formaldehyde, followed by incubation for 2 hours at room temperature.

In the image-free GC sorting experiment of classifying MCF-7 and MIA PaCa-2 cells (as shown in FIG. 5B), the membranes of MCF-7 cells were labeled for blue emission using BV421-EpCAM in the same manner as described above. In the experiment of classifying MIA PaCa-2 cells and PBMCs (as shown in FIG. 5C), the cytoplasm of MIA PaCa-2 cells was labeled for blue emission using a primary mouse monoclonal anti-pan cytokeratin AE1/AE3 antibody (Abcam) and a secondary AF405-conjugated donkey anti-mouse IgG antibody (Abcam). This staining was carried out by first adding 450 μL of 0.5% Tween 20 and 0.5% BSA in PBS and 50 μL of the primary antibody solution to the pellets of fixed cells followed by overnight incubation at 4° C., and then adding 490 μL of 0.5% Tween 20 and 0.5% BSA in PBS and 10 μL of the secondary antibody solution followed by incubation for an hour at room temperature. The cytoplasm of MCF-7, MIA PaCa-2 cells, and PBMCs was labeled in green using FG after the above immunostaining in the both experiments. The reaction time and dye concentrations were adjusted so that the total fluorescence emission intensity was comparable between different cell types. The cells were rigorously washed after each staining process.

In FIG. 4, for training the model, a training data set of the temporal waveforms was collected by separately flowing each cell type (MCF-7 and MIA PaCa-2) through the optical structure using syringe pumps (Harvard) and a customized high-pressure pump. Constructing a model that is sufficiently generalized to avoid overfitting is a key to making reliable predictions on the untrained signals. For this purpose, a variety of temporal waveforms were collected by changing the flow rate of inner fluids while maintaining that of outer fluids: the inner flow rate was varied at 20 μL/min and 30 μL/min, while the outer flow rate was driven at the pressure of 180 kPa. Before testing the model, a mixed solution of MCF-7 and MIA PaCa-2 cells was prepared, at different concentration ratios. In experimentally testing the model, the inner flow rate was maintained at 20 μL/min. Throughout training and testing of the SVM-model, the centerline of the cells' flow stream was maintained in the same position. Lastly, the same conditions were applied to the demonstration of the cancer cell detection from the complex PBMCs.

All signals were detected using the PMTs, collected and converted using the ADC board, and processed using Python. In preparing the data set, waveforms of flowing single objects were selectively collected by thresholding based on an average level of the whole signals recorded for training. The SVM with the radial basis function (RBF) used in this study estimates the label of the input temporal signal/waveform g by calculating the following scoring function f:

$$f(g)=b+\Sigma_{j=1}^{N}a_{j}y_{j}exp[-\gamma\|g-g_{j}\|^{2}] \quad (5)$$

where $a_j$ ($0 \leq a_j \leq C$) and $y_j$ are the trained coefficient and the class label for the j-th trained temporal signal $g_j$, b is the bias term, γ is the kernel scale parameter, N is the number of trained temporal signals, and C is the regularization coefficient. C and γ was optimized by a grid search. For the high throughput processing in the FPGA, N and the length of g were adjusted in an offline computer depending on the biological samples and the classification purposes.

For classification of cells, the support vector machine (SVM) technique used either linear or radial basis function kernels. Hyperparameters in the SVM were tuned by grid search. Except where otherwise noted, training and validation was performed using equal mixtures of cell types for each class label and accuracies, ROC curves, and ROC-AUCs were validated with 10 times random sampling and presented with the mean and standard deviation of the 10 trials.

Example 2: Estimation of Sensitivity of Ghost Cytometry

For the overall system, the minimal number of detectable fluorophores can be estimated as following under assumptions that the model fluorophores are fluorescein molecules, PMTs can detect a single photon, fluorophores are far from light-saturation, and optical losses through the dichroic mirrors and bandpass filters are negligible.

The minimal number of the detectable fluorophore molecules is given by:

$$e \times N_s = e \times N_f \times (r_p \times t) \times q \times (t \times r_t) \approx N_f \times 0.35$$

The efficiency of photon collection in the experimental set-up is given by:

$$e = \frac{1}{2}(1 - \cos(\sin^{-1} a))$$

The numerical aperture a=0.75. The number of emitted fluorescent photons when a group of fluorophores passes through a unit spot defined by the random optical pattern is given by $N_s$. The number of the fluorophores is given by $N_f$. The photon absorption rate per molecule is given by:

$$r_p = f \times s$$

The incident photon flux is given by:

$$f = 43[\mu W/\mu m^2] = 1.06 \times 10^{14} [\text{photons at 488 nm}/\mu m^2],$$

The incident photon flux into the bright spot of the structured illumination in the sample plane is given by f. The absorption cross section is given by: $s=1.5 \times 10^{-20} [m^2]$ (35). The quantum efficiency is given by: q=0.95 (36). The exposure time is given by:

$$t = \frac{1}{10,000[\text{cells}/sec] \times \text{number of pixels in flow}} = 100[\mu sec]/1,350[\text{pixels}] = 0.0741[\mu sec/\text{pixel}]$$

The turnover rate (1/lifetime) is given by: $r_t = \frac{1}{4}$ [1/nsec] (37). Thus, about three fluorophores ($N_f \sim 3$) are required in the ideal case.

Example 3: Motion-Based Compressive Fluorescence Imaging

FIGS. 2A-2G show a demonstration of motion-based compressive fluorescence imaging. Optical setups for the SI and SD modes, are depicted in FIG. 2A and FIG. 2B, respectively. Aggregates of fluorescence beads were moved on a glass cover slip across the optical structure using an electronic translational stage. As shown in FIG. 2C, in the case of the SI mode, the beads go through the structured illumination according to the motion, resulting in the generation of the temporal waveform of the fluorescence intensity. As shown in FIG. 2D, from this acquired temporal signal, a 2D fluorescence image is computationally reconstructed. As shown in FIG. 2E, in the case of the SD mode, the beads are illuminated by uniform light. A conjugate fluorescence image of the beads then passes through structured pinhole arrays, resulting in the generation of the temporal waveform. As shown in FIG. 2F, from this temporal signal, a 2D fluorescence image is computationally reconstructed. FIG. 2G shows a fluorescence image of the same aggregated beads, acquired using an arrayed pixel camera.

As an experimental proof-of-concept of GC in imaging mode, fluorescence beads mounted on a glass coverslip were imaged and moved across a random or pseudo-randomly patterned optical structure using an electronic translational stage. The beads were kept in focus as they moved in the direction parallel to the row direction of H(x, y). Incorporating the patterned optical structure in the optical path before or after the sample is mathematically equivalent. This means that GC-based imaging can be experimentally realized either by randomly pseudo-randomly structured illumination (as shown in FIG. 2A) or random structured detection (as shown in FIG. 2B). These configurations correspond to computational ghost imaging and single pixel compressive imaging, respectively. The encoding operator H(x, y) in equation (1) in the SI mode can be experimentally measured as the excitation intensity distribution in the sample plane. On the other hand, the operator H(x, y) in the SD mode can be measured as the point-wise product of the excitation intensity distribution in the sample plane and the transmissibility distribution of the photo-mask in the conjugated plane between the sample and detector. The exact operator H(x, y) can be experimentally calibrated by placing a thin sheet of a fluorescent polymer in the sample plane and measuring its intensity distribution using a spatially resolved multi-pixel detector. An incoherent blue light-emitting diode (LED) was used as an excitation light source. During the object's motion, the PMT collected the photons that were emitted from the object as temporally modulated fluorescence intensity (as shown in FIGS. 2C and 2E for the SI and SD modes, respectively). FIGS. 2D and 2F show the computationally recovered fluorescence images of multiple beads, for each waveform. For comparison, FIG. 2G shows the image acquired using an arrayed detector-based scientific complementary metal-oxide semiconductor (CMOS) camera. The morphological features of the beads are clear, validating GC imaging in both the SI and SD modes.

Example 4: Multi-Color, High-Throughput Fluorescence Cell Imaging

Figure 7:
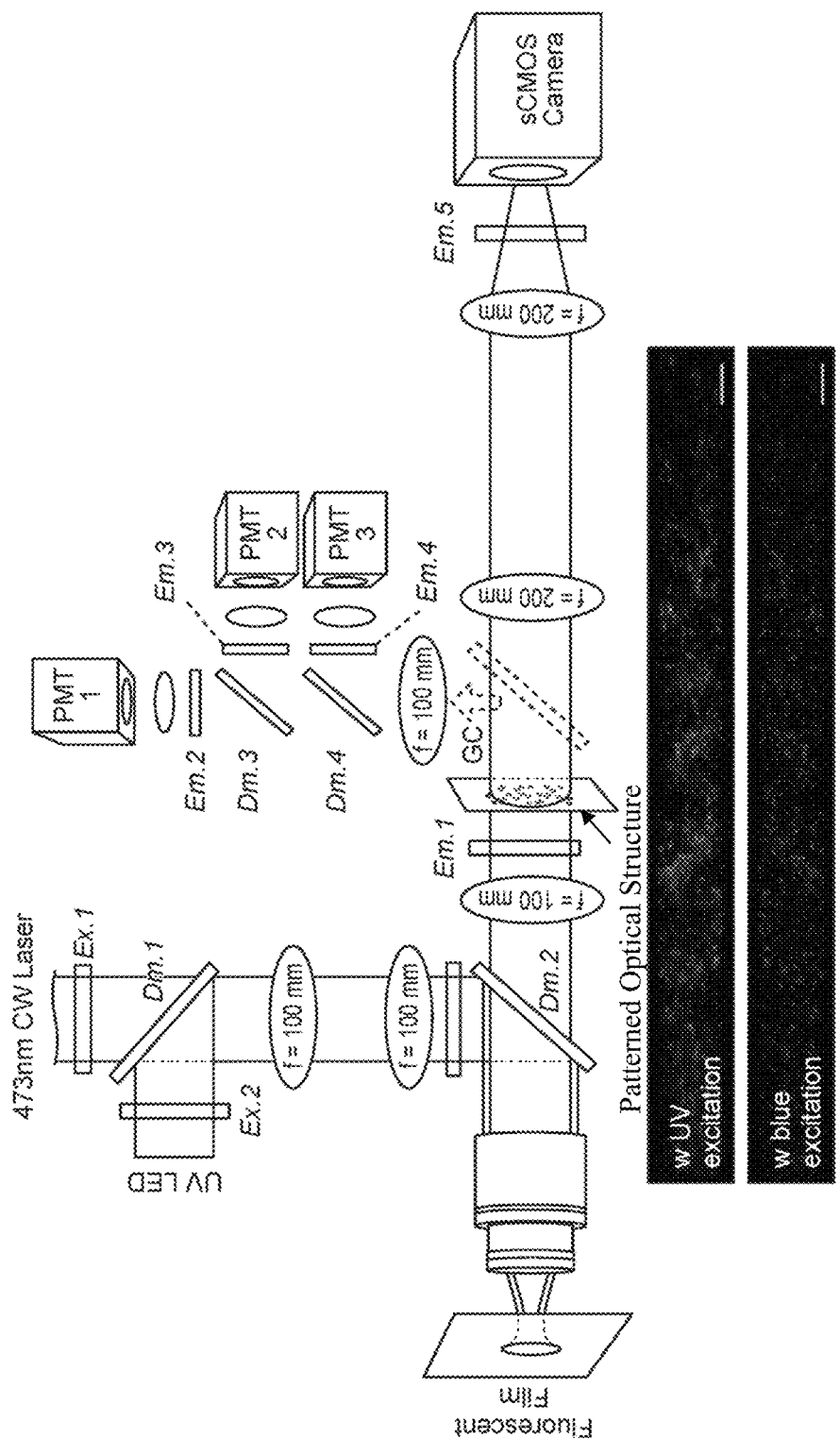
FIG. 7 shows an example of an optical setup and calibrated intensity distribution of an optical encoders used for demonstrating GC-based multicolor fluorescence imaging of cells.

FIGS. 3A-3D show a demonstration of multi-color and high-throughput fluorescence cell imaging by GC. FIG. 3A shows an optical setup for the multicolor motion-based compressive fluorescence imaging (SD mode). The set-up utilized a coherent 473-nm-wavelength blue laser and an incoherent 375-nm-wavelength UV LED as excitation light sources coupled by a dichroic mirror (FIG. 7). The experiment used cultured MCF-7 cells, with membranes, cytoplasm, and nuclei fluorescently stained in red, green, and blue, respectively. When the labeled cells moved with an electronic translational stage, their conjugated images passed through the optical encoder and generate temporal waveforms. The signals were then split into three-color channels of (i) red, (ii) green, and (iii) blue using dichroic mirrors, and finally recorded by different PMTs, with representative traces shown in FIG. 3B. As shown in FIG. 3C, from the temporal signals for each PMT, fluorescence images of labeled cells were computationally recovered in red (panel (i) of FIG. 3C), green (panel (ii) of FIG. 3C), and blue (panel (iii) of FIG. 3C), respectively. Panel (iv) of FIG. 3C shows a pseudo-colored multicolor image combined from panels (i), (ii), and (iii) of FIG. 3C. Panel (iv) of FIG. 3C shows a multicolor fluorescence image acquired using an arrayed-pixel color camera. Multicolor sub-millisecond fluorescence imaging of the cells under flow at the throughput rate above 10,000 cells/s is shown in FIG. 3D. In the experiment, 488-nm-wavelength blue laser and 405-nm-wavelength violet lasers passed through diffractive optical elements to generate the random structured illumination to the cell stream. Panels (i) and (ii) of FIG. 3D show the green and blue fluorescence signals from the cytoplasm and the nucleus, respectively. From the temporal signals for each PMT, fluorescence images of the labeled cells were computationally recovered in green (panel (iii) of FIG. 3D) and blue (panel (iv) of FIG. 3D), respectively. Panel (v) of FIG. 3D shows the reconstructed multicolor fluorescence image.

The simple design of the GC optics means that adding multiple light sources, dielectric mirrors, and optical filters enables multi-colored fluorescence imaging with a single photo-mask, as shown in FIG. 3A. To validate GC for cell imaging, MCF-7 cells (human cell line derived from breast adenocarcinoma) were stained in 3 colors—the membranes, the nuclei, and the cytoplasm were stained with red (Ep-CAM PE-CF594), blue (DAPI), and green (FG: fixable green) dyes, respectively. Stained cells were mounted on a glass cover-slip. A coherent blue continuous wave (CW) laser and incoherent ultraviolet (UV) LED light sources were used for exciting the fluorophores. The SD mode was used and the operator H(x, y) was experimentally estimated for each excitation light source. In the experiment, the stage on which the coverslip was mounted was moved and the temporal signals from each color channel were measured using three PMTs, respectively. The computationally reconstructed fluorescence images for each color clearly reveal the fine features of cellular membranes, cytoplasm, and nuclei. For comparison, panel (iv) of FIG. 3C shows an overlaid color image and panel (v) of FIG. 3C shows a fluorescence image acquired using a conventional color camera (Waycam SR 130, WRAYMER Inc., Japan). The average of peak signal-to-noise ratios, which are calculated according to equation (8), of the red, green, and blue channels is 26.2 dB between the GC's reconstructed image (as shown in panel (iv) of FIG. 3C) and the camera image (as shown in panel (v) of FIG. 3C). These results demonstrate a good performance of multi-color GC imaging in delineating the morphological features of cells.

GC can also achieve fast multi-color continuous fluorescence imaging of flowing cells. A flow cell assembly (Hamamatsu Photonics, Japan) for focusing a stream of flowing fluorescent cells in the three-dimensional space can be used so that the cells are focused in the plane perpendicular to the flow aligned parallel to the length direction of the encoder H(x, y). Using diffractive optical elements that generate structured illuminations inside a flow cell, continuous spread optical point scans of 100 pixels were performed perpendicular to the flow, corresponding to the image size in the y-direction in the computational reconstruction. Panels (i) and (ii) of FIG. 3D show the temporal waveforms from each color channel of a single MCF-7 cell, with its cytoplasm labeled by FG and its nucleus labeled by DAPI. Fluorescence images were computationally reconstructed for each waveform in panels (iii) and (iv) of FIG. 3D, respectively. Panel (v) of FIG. 3D shows the computationally reconstructed multi-color fluorescence image, with clearly resolved cellular morphological features. The cells were flowed at a throughput higher than 10,000 cells/s, a rate at which arrayed pixel cameras such as charge-coupled devices (CCDs) and CMOSs create completely motion-blurred images. The total input excitation intensities of the structured illuminations after the objective lens were ~58 mW and ~14 mW for 488 nm and 405 nm lasers, respectively, whereas those assigned to individual random spots were <43 µW and <10 µW on average, respectively. By designing and adopting the appropriate DOEs, the light pattern was created with minimal loss, suggesting high sensitivity of GC imaging, calculated as the minimal number of detectable fluorophores (as detailed in Methods), close to single molecule levels.

Using the object's motion across the light pattern H(x, y) for optical encoding and sparse sampling, blur-free, high frame-rate imaging was achieved with high signal-to-noise ratio. The frame rate r and the pixel scan rate p are defined as:

$$r = v/(\text{width}(H(x, y)) + \text{width}(I)) \quad (6)$$

$$p = v/(\text{single spot size in H}) \quad (7)$$

where I is the final image and the p is the inverse of the time taken for a fluorophore to pass over each excitation spot in H(x, y). First, compressive encoding reduces the number of sampling points, defined by the length of H(x, y) and required for one frame acquisition, such that the required bandwidth for achieving high frame rates is effectively lowered. This reduction is important, especially in ultrafast imaging with a small number of photons, because shot noise increases as the bandwidth increases. This feature allows us to effectively reduce the excitation power for the fluorescence signals to overcome noise. Second, at a sufficient signal to noise ratio, GC is able to take full advantage of the high bandwidth of single-pixel detectors as H(x, y) may be temporally static, unlike in the other techniques that temporally modulate the excitation intensity before the object passes through a pixel of excitation light. Consequently, GC yields blur-free images, unless the pixel scan rate surpasses at least twice the bandwidth rate of the PMT. For example, for H(x, y) having a spot size of 500 nm and a PMT having a high bandwidth of 100 MHz, GC provides blur-free images for flow rates of up to 100 m/s.

Example 5: Machine Learning Classification of Fluorescently Labeled Cells

FIGS. 4A-4E show high-throughput and highly accurate fluorescence image-free "imaging" cytometry by GC via direct machine learning of compressive signals. FIG. 4A illustrates a procedure for training a classifier model in GC. Panel (i) of FIG. 4A shows that different but morphologically similar cell types (MCF-7 and MIA PaCa-2 cells) were fluorescently labeled. For both cell types, the cytoplasm was stained in green by FG and the membrane of only the MCF-7 cells were stained in blue by BV421-EpCAM. Scale bars=20 µm. Panel (ii) of FIG. 4A shows separately flowing the different cell types through the encoding optical structure used in FIG. 3D at the throughput rate of >10,000 cells/s. Panel (iii) of FIG. 4A shows compressive waveforms of each cell type collectively extracted from the temporally modulated signals of fluorescence intensity. Panel (iv) of FIG. 4A shows a library of waveforms labeled with each cell type that was used as a training data set to build a cell classifier. A support vector machine model was used in this work. FIG. 4B illustrates a procedure for testing the classifier model. Panel (i) of FIG. 4B shows that the different types of cells were experimentally mixed at a variety of concentration ratios before analysis. Panel (ii) of FIG. 4B shows flowing of the cell mixture through the encoder at the same throughput rate. Panel (iii) of FIG. 4B shows the application of the trained model directly to the waveform for classifying the cell type. As shown in panel (i) of FIG. 4C, blue plots are the concentration ratios of MCF-7 cells in each sample estimated by applying the trained SVM-based classification directly on the waveforms of FG intensity (shown in detail in panel (iv) of FIG. 4C), compared with those obtained by measuring the total intensity of BV421 (shown in detail in panel (ii) of FIG. 4C). Red plots are the concentration ratios of MCF-7 cells estimated by applying the same procedure of SVM-based classification to the total FG intensity: applying the trained SVM-based classification to the total FG intensity (shown in detail in panel (iii) of FIG. 4C) compared with the measured total intensity of BV421. 70 samples were measured for a variety of concentration ratios, with each sample comprising 700 tests of randomly mixed cells. The image-free GC results (shown with blue plots in panel (i) of FIG. 4C), reveal a small root-mean-square error (RMSE) of 0.046 from y=x, and an area under a receiver operating characteristic (ROC, shown in FIG. 4D) curve (AUC) of 0.971 over about fifty thousands of cells, even though the morphologies of these cells appear similar to the human eye. Each point on the ROC curve corresponds to a threshold value applied to scores from the trained SVM model, wherein red and blue colors in the histogram are labeled according to the intensity of BV421. In contrast, the red plots in panel (i) of FIG. 4C reveal inferior classification results, with large RMSD of 0.289 and poor ROC-AUC of 0.596. As shown in FIG. 4E, in classifying the model cancer (MCF-7) cells against a complex mixture of peripheral blood mononuclear cells (PBMC), the ultrafast image-free GC recorded high values of AUC ~0.998, confirming its robust and accurate performance in practical uses.

In addition to the use of GC as a powerful imager, direct analysis of compressively generated signals from GC enables high throughput and accurate classification of a cell's morphology at significantly lower computational cost compared to other imaging methods, leading to the realization of ultrafast fluorescence "imaging"-activated cell analysis and sorting (FiCS). This can be achieved because compressive sensing in GC significantly reduces the size of the imaging data while retaining sufficient information for reconstructing the object image. Although human recognition is not capable of classifying the waveforms directly, machine learning methods may analyze the waveforms without image generation. Supervised machine learning directly applied to waveforms measured at the rate of ~10,000 cells/sec classified fluorescently labeled cells with high performance surpassing those of existing flow cytometers and human image recognition. Moreover, this image-free GC can be integrated with a microfluidics sorting system to make possible real-time FiCS.

Figure 10A:
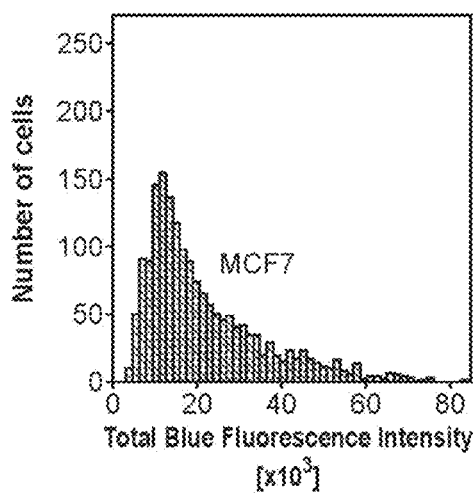
FIG. 10A shows an example of a histogram of the total blue fluorescence intensity of MCF-7 cells.
Figure 10B:
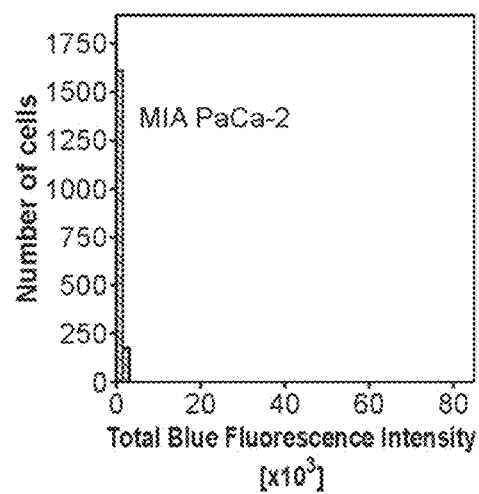
FIG. 10B shows an example of a histogram of the total blue fluorescence intensity of MIA PaCa-2 cells.
Figure 10C:
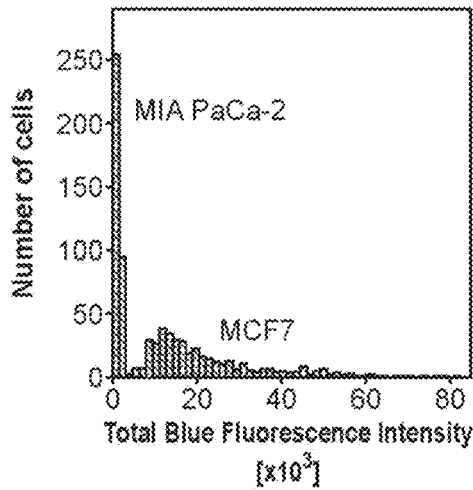
FIG. 10C shows an example of a histogram of the total blue fluorescence intensity of an example of a mixture of MCF-7 and MIA PaCa-2 cells.

Image-free GC may comprise two steps: 1) training and 2) testing a model of cell classification. A model was built based on the support vector machine (SVM) technique (23) by computationally mixing the waveforms of fluorescence signals from different cell types. This training data of waveforms was collected by experimentally passing each cell type separately through the optical encoder. The model was then tested by flowing experimentally mixed cells and classifying the cell types. Before the experiment, two different types of cells were cultured, fixed, and fluorescently labeled: MCF-7 cells and MIA PaCa-2 cells, as shown in panel (i) of FIG. 4A. For both cell types, the cytoplasm was labeled in green using FG for classification by image-free GC, as shown in panel (i) of FIG. 4A. On the other hand, the membranes were labeled in blue using BV421-EpCAM only in MCF-7 cells. MIA PaCa-2 cells had only low autofluorescence in the blue channel, providing easily distinguishable contrast in this channel, as shown in FIGS. 10A-10C. This was used to validate the GC's classification that relied on similar cytoplasmic labeling in both cell types. Both violet and blue CW lasers were used for exciting these fluorophores while a digitizer (M4i.4451, Spectrum, Germany) recorded the resultant signals from the PMTs. A microfluidic system was developed to spatially control the position of the stream of cells with respect to the random optical structure, corresponding to the cell's position in the reconstructed images. Using this optofluidic platform, waveforms of green fluorescence intensity were collected from the cytoplasm for each cell type. From this training data set, SVM-based classifiers with no arbitrary feature extraction were built. For testing this trained classifier, a series of solutions containing a combination of different cell types mixed at various concentration ratios were introduced. Each classifier then identified ~700 waveforms of the mixed cells as a single data set and estimated the concentration ratios for each. A combination of MCF-7 and MIA PaCa-2 were used, so that the classification results could be quantitatively scored by measuring the total fluorescence intensity of BV421 at the membrane of MCF-7 cells.

Figure 11:
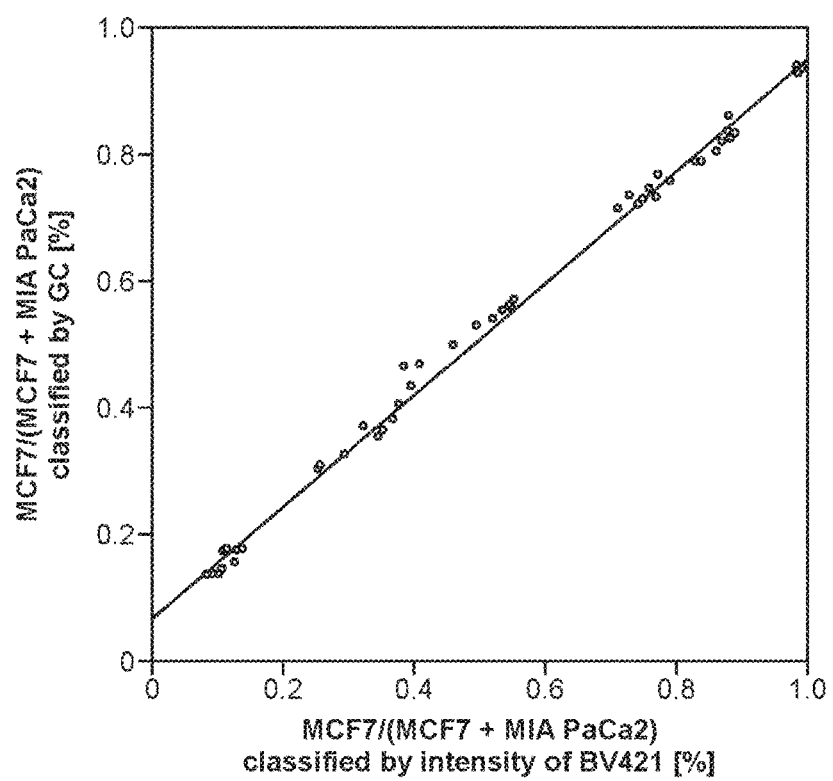
FIG. 11 shows an example of confirmation of consistent accuracy of classification using a support vector machine (SVM)-based machine learning classifier over a wide range of concentration ratios.

A plot of the concentration ratio of MCF-7 and MIA PaCa-2 cells measured using the blue fluorescence intensity versus that measured by applying the model to the green fluorescence waveform gives a line on the diagonal, with a small root-mean-square error (RMSE) of 0.046 from y=x. Using the BV421's measurement to evaluate the GC-based classification of ~49,000 mixed cells gave an area under a receiver operating characteristic (ROC) curve (AUC) of 0.971, confirming that cell classification by GC is accurate. Each point on the ROC curve corresponds to a threshold value applied to the score obtained from the trained SVM model, wherein red and blue colors in the histogram are labeled according to the intensity of BV421 in FIG. 4D. To confirm that the high performance of GC is due to the spatial information encoded in the waveforms, the same procedure of SVM-based classification was applied to the total green fluorescence intensity obtained by integrating each GC waveform over time. The results seen as red plots in FIG. 4C gave a poor ROC-AUC of 0.596 and a large RMSE of 0.289 from y=x, and thus show little contribution of the total fluorescence intensity to the high performance of GC. In addition, by computing a simple linear fit (as shown in FIG. 11), it was confirmed that the SVM-based classification consistently retains its accuracy over a wide range of concentration ratios. Therefore, image-free GC is an accurate cell classifier even when the targeted cells are similar in size, total fluorescence intensity, and apparent morphological features, and are present in mixtures at different concentrations. Indeed, in the absence of molecule-specific labeling, classifying such similar cell types has been a significant challenge for previous cytometers and even for human recognition.

Besides classifying two cell types sharing similar morphology, GC is able to accurately classify a specific cell type from a complex cell mixture at high throughput. Such technology is important, for example, in detecting rare circulating tumor cells (CTCs) in the peripheral blood of patients (24-27). The workflow of the image-free GC for classifying model cancer cells (MCF-7) from peripheral blood mononuclear cells (PBMCs from Astarte Biologics, Inc), a heterogeneous population of blood cells including lymphocytes and monocytes was applied. Again, the cytoplasm of all the cells was labeled in green using FG for classification by image-free GC, while the membranes of only MCF-7 cells were labeled in blue using BV421-EpCAM to validate the GC classification result. The classifier SVM model was first trained by experimentally collecting the green fluorescence waveforms for labeled MCF-7 and PBMC cells and computationally mixing them. This model was then tested by flowing experimentally mixed cells and classifying their cell types one by one. All signals were measured at a throughput greater than 10,000 cells/sec. For training the model, 1,000 MCF-7 cells and 1,000 PBMCs were used. For testing the model, 1,000 cells from a random mixture of MCF-7 cells and PBMCs were used.

After performing cross validations ten times, the AUC recorded 0.998 for the SVM-based classifier of the GC waveforms. FIG. 4E shows one of the ROC curves, proving the ability of ultrafast and accurate detection of the specific cell type from the complex cell mixture.

Example 6: Ultrafast Accurate Cell Sorting

FIGS. 5A-5C show a demonstration of machine learning-based fluorescence "imaging"-activated cell sorter (FiCS). As shown in the left panel of FIG. 5A, a microfluidic device may include three functional sites. A flow stream of cells was first focused by 3D hydrodynamic flow-focusing, then experienced the random structured light illumination, and finally arrived at a sorting area. Upon sorting action, a lead zirconate titanate (PZT) actuator was driven by input voltages and bent to transversely displace a fluid towards the junction for sorting the targeted cells into a collection outlet. As shown in the right panel of FIG. 5A, for real-time classification and selective isolation of the cells, analogue signals measured at PMTs were digitized and then analyzed at a FPGA in which the trained SVM-based classifier was implemented. When a classification result was positive, the FPGA sent out a time-delayed pulse that consequently actuated the PZT device. Experiments were performed at a throughput rate of ~3,000 cells per second. The cytoplasm of all MIA PaCa-2, MCF-7, and PBMC cells, was labeled in green using FG. The membranes of MCF-7 cells in (as shown in FIG. 5B) and cytoplasm of MIA PaCa-2 cells in (as shown in FIG. 5C) were labeled in blue using BV421-conjugated EpCAM antibodies and anti-pan cytokeratin primary/AF405-conjugated secondary antibodies, respectively.

FIG. 5B shows accurate isolation of MIA PaCa-2 cells against morphologically similar MCF-7 cells. GC directly classified the green fluorescence waveforms without image reconstruction. Panel (i) of FIG. 5B shows a histogram of maximum blue fluorescence intensity measured for the cell mixture, showing the MIA PaCa-2's purity of 0.626, while panel (ii) of FIG. 5B shows a histogram of maximum blue fluorescence intensity for the same mixture after applying the FiCS, showing the MIA PaCa-2's purity of 0.951. Dashed lines corresponding to a threshold value of 0.05 was used to distinguish the populations of the two cell types.

FIG. 5C shows accurate isolation of model cancer (MIA PaCa-2) cells against a complex mixture of PBMCs. Panel (i) of FIG. 5C shows a histogram of maximum blue fluorescence intensity measured for the cell mixture, showing the MIA PaCa-2's purity of 0.117, while panel (ii) of FIG. 5C shows a histogram of maximum blue fluorescence intensity for the same mixture after applying the FiCS, showing the MIA PaCa-2's purity of 0.951. Dashed lines correspond to a threshold value of 40, which was used to distinguish the populations of the two cell types.

Reducing the data size by compressive sensing and avoiding image reconstruction in GC shortens the calculation time required for classifying the single waveform. By combining this efficient signal processing with a microfluidic system, an ultrafast and accurate cell sorting based on real-time analysis of "imaging" data was realized. The ability of isolate a specific cell population from another population of morphologically similar cells and from a complex cell mixture was demonstrated at high throughput and high accuracy. The left panel of FIG. 5A shows a microfluidic device made of polydimethylsiloxane. Three functional sites were designed, as shown in FIG. 12A. First, a flow stream of cells was focused into a tight stream by a 3D hydrodynamic flow-focusing (28, 29) structure, as shown in FIG. 12B. The cells then experienced the random structured light illumination of GC and finally arrived at a sorting junction. A lead zirconate titanate (PZT) actuator was connected to this junction through a channel directed in a direction perpendicular to the main flow stream, as shown in FIG. 12C. For sorting action, the actuator was driven by an input voltage to bend and transversely displace a fluid towards the junction to sort the targeted cells into a collection outlet. As shown in FIG. 5A and FIG. 12D, for the real-time classification and selective isolation of the cells, their fluorescence signals were recorded as analog voltages by PMTs and were digitized by an analog-to-digital converter and then analyzed by a field programmable gate array (FPGA, Stratix IV, Altera). The SVM-based classifier was implemented in advance. When the FPGA classified the cell of interest as positive, it sent out a time-delayed pulse that consequently drove the PZT actuator in the chip. The computation time in the FPGA for classifying each compressive waveform was short enough (<10 μsec) to enable reproducible sorting. Through the experiment, the length of the GC waveform was maintained at about 300 μsec, corresponding to a throughput of approximately 3,000 cells per second. After measuring the green fluorescence waveforms of positive and negative cells with their labels made by the maximum blue fluorescence intensity, the classifier model was built in a computer offline and implemented in the FPGA. In the experiment, the cytoplasm of all the MIA PaCa-2, MCF-7, and PBMC cells was labeled in green using FG, and in addition, the membranes of MCF-7 cells (as shown in FIG. 5B) and cytoplasm of MIA PaCa-2 cells (as shown in FIG. 5C) were labeled in blue using BV421-conjugated EpCAM antibodies and anti-pan cytokeratin primary/AF405-conjugated secondary antibodies, respectively.

The integrated FiCS enabled accurate isolation of MIA PaCa-2 cells from MCF-7 cells, which are similar in size, total fluorescence intensity, and apparent morphology. 200 waveforms of MIA PaCa-2 cells and 200 of MCF-7 cells were used for training the SVM model. The two cell types were mixed and their maximum blue fluorescence intensities were measured using a home-built flow cytometer (analyzer), yielding two distinct peaks corresponding to the two cell types appeared in the histogram (as shown in panel (i) of FIG. 5B). After the machine learning-driven FiCS was applied to the same cell mixture by classifying the green fluorescence waveforms, the maximum blue fluorescence intensity of the sorted mixture was measured in the same manner. As a result, the peak at stronger intensity, corresponding to MCF-7 cells, disappeared and the purity of MIA PaCa-2 cells increased from 0.625 (as shown in panel (i) of FIG. 5B) to 0.951 (as shown in panel (ii) of FIG. 5B). This confirmed that, with just the use of cytoplasmic staining (FG) alone, which does not specifically label the targeted molecules, the FiCS can recognize and physically isolate the apparently similar cell types based on their morphologies with high accuracy and throughput.

FiCS is also able to accurately enrich MIA PaCa-2 cells against the complex mixture of PBMCs. 200 waveforms of MIA PaCa-2 cells and 200 of PBMCs were used for training the SVM model. The two cell types were mixed and their maximum blue fluorescence intensities were measured using a home-built flow cytometer (analyzer). The peak at stronger intensity, corresponding to the population of MIA PaCa-2 cells, was relatively small (as shown in panel (i) of FIG. 5C). After applying the FiCS to the same cell mixture by classifying the green fluorescence waveforms, the maximum blue fluorescence intensity of the sorted mixture was measured in the same manner. As a result, the purity of MIA PaCa-2 cells increased from 0.117 (as shown in panel (i) of FIG. 5C) to 0.951 (as shown in panel (ii) of FIG. 5C). This confirmed that the FiCS is able to significantly enrich the model cancer cells against the background of complex cell mixture without any specific biomarker at high accuracy and throughput.

Recent research has extensively used imaging flow analyzers for the detection and/or characterization of critical cells in various fields including oncology, immunology and drug screening (30, 31). GC's ability to significantly increase the analysis throughput and selectively isolate the cell population according to the high-content information in real time may lead to integration of the morphology-based analysis with comprehensive, downstream—omics analyses at single cell levels. Beyond conventional image generation and processing relying on human's limited knowledge and capability, machine learning methods applied directly to compressive modalities may have broad applicability for the real time application of high-quantity and high-dimensional data.

Example 7: Acquisition of Optical Encoder Patterns

Figure 6:
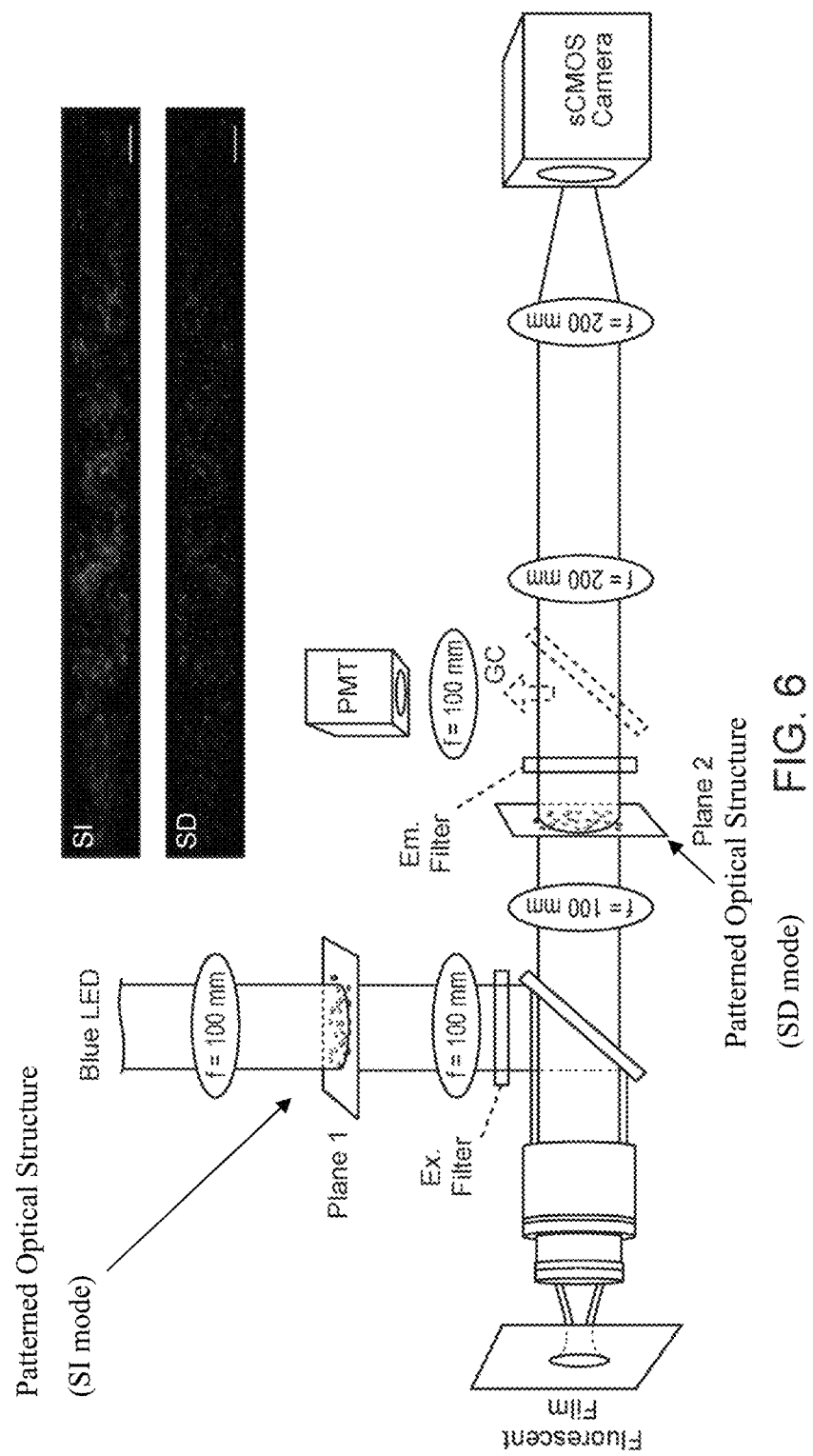
FIG. 6 shows an example of an optical system for estimating an intensity distribution of an optical encoder pattern such as an SI element or an SD element.

FIG. 6 shows acquisition of optical encoder patterns H(x, y) used in the fluorescence imaging of beads in the SI mode and in the SD mode. The left bottom part of FIG. 6 shows the optical setup used for estimating the exact intensity distribution of the encoder H(x, y) (as shown in the top right part of FIG. 6). Photo-masks made of a chromium layer with identical pseudo-random hole arrays were placed in either conjugated image plane before (plane 1 as shown in FIG. 6) and after (plane 2 as shown in FIG. 6) the sample for SI and SD modes, respectively. The fabricated holes were squares with side of 8 µm, randomly spread over an 800×9,600 µm² rectangular area, with the filling ratio of ~1%. The sparsity (filling ratio) of the optical structure was designed to make the measurement process of GC robust against experimental noise (38, 39). These 8 µm holes correspond to about 1 µm spots in the sample plane after diffraction and a geometrical shrinkage and define the spatial resolution of the GC-based imaging. To minimize the errors derived from chromatic aberration attributed to each optical component, a thin film of fluorescent polymer was placed in the sample plane and its patterned emission was recorded.

In the SI mode, the polymer film was excited with light passing through the photo-mask. The fluorescence image of the film was transferred to plane 2 and further to the image sensor through a 4 f microscope system comprising two achromatic lenses, each with a focal length of 200 mm. In the SD mode, the polymer film was excited with uniformly spread light. A fluorescence image of the film was transferred to plane 2, where the photo-mask was placed. Photons passing through the pseudo-randomly patterned holes formed its image through the 4 f microscope system comprising two achromatic lenses, each with the focal length of 200 mm. Scale bars are 50 µm. In the experiment, a blue LED (UHP-T-LED-460 UV LED, Prizmatix, Israel) was used as an excitation light source and a scientific CMOS camera (Flash 4.0 V2, Hamamatsu Photonics) was used for the acquisition of images. The objective lens was 20× and obtained from Olympus (UPlanSApo). The imaged beads were purchased from Spherotech Inc. (FP-10052-2 fluorescent yellow particles, diameter: 10.0-14.0 µm). Excitation light from the blue LED passed through a 474/27 nm bandpass filter (Semrock), was reflected by a dichroic mirror (ZT488rdc, Chroma), and illuminated the sample. Emitted light passed through the mirror and passed through a 525/50 nm band-pass filter (Semrock) to be collected.

FIG. 7 shows the optical setup and the measured intensity distribution of the encoder H(x, y), which were used for the three-color imaging of a fluorescently labeled cell. A photo-mask of a chromium layer with pseudo-random hole arrays was placed in a conjugated image plane after the sample for the SD mode. The fabricated holes were squares with side length of 8 µm and were randomly spread, with the filling ratio of ~1%, over an 800×10,800 µm² rectangular area.

Light from the blue laser (GEM473-500, Laser Quantum) passed through a clearing filter (Ex.1, Semrock) and that from the UV LED (UHP-T-LED-385 UV LED, Prizmatix) passed through a 377/50 nm bandpass filter (Ex.2, Semrock). These excitation light sources, combined with a 420 long-pass dichroic mirror (DM1, Chroma), were reflected by a triple-edge dichroic mirror (DM2, Di01-R405/488/594, Semrock) and uniformly illuminated the samples through the 20× objective lens. The emission from the samples passed through DM2, a triple-bandpass emission filter (Em.1, FF01-432/523/702, Semrock), and the photo-mask to be optically encoded. In GC-based imaging, the emitted light after the photo-mask was split into three color channels by a combinatorial use of dichroic mirrors (DM3 is FF-573-Di01 from Semrock and DM4 is ZT488rdc from Chroma), and was recorded using three PMTs through each bandpass filter (Em.2, Em.3, and Em. 4 are a 593 long-pass filter, a 535/50 nm bandpass filter, and a 435/40 nm bandpass filter from Semrock). In the calibration of H(x, y), thin films of fluorescent polymers were placed in the sample plane and separately recorded the patterned emission under illumination by different excitations using a 536/40 nm bandpass filter (Em.5, Chroma) and the sCMOS camera. Scale bars are 50 µm.

Figure 8:
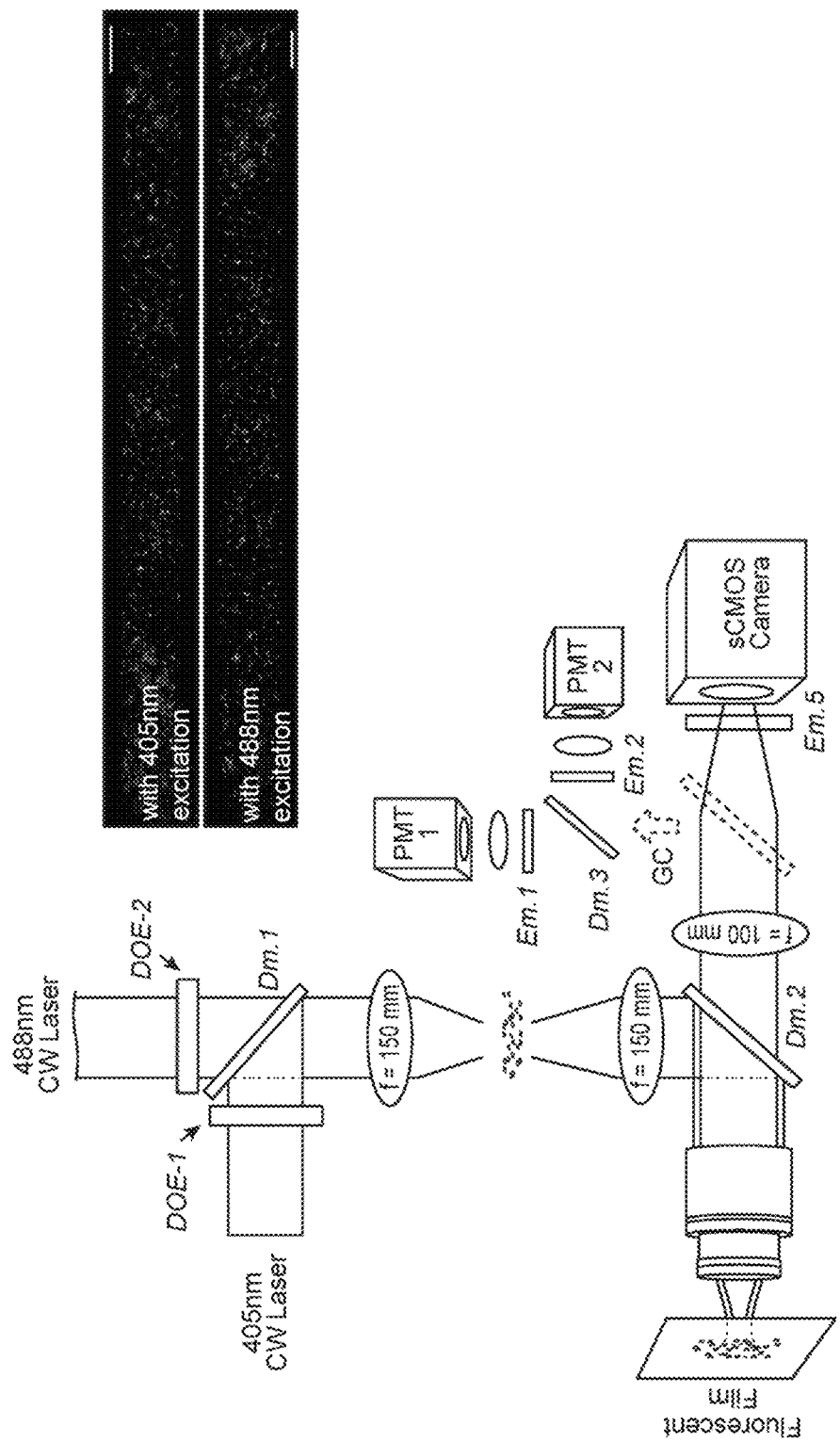
FIG. 8 shows an example of an optical setup and calibrated intensity distribution of an optical encoder used for ultrafast multi-color fluorescence imaging and image-free imaging cytometry by GC.

FIG. 8 shows an optical setup and calibrated intensity distribution of the optical encoder used for ultrafast multi-color fluorescence imaging and image-free imaging cytometry by GC. The left bottom part of FIG. 8 shows the optical setup used for image-free GC, wherein a structured illumination using a diffractive optical element (DOE) was illuminated for each wavelength laser in a conjugated image plane before the sample. The structured illuminations were designed to have a pattern of 100×1350 pixels, with a pseudo-random pattern with ~1% of bright spots, where each square pixel having a side length of ~10.5 µm using a lens with a focal length of 150 mm for 405 nm (DOE-1) and ~12 µm for 488 nm (DOE-2). At the conjugated image plane before the sample, a spatial filter was placed to block zero-order and multi-order diffraction patterns.

Light from the 488 nm blue laser (Cobolt 06-MLD 488nm, Cobolt) and that from the 405 nm violet laser (Stradus 405-250, Vortran) were combined with a long-pass dichroic mirror (DMI, ZT405rdc-UF1 from Chroma), were reflected by a quad-band dichroic mirror (DM2, Di03-R405/488/561/635-t3, Semrock) and uniformly illuminated the samples through the 20× objective lens. The emission from the samples passed through DM2, and split into two color channels by a dichroic mirror (DM3, FF506-Di03 from Semrock), and was recorded using two PMTs through each bandpass filter (Em.1, and Em. 2 are a 535/50 nm bandpass filter, and a 440/40 nm bandpass filter from Semrock). The calibration was performed in the same manner using the Em. 5 and the sCMOS as described herein with respect to FIG. 7. When performing image-free imaging cytometry (FIG. 4), the DOE-1 was replaced with a cylindrical lens. Scale bars are 50 µm.

Example 8: Hydrodynamic Flow Focusing

FIGS. 9A-9F shows effects of controlling the hydrodynamic focusing strength on the performance of classification by image-free GC. The geometry of the flow cell (Hamamatsu Photonics K. K., Japan) depicted in FIG. 9A yields hydrodynamic three-dimensional (3D) flow focusing of the inner fluid by the outer fluid, allowing the flowing cells to be kept in focus and allowing control of their positions in the image as depicted. Moreover, the device allows control of the focusing strength by changing the ratio of flow rates between the inner and outer fluids, as shown in FIG. 9B. In other words, flowing one type of cells under a loosely focused condition generates more various, generalized temporal waveforms compared with a strongly focused condition. After comprehensively investigating various combinations of focusing strengths as following, a combination of fluidic conditions was used that allowed the construction of a highly generalized, robust, and sensitive classifier model: the loose and tight focusing conditions were combined for training the model and the tight focusing condition was used for testing the model.

To determine the effect of flow focusing on cell classification using SVM-based image-free GC, various combinations of focusing strength were comprehensively tested when training and testing the model, as shown in FIGS. 9C-9F. For evaluating the classification result of GC, waveforms were randomly selected from a set of waveforms labeled with each type (MCF-7 or MIA PaCa-2 cell) for training the model. As seen in FIGS. 9C-9F, the model improves by increasing the number of waveforms used for training the classifier. 1,000 waveforms were selected for each cell type from the other waveforms for testing the model, where error bars were obtained by repeating it 10 times. Here, the tightly focused stream denotes the scenario in which the inner flow rate in volume and the outer rate in flow speed are 20 μL/min and >10 m/sec, respectively. The loosely focused stream denotes the scenario in which the inner rate is 30 μL/min.

The curve in FIG. 9C shows that, when the tightly focused stream is used for both training and testing under a highly controlled experimental condition (minimal experimental errors), the accuracy rapidly reaches a high plateau with a small number of training points. The curve in FIG. 9D shows that, when the loosely focused stream is used for both training and testing, the accuracy increases slowly and requires a larger number of training points. These results show that the tightly focused condition helps to increase the classifier's sensitivity. However, a model trained in a strict condition may be over-fitted and may lose accuracy when the testing condition is imperfectly the same as the training condition, which may often be the case in reality. Indeed, the curve in FIG. 9E shows that, when the tightly focused stream was used for training and the loosely focused stream was used for testing, the accuracy increased much more slowly and reached a low plateau.

To simultaneously pursue high sensitivity and robustness on the cell classification, the training data set was prepared to comprise waveforms randomly selected from data sets collected using both the tightly focused stream and the loosely focused stream. When this trained model was used for testing data sets measured by using the tightly focused stream, the accuracy increased rapidly and eventually reached a high plateau, as shown in FIG. 9F. Thus, the model is generalized and performs well. These results show that, while training the model using the loosely focused stream reduces the sensitivity, the model's robustness with respect to samples increases, which is equivalent to the generalization ability in machine leaning models. To achieve sensitive and robust cytometry, we combined the loose and tight focusing conditions for training the model and used the tight focusing condition for testing the model.

Example 9: Validation of Classification by Image-Free Ghost Cytometry

Figure 10D:
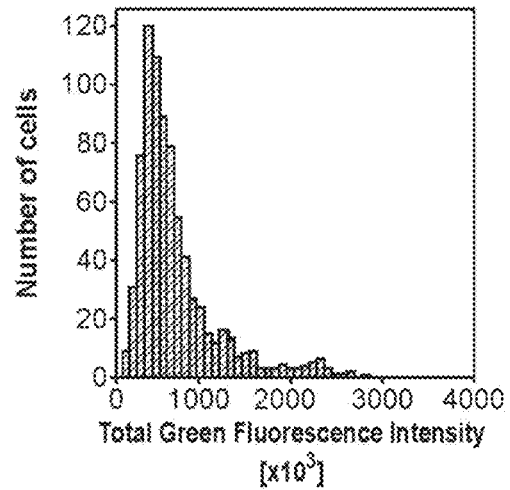
FIG. 10D shows an example of a histogram of the total green fluorescence intensity of an example of a mixture of MCF-7 and MIA PaCa-2 cells.

FIGS. 10A-10D show BV421-EpCAM-based validation of the classification of image-free GC and the workflow of image-free GC. To evaluate the performance of image-free GC in classifying the temporally modulated green fluorescence intensity, the total blue fluorescence (BV421-EpCAM) intensities of the same cells was quantified. FIG. 10A shows a histogram of the total blue fluorescence intensity only of the MCF-7 cells, and FIG. 10B shows that only of the MIA PaCa-2 cells. FIG. 10C shows the intensity histogram for an example data set of cell mixture, which corresponds to a single dot in FIG. 4D. Throughout the experiments in FIGS. 4A-4E, 2,500 was used as an upper gating threshold for distinguishing MIA PaCa-2 cells and 4,000 as a lower gating threshold for distinguishing MCF7 cells using the total fluorescence intensity of BV421-EpCAM. Cells excluded by this gating were only 0.7% of the total population and considered negligible. In contrast to the distinct distribution of the BV421's total intensity, a histogram of the FG's total fluorescence intensity for the same sample cells shows indistinguishable distribution, as shown in FIG. 10D.

FIG. 10D shows a histogram of the total fluorescence intensity of FG in which no distinguishable peaks are apparent. In contrast, the FIG. 4D shows a histogram of the scores calculated using equation (9), which has distinguishable two peaks. Each point on the ROC curve in FIG. 4D corresponds to a threshold value applied to the score obtained from this trained SVM model. The SVM-based cell classification method demonstrated high performance, measured by the area under the ROC curve (AUC) of 0.971. The sample and fluidic conditions adopted in the demonstration in FIG. 4 as well as in FIG. 11 are summarized in Table 1.

TABLE 1

| Sample and fluidic conditions | | | |
| --- | --- | --- | --- |
| Training Data Set | | Test Data Set | |
| Fluidic Condition | Total # of Waveforms | Fluidic Condition | Total # of Waveforms |
| Tight | 2,400 | Tight | 700 Waveforms × 70 Samples |
| Loose | 1,200 | | |

Example 10: Confirmation of Consistent Accuracy of SVM-Based Classification

FIG. 11 shows confirmation of consistent accuracy of SVM-based classification over a wide range of concentration ratios.

A simple linear fit was computed to demonstrate that the model consistently retains its accuracy over a wide range of concentration ratios. In FIG. 11, denoting the true and false positive rates of discriminating MCF-7 by GC as $\alpha$ and $\beta$, respectively, the results for GC against those for the measurement of BV421's intensity can be estimated as:

$$n = \alpha m + \beta(1-m)$$

where m is the concentration ratio of MCF-7 estimated by the BV421's measurement and n is that obtained by the GC classification. The quantities α and β were calculated from by comparing GC classification results against DAPI measurements for pure solutions of MCF-7 and MIA PaCa-2. The calculated α and β are 0.949 and 0.068 for the fitting shown in FIG. 4D. This demonstrates a consistently good match between the plots and the fits, for the different concentration ratios. It is difficult by eye to find clearly different morphological features such as size and circularity between the green fluorescence cytoplasm images of MIA PaCa-2 and MCF-7 cells, as shown in panel (i) of FIG. 4A.

Example 11: Machine Learning-Based Fluorescence "Imaging"-Activated On-Chip Cell Sorting FIGS. 12A-12D show machine learning-based fluorescence "imaging"-activated on-chip cell sorting system (FiCS). FIG. 12A-12C show the functional microfluidic device that enabled FiCS in combination with the GC system. The cell sorting chip depicted in FIG. 12A was fabricated using the standard soft lithography technique. The channel features were photolithographically patterned by SU-8 photoresist mold and transferred into polydimethylsiloxane (PDMS). The PDMS channel was fixed on a glass substrate by oxygen-plasma-activated bonding. Both the sample and sheath injections were driven by syringe pumps (Harvard Apparatus Pump 11 Elite Syringe Pump) at constant flow rates of around 10 μL/min and 400 μL/min, respectively. The chip design (28) shown in FIG. 12B as a microscope image, enabled a sample flow to be focused into a narrow cell stream by 3D hydrodynamic flow-focusing prior to the optical measurement site. The chip design (29) shown in FIG. 12C as a microscope image, enabled selective cell sorting based on classification. At this sorting site, a piezoelectric PZT actuator was connected to the junction through a channel running perpendicular to the main flow stream. The targeted cells entering the sorting site were deflected to a collection outlet by displaced fluids driven by bending action of the PZT actuator. The piezoelectric actuator has a diameter of 20 mm and an intrinsic resonant frequency of around 6.5 kHz. Scale bars are 50 μm in FIGS. 12B and 12C.

FIG. 12D shows a process flow of the real-time classification and electric control system used in this work. The GC waveforms detected as analog voltages by PMT were first digitized via an analog-to-digital converter (ADC, partially modified AD11445EVM of Texas Instrument) with a sampling rate of 20 MHz in resolution of 14 bits. In the SVM-based classification by a field programmable gate array (FPGA, Stratix IV, Altera) on a FPGA development board (Terasic TR4), each waveform was decimated to be 1,000 data points. When the FPGA determined the presence of targeted cells based on classification, it automatically output a time-delayed signal to drive a function generator (Tektronix AGF1022). A rectangular pulse immediately sent out from the function generator was amplified via a high voltage amplifier (Trek Model 2210) and delivered to the electrode of the PZT actuator for inducing the sorting action. The FPGA was also connected to a computer for collecting training data, uploading SVM parameters, setting trigger conditions, and storing test data.

To evaluate performance of the cell sorting system, samples were analyzed before and after sorting using the home-built analyzer comprising an optical set-up (as shown in FIG. 8) with a flow cell (Hamamatsu Photonics), where maximum blue (as labeling) and green fluorescence intensities from samples were detected simply by a trigger condition applied to green fluorescence signals.

In the example hydrodynamic flow-focusing device, positions of the cell stream were controlled in the three-dimensional space by changing the ratio of rates between the inner flow and the outer flow.

Example 12: Label-Free Sorting Based on a Partial Transmissive Speckle Pattern

The systems and methods described herein can be used to perform label-free sorting. Such label-free sorting may be achieved by obtaining phase information of fast flowing cells in a microfluidic channel by compressive sensing. This may be done by measuring the modulation waveform of a transmissive speckle pattern with a detector (such as a single pixel PMT or any other detector described herein) when the cell passes through structured illumination as described herein. Compared to phase retrieval imaging techniques, this method may obtain only a portion of the whole speckle pattern necessary to regenerate the image. Still, it may be sufficient to classify cells at high accuracy, and this optical dimensionality reduction before acquisition may enable fast, real-time classification and sorting.

Figure 14:
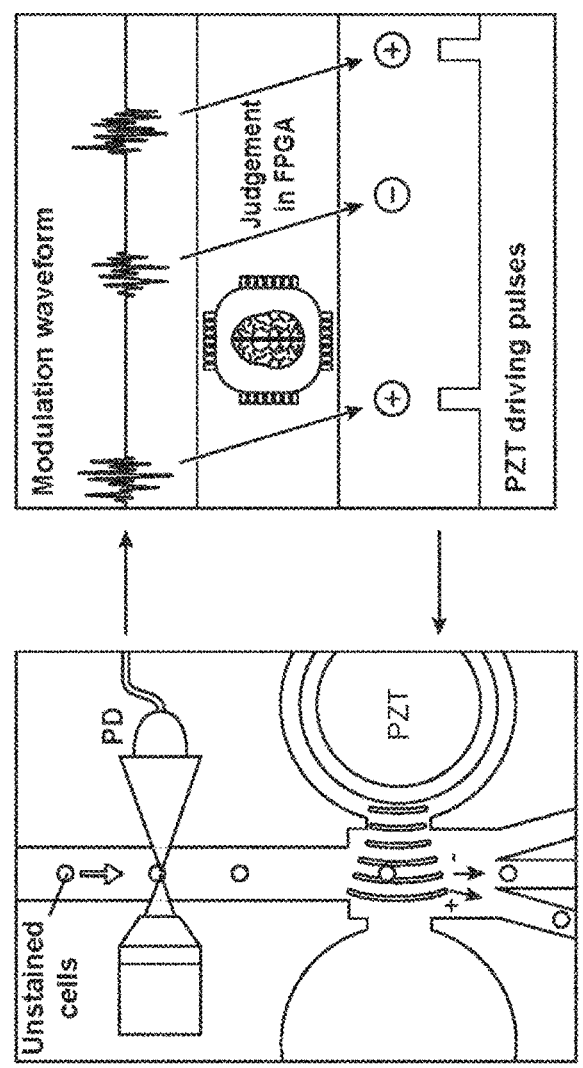
FIG. 14 shows an example of a label-free cell sorter utilizing GC.

FIG. 14 shows a label-free cell sorter utilizing GC. Directly from the waveform obtained by the photodetector (PD), a field-programmable gate array (FPGA) may implement a machine learning classifier that classifies each cell passing by the PD. The FPGA may then send pulses to the PZT to push cells that are identified as cells of interest to an adjacent channel.

Figure 15:
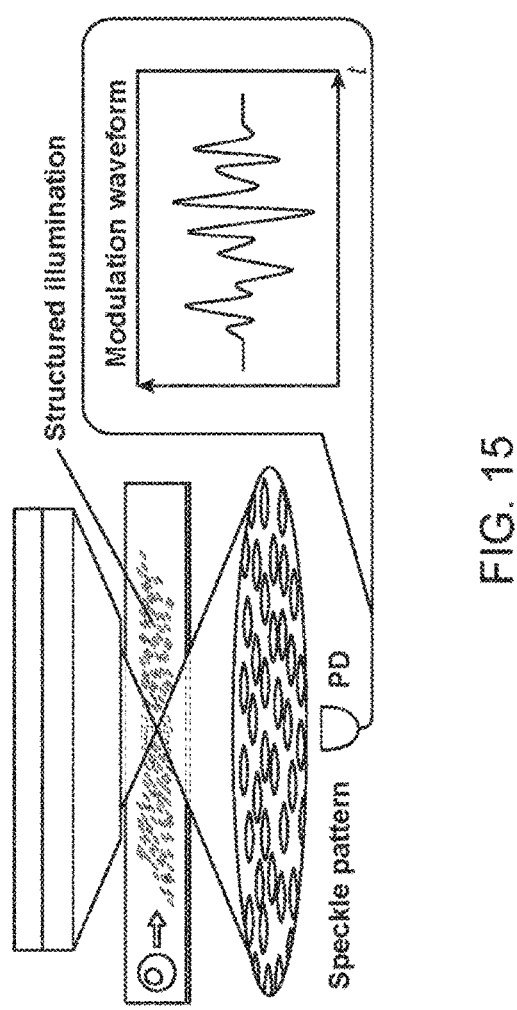
FIG. 15 shows an example of motion-driven compressive GC for a label-free cell sorter.

FIG. 15 shows motion-driven compressive ghost cytometry for a label-free cell sorter. When a cell passes through a structured illumination, the transmission speckle pattern may be modulated by the structured illumination. By obtaining a portion of this speckle pattern by a photodetector (PD), a modulation waveform can be obtained.

MIA PaCa-2 cells and Jurkat cells, two cell lines with similar size and apparent morphology, were classified and sorted using the systems and methods of the present disclosure. The cells were flowed at a velocity of 3 m/s and the waveform each cell was obtained in 110 microseconds (μs), corresponding to a throughput of over 9,000 cells/second. To train and validate the machine classifier, MIA PaCa-2 cells were stained with green fluorescence. By training the machine classifier with 150 cells of each cell type, it was able to classify the two types of cells in a mixture at an accuracy of 93%. The actual sorted cells were analyzed by fluorescence and had a purity of 89%. Conventional forward scatter (FSC) and side scatter (SSC) plots show that the two cells are hard to classify completely with size.

Figure 16A:
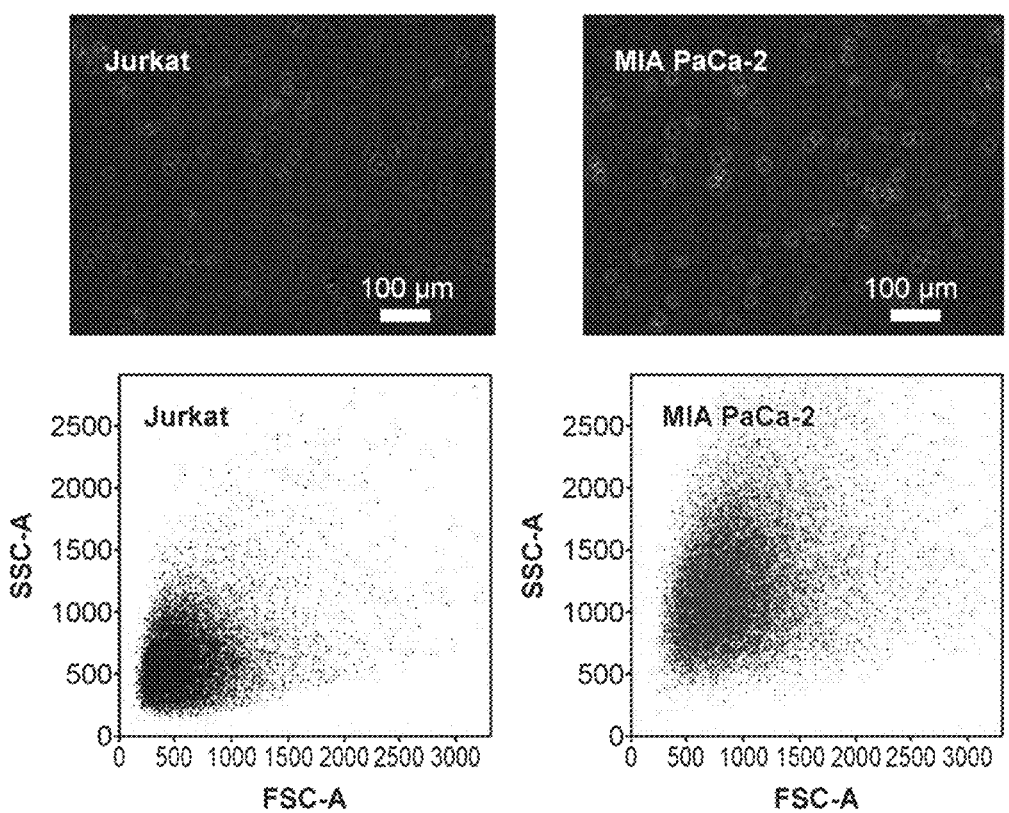
FIG. 16A shows an example of sorting of Jurkat and MIA PaCa-2 cells using a label-free cell sorter.

FIG. 16A shows sorting of Jurkat and MIA PaCa-2 cells using a label-free cell sorter. The top left portion of FIG. 16A shows a phase contrast image of the Jurkat cells. The top right portion of FIG. 16A shows a phase contrast image of the MIA PaCa-2 cells. The bottom left portion of FIG. 16A shows FSC and SSC plots of the Jurkat cells. The bottom right portion of FIG. 16A shows FSC and SSC plots of the MIA PaCa-2 cells. As shown in FIG. 16A, the FSC and SSC plots of the Jurkat and MIA PaCa-2 cells overlap, making it difficult to discriminate between the two types of cells using size determination by FSC and SSC plots alone.

Figure 16B:
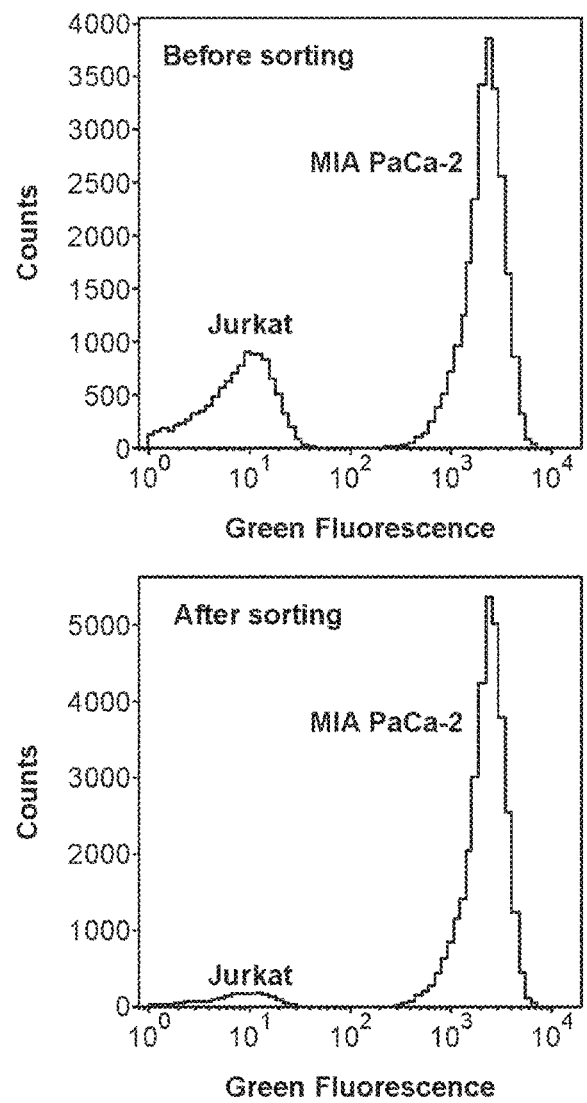
FIG. 16B shows an example of a histogram of Jurkat and MIA PaCa-2 cell populations before and after cell sorting.

FIG. 16B shows a histogram of Jurkat and MIA PaCa-2 cell populations before and after cell sorting. Only MIA PaCa-2 cells were stained with green. The top portion of FIG. 16B shows the sample before sorting. The bottom portion of FIG. 16B shows the sample after sorting. After sorting, the ratio of MIA to PaCa-2 was increased from 51% to 89%.

Example 13: Classification of Dead and Early Apoptotic Induced Pluripotent Stem Cells (iPSCs)

FIG. 17A shows an example of a scatter plot of fluorescence intensities of propidium iodide (PI) and Annexin V for classification of induced pluripotent stem cells (iPSCs) as living, early apoptotic, or dead. As shown in FIG. 17A, the populations within the blue, red, and green regions are labeled as alive, dead, and early apoptotic cells, respectively.

FIG. 17B shows an example of a scatter plot of forward scattering (FSC) and side scattering (SSC) for the IPSCs. The blue, red, and green dots correspond to living, dead, and early apoptotic cells, respectively. Using conventional methods such as FSC and SSC, living cells can mostly be distinguished from dead/apoptotic cells, but dead and apoptotic cells are difficult to distinguish from one another.

FIG. 17C shows an example of an ROC curve and an SVM score histogram for the classification of live and dead cells using the systems and methods of the present disclosure. The dotted line is the ROC curve for the classification using only conventional FSC and SSC, for reference. As shown in FIG. 17C, conventional FSC and SSC allow living and dead cells to be distinguished at an AUC of 0.876, while classification using the systems and methods of the present disclosure achieves an AUC becomes 0.995, showing a highly superior performance.

FIG. 17D shows an example of an ROC curve and an SVM score histogram for the classification of living and early apoptotic cells using the systems and methods of the present disclosure. The dotted line is the ROC curve for the classification using only conventional FSC and SSC, for reference. Similar to the scenario shown in FIG. C, classification with the systems and methods of the present disclosure shows superior performance (AUC=0.947) compared to that obtained using conventional FSC and SSC (AUC=0.875).

FIG. 17E shows an example of an ROC curve and an SVM score histogram for the classification of dead and early apoptotic cells using the systems and methods of the present disclosure. The dotted line is the ROC curve for the classification using only conventional FSC and SSC, for reference. Using conventional FSC and SSC alone, the two populations are hard to distinguish (AUC=0.657), but with the systems and methods of the present disclosure, they can be distinguished at an AUC of 0.931.

The systems and methods described herein may exhibit significant applicability to cell manufacturing processes for use in processes such as regenerative medicine and cell therapy. In such processes, the quality of cells should be monitored and controlled according to a variety of requirements. The systems and methods described herein may be applied to a pipeline using induced pluripotent stem cells (iPSCs). The pipeline may be initiated with the thawing of frozen-preserved iPSC which are then passed through multiple differentiation steps, leading to a final cell product. Throughout this pipeline, liveliness, expression states, and purity of the cell population may need to be monitored and the cells may sometimes need to be sorted. Previous examinations of iPSCs have required molecular staining which is often toxic to cells or otherwise adversely affects the cells (for instance, due to immunoresponse). Moreover, chemical contaminations of cell products may have an potential side-effect on the patient when these are induced into the human body. In contrast, the systems and methods described herein may enable high-speed evaluation of cells based on their liveliness, expression states, and purity without staining the actual product-line cells, thus solving the problems potentially caused by molecular staining.

The systems and methods described herein may distinguish not only dead cells but also cells in the early apoptotic states from living cells with high accuracy. This may be essential in monitoring the cell population for quality control because remains of dead cells may potentially cause stress to surrounding cells and alter the differentiation of iPSCs or other stem cells. Furthermore, contamination by dead and early apoptotic cells may lead to inaccurate estimation of the functional cell number in transplantations. A viability and apoptosis analysis of cultured iPSCs that were detached from the culture flask was performed. As shown in FIG. 17A, the training label was created using the fluorescence intensity of propidium iodide (PI) and Annexin V, indicators of dead and early apoptotic cells, respectively. Dead and early apoptotic cells may be distinguished to a degree of accuracy from alive cells from conventional FSC and SSC plot as shown in FIG. 17B. However, such a classification may not be completely accurate and conventional methods may require additional dead cell-exclusion staining to exclude dead cells.

Using the systems and methods of the present disclosure, a training dataset of waveforms was prepared with cell populations gated and labeled as alive, dead, and early apoptotic cells. As shown in FIG. 17B, dead cells were distinguished from living cells with a high ROC-AUC of 0.996±0.001 (as shown by the solid line in FIG. 17C) and early apoptotic cells were distinguished from living cells with an ROC-AUC of 0.947±0.005 (as shown by the solid line in FIG. 17D). In contrast, using only conventional FSC and SSC data with the same labels, conventional flow cytometry achieved a limited performance with an ROC-AUC of 0.890±0.009 (as shown by the dashed line in FIG. 17C) and 0.875±0.013 (as shown by the dashed line in FIG. 17D) for dead-living and apoptotic-living discrimination, respectively. Additionally, the systems and methods of the present disclosure were able to distinguish early apoptotic cells from dead cells at an ROC-AUC of 0.931±0.006 (as shown by the solid line FIG. 17E), which was difficult with only conventional FSC and SSC, achieving a ROC-AUC of 0.657±0.012 (as shown by the dashed line in FIG. 17E).

Example 14: Classification of Differentiation and Undifferentiated iPSCs

Figure 18A:
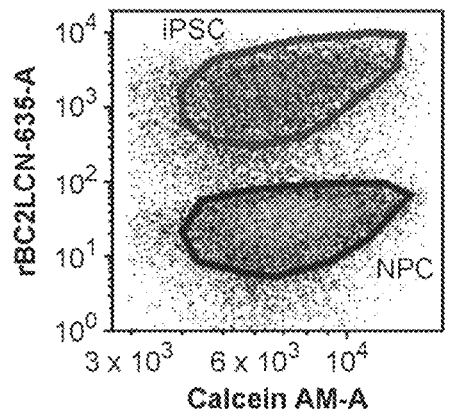
FIG. 18A shows an example of scatter plots of Calcein AM and rBC2LCN-635 intensities for a mixture of neural progenitor cells (NPCs) and iPSCs used for training a machine learning classifier.

FIG. 18A shows an example of scatter plots of Calcein AM and rBC2LCN-635 intensities for a mixture of neural progenitor cells (NPCs) and iPSCs used for training a machine learning classifier. The populations within the blue and red regions were labeled as NPCs and iPSCs, respectively.

Figure 18B:
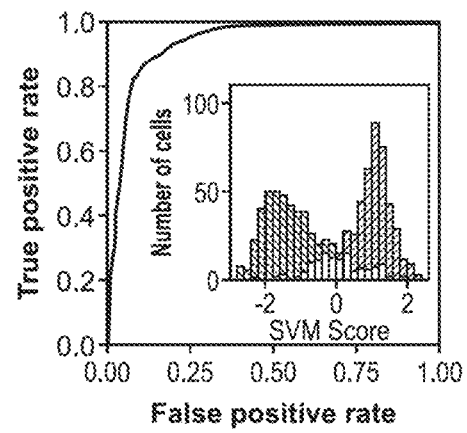
FIG. 18B shows an example of an ROC curve and SVM score histogram for the classification of NPCs and iPSCs.

FIG. 18B shows an example of an ROC curve (outer panel of FIG. 18B) and an SVM score histogram (inner panel of FIG. 18B) for the classification of NPCs and iPSCs using the systems and methods of the present disclosure. The AUC of the ROC curve was 0.933. The SVM score histogram in blue and red corresponds to the cells labeled as NPCs and iPSCs, respectively, derived from FIG. 18A.

Figure 18C:
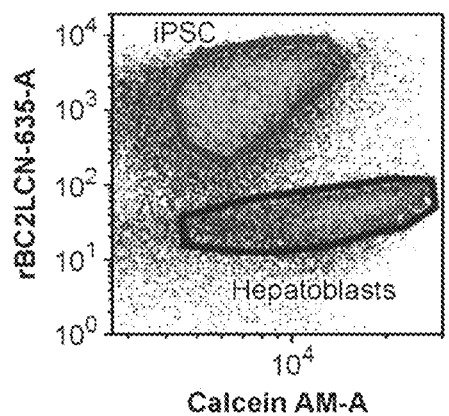
FIG. 18C shows an example of scatter plots of Calcein AM and rBC2LCN-635 intensities for a mixture of hepatoblasts and iPSCs used for training a machine learning classifier.

FIG. 18C shows an example of scatter plots of Calcein AM and rBC2LCN-635 intensities for a mixture of hepatoblasts and iPSCs used for training a machine learning classifier. The populations within the blue and red regions were labeled as hepatoblasts and iPSCs, respectively.

Figure 18D:
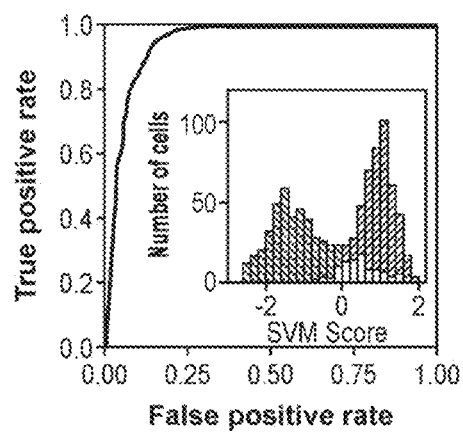
FIG. 18D shows an example of an ROC curve and an SVM score histogram for the classification of hepatoblasts and iPSCs.

FIG. 18D shows an example of an ROC curve (outer panel of FIG. 18D) and an SVM score histogram (inner panel of FIG. 18D) for the classification of hepatoblasts and iPSCs using the systems and methods of the present disclosure. The AUC of the ROC curve was 0.947. The SVM score histogram in blue and red corresponds to the cells labeled as hepatoblasts and iPSCs, respectively, derived from FIG. 18C.

The systems and methods of the present disclosure may classify undifferentiated cells from differentiated ones, which may represent one of the most important processes in a cell manufacturing pipeline. Such a classification may be critical because remaining undifferentiated cells may still have the ability to proliferate, which may eventually cause the cells to become cancer cells. Undifferentiated iPSCs were compared with differentiated cells in the form of neural progenitor cells (NPCs) and hepatoblasts, both derived from the same iPSC. In the training process, the cells were labeled with an undifferentiation marker which only stained the iPSCs that were undifferentiated. A label-free cytometry modality was also implemented. The training label was created by staining the cells with rBCLCN-635 (Wako), a marker for indicating undifferentiated cells, and measuring the rBCLCN-635 intensity intensity (as shown in FIG. 18A and FIG. 18C). Using waveforms for each cell types labeled by the undifferentiation marker as training dataset, the classifier distinguished iPSCs and NPCs with an ROC-AUC of $0.933 \pm 0.008$ (as shown in FIG. 18B), and iPSCs and hepatoblasts with an ROC-AUC of $0.944 \pm 0.004$ (as shown in FIG. 18D), showing its high classification capability. In contrast, using only conventional FSC and SSC information, the ROC-AUCs for the classification of each pair of cells were limited to $0.862 \pm 0.013$ and $0.697 \pm 0.020$, respectively.

Example 15: Classification of Cells Based Upon Function

Figure 19A:
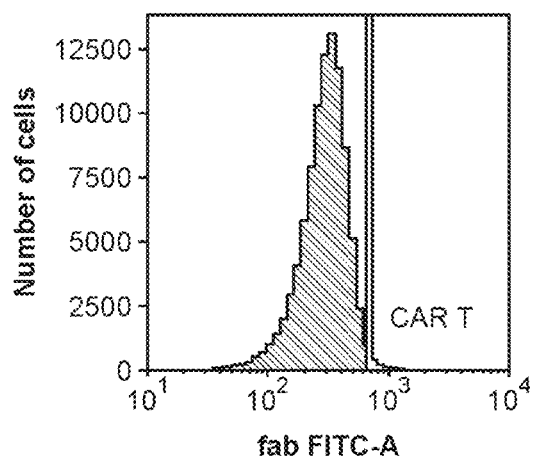
FIG. 19A shows an example of a histogram of fab FITC intensity of T cells.

FIG. 19A shows an example of a histogram of fab FITC intensity of T cells. The cells to the right of the red threshold line were labeled as CAR T cells. The threshold was decided with a negative control sample.

Figure 19B:
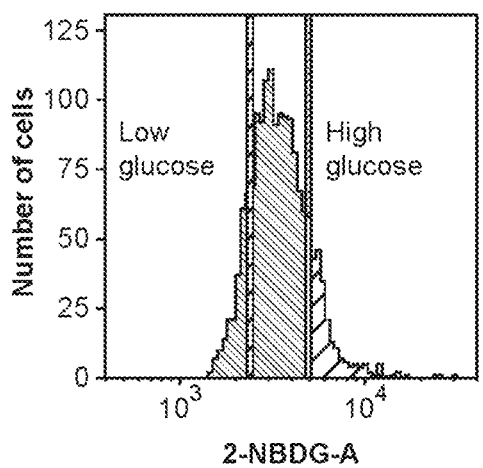
FIG. 19B shows an example of an ROC curve and an SVM score histogram for classifying different states in a cell cycle.

FIG. 19B shows an example of an ROC curve and an SVM score histogram for classifying different states in a cell cycle with the label from FIG. 19A.

Figure 19C:
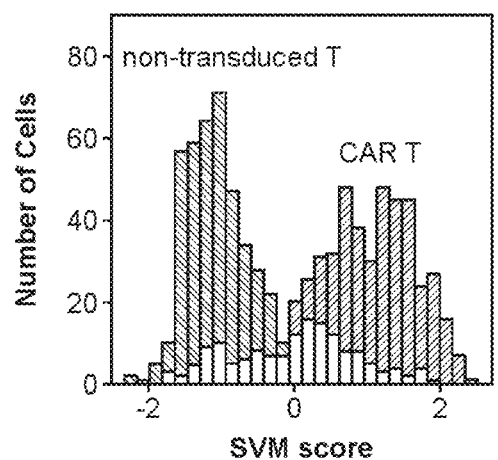
FIG. 19C shows an example of a histogram of 2-(N-(7-nitrobenz-2-oxa-1,3-diazol-4-yl)amino)-2-deoxyglucose (2-NBDG) intensity of raji cells.

FIG. 19C shows an example of a histogram of 2-(N-(7-nitrobenz-2-oxa-1,3-diazol-4-yl)amino)-2-deoxyglucose (2-NBDG) intensity of raji cells. The cells on the left of the green threshold line were labeled as low glucose cells, and the cells on the right of the red threshold were labeled as high glucose cells.

Figure 19D:
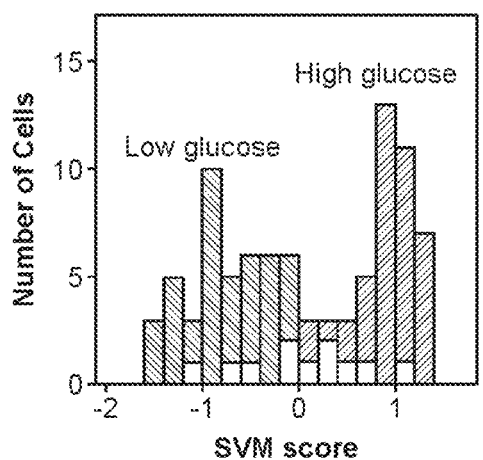
FIG. 19D shows an example of an ROC curve and an SVM score histogram for classifying cells having high and low levels of glucose.

FIG. 19D shows an example of an ROC curve and an SVM score histogram for classifying cells having high and low levels of glucose with the label from FIG. 19C.

The systems and methods described herein may be used to improve the quality of cell populations by selecting cells based upon their function. This may be important, for example, in cancer therapy where immune cells may be modified to attack cancer cells.

Classification of chimeric antigen receptor (CAR) T cells from a mixture of non-transduced T cells and CAR T cells was performed using the systems and methods of the present disclosure, with machine learning trained on the fab marker expressed only on CAR T cells, as shown in FIG. 19A. The ROC-AUC was $0.887 \pm 0.007$ (as shown in FIG. 19B), showing that the systems and methods of the present disclosure can be used to purify the CAR T cells at high accuracy with a label-free modality so that these cells may be directly used to treat patients.

Cellular classification based upon glycolysis levels was also performed. Differences in glycolysis levels result in different cellular metabolism and lead to different cellular activity. For instance, in CAR T cells, low glucose level cells are reported to have higher efficacy on cancer. To monitor glycolysis levels, 2-(N-(7-nitrobenz-2-oxa-1,3-diazol-4-yl) amino)-2-deoxyglucose (2-NBDG), a fluorescent glucose analog, is commonly used but is highly toxic to cells. Thus, prior methods of sorting living cells based on their glycolysis levels was difficult. Raji cells were treated with 2-NBDG. Cells with high and low levels of 2-NBDG within the whole population were extracted offline (as shown in FIG. 19C). Using these cells of high and low 2-NBDG levels, the classifier was trained and then validated. As a result, the classifier was able to classify the two populations at an accuracy of 0.88 (as shown in FIG. 19D), showing that the systems and methods of the present disclosure can classify cells based upon their glycolysis levels.

Example 16: Detection of Specific Cell Types in Mixed Fluids

The systems and methods of the present disclosure may be used to detect or sort specific cell types (such as disease cells) in mixed fluids (such as blood, urine, tears, saliva, pleural effusions, cerebrospinal fluids, or any other fluid described herein). The systems and methods may allow the detection or sorting of such specific cell types without the need for labeling with fluorophores or immunostaining by antibodies, as may be required in a variety of conventional laboratory tests.

FIGS. 20A-I show label-free detection of a variety of types of white blood cells in mixed fluids.

FIG. 20A shows a training dataset comprising a population of neutrophils. The neutrophils were characterized by a relatively high level of expression of CD66 markers and a relatively low level of expression of CD193 markers. Neutrophils were flowed past a patterned optical structure described herein and optical signals corresponding to the neutrophils were recorded.

FIG. 20B shows examples of label-free optical signals corresponding to neutrophils and to non-neutrophils. The optical signals were obtained without prior labeling of the neutrophils and the non-neutrophils. The optical signals were used to train a machine learning classifier to distinguish the neutrophils from the non-neutrophils.

FIG. 20C shows an example of an SVM score histogram for the classification of neutrophils and non-neutrophils. The classification was obtained without prior labeling of the neutrophils and the non-neutrophils. The SVM classification obtained an accuracy of 91.4% and an ROC-AUC of 0.941.

FIG. 20D shows a training dataset comprising a population of eosinophils. The eosinophils were characterized by a relatively high level of expression of CD66 markers and a relatively high level of expression of CD193 markers. Eosinophils were flowed past a patterned optical structure described herein and optical signals corresponding to the eosinophils were recorded.

FIG. 20E shows examples of label-free optical signals corresponding to eosinophils and to non-eosinophils. The optical signals were obtained without prior labeling of the eosinophils and the non-eosinophils. The optical signals were used to train a machine learning classifier to distinguish the eosinophils from the non-eosinophils.

FIG. 20F shows an example of an SVM score histogram for the classification of eosinophils and non-eosinophils. The classification was obtained without prior labeling of the eosinophils and the non-eosinophils. The SVM classification obtained an accuracy of 94.7% and an ROC-AUC of 0.992.

FIG. 20G shows a training dataset comprising a population of basophils. The basophils were characterized by a relatively low level of expression of CD66 markers and a relatively low level of expression of CD193 markers. Basophils were flowed past a patterned optical structure described herein and optical signals corresponding to the basophils were recorded.

FIG. 20H shows examples of label-free optical signals corresponding to basophils and to non-basophils. The optical signals were obtained without prior labeling of the basophils and the non-basophils. The optical signals were used to train a machine learning classifier to distinguish the basophils from the non-basophils.

FIG. 20I shows an example of an SVM score histogram for the classification of basophils and non-basophils. The classification was obtained without prior labeling of the basophils and the non-basophils. The SVM classification obtained an accuracy of 94.0% and an ROC-AUC of 0.970.

FIGS. 21A-22B show label-free detection of diseased cells in mixed fluids.

Figure 21B:
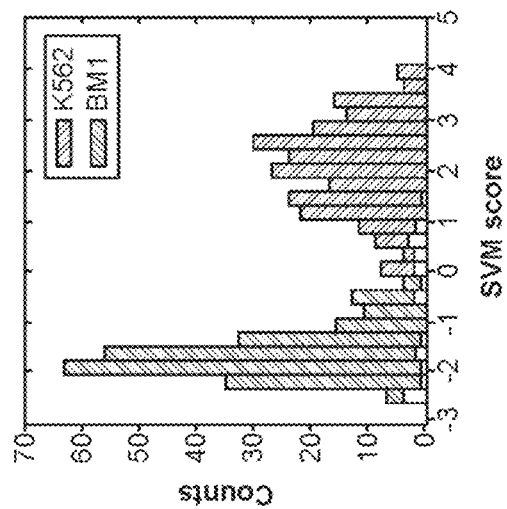
FIG. 21B shows an example of an SVM score histogram for the classification of BM1 cells and K562 cells.
Figure 21A:
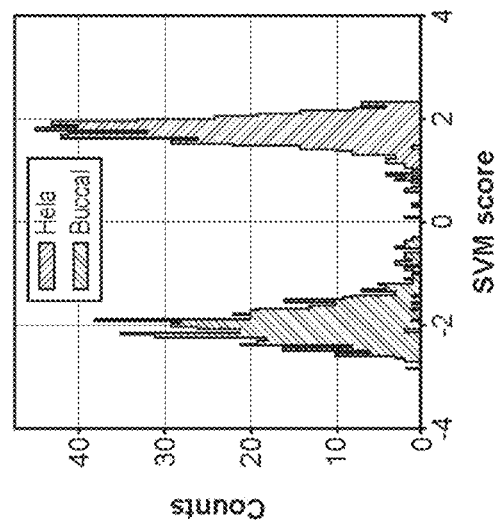
FIG. 21A shows an example of an SVM score histogram for the classification of buccal cells and HeLa cells.

FIG. 21A shows an example of an SVM score histogram for the classification of buccal cells and HeLa cells. Buccal cells and HeLa cells were flowed past a patterned optical structure described herein and optical signals corresponding to the buccal cells and the HeLa cells were recorded. The optical signals were obtained without prior labeling of the buccal cells or the HeLa cells. The optical signals were used to train a machine learning classifier to distinguish the buccal cells from the HeLa cells. The SVM classification obtained an ROC-AUC of 0.995.

FIG. 21B shows an example of an SVM score histogram for the classification of BM1 cells and K562 cells. BM1 cells and K562 cells were flowed past a patterned optical structure described herein and optical signals corresponding to the BM1 cells and the K562 cells were recorded. The optical signals were obtained without prior labeling of the BM1 cells or the K562 cells. The optical signals were used to train a machine learning classifier to distinguish the BM1 cells from the K562 cells. The SVM classification obtained an ROC-AUC of 0.969.

Example 16: Differentiation of Different Types of Particles that are Simultaneously Present in a Detection Region The systems and methods of the present disclosure may be applied to differentiate different types of particles, even when the different types of particles are simultaneously in a region to which a detector of the present disclosure is sensitive. When two or more particles are simultaneous located in such a region, overlap may occur in the signal detected by the detector. Because the systems and methods described herein can be expressed in terms of linear equations, such an event may be represented as a summation of the signals resulting from each particle independent of all other particles in the region.

The systems and methods described herein may be used to learn different waveforms that correspond to different types of particles, as described herein. Such waveforms may be arbitrarily summed, using arbitrary time offsets to account for different particles traveling through the region during different time intervals. A large variety of such summations may be generated and compared to the measured waveform resulting from the simultaneous presence of the different types of particles. In this manner, the particles may be differentiated.

Alternatively or in combination, the machine learning procedures described herein may be trained using overlapping waveforms resulting for the simultaneous presence of the different types of particles.

Figure 22A:
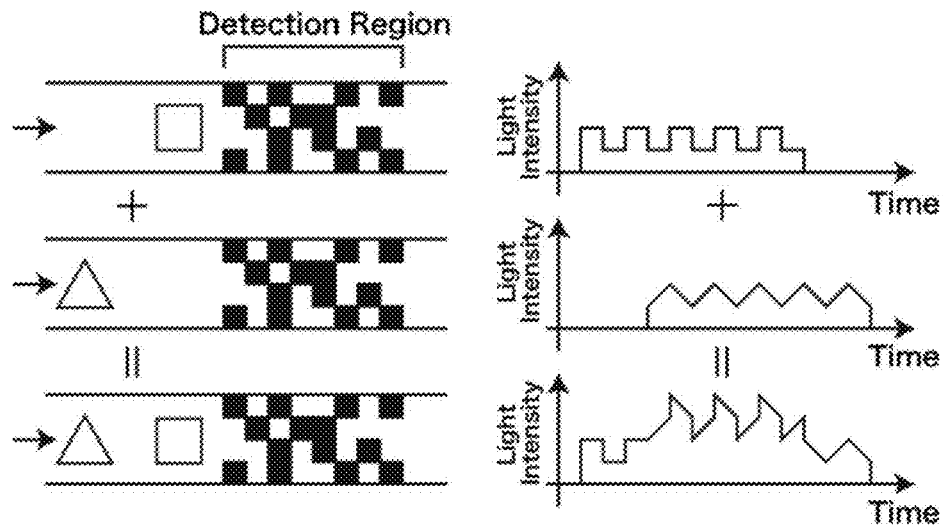
FIG. 22A shows an example of a signal resulting from a first type of particle, a signal resulting from a second type of particle, and a signal resulting from the simultaneous presence of the first and second types of particles.

FIG. 22A shows an example of a signal resulting from a first type of particle (upper portion of FIG. 22A), a signal resulting from a second type of particle (middle portion of FIG. 22A), and a signal resulting from the simultaneous presence of the first and second types of particles (bottom portion of FIG. 22A).

Figure 22B:
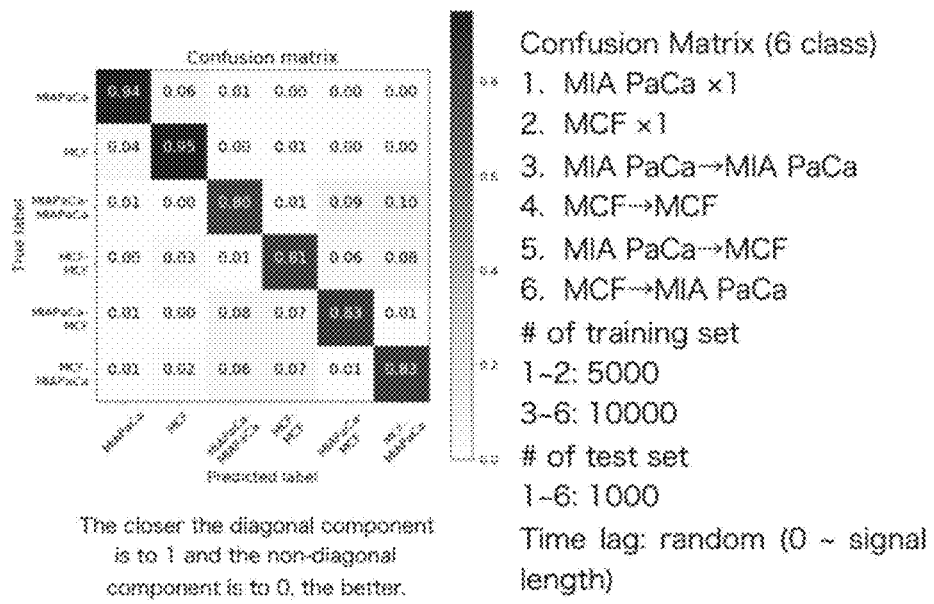
FIG. 22B shows an example of a confusion matrix for differentiation of different types of particles that are simultaneously present in a detection region of the present disclosure.

FIG. 22B shows an example of a confusion matrix for differentiation of different types of particles that are simultaneously present in a detection region of the present disclosure. The confusion matrix shows six states generated for mixtures of particles comprising MIA PaCa-2 cells and MCF-7 cells. As shown in FIG. 22B, the systems and methods of the present disclosure accurate differentiated MIA PaCa-2 from MCF-7 cells even in the case of overlapping signals corresponding to the simultaneous present of the two types of cells in the region to which the detector is sensitive.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for processing a particle from a plurality of particles, comprising:
    (a) directing a light from a light source through a patterned optical structure to generate a structured illumination, and focusing the structured illumination onto at least a portion of a fluid flow path of a flow cell such that the structured illumination generates a transmissive speckle pattern through the at least the portion of the fluid flow path and towards a detector;
    (b) passing the particle of the plurality of particles through the at least the portion of the fluid flow path, wherein upon the particle passing through the at least the portion of the fluid flow path, the transmissive speckle pattern is modulated to generate a modulated transmissive speckle pattern; and
    (c) collecting at least a portion of the modulated transmissive speckle pattern using the detector.

2. The method of claim 1, further comprising converting the at least the portion of the modulated transmissive speckle pattern into one or more temporal waveforms, wherein the one or more temporal waveforms comprise one or more intensity distributions imparted by the modulated transmissive speckle pattern as the particle of the plurality of particles passes through the structured illumination.

3. The method of claim 2, further comprising applying one or more machine learning classifiers to the one or more temporal waveforms to identify the particle of the plurality of particles.

4. The method of claim 3, further comprising separating or isolating the particle from the plurality of particles.

5. The method of claim 4, further comprising sorting the particle from the plurality of particles into one or more groups of sorted particles based on morphologies of the particle.

6. The method of claim 5, wherein the one or more groups of sorted particles are sorted without image reconstruction.

7. The method of claim 1, wherein the plurality of particles comprises one or more label-free particles.

8. The method of claim 3, wherein the one or more machine learning classifiers comprise supervised machine learning techniques, or unsupervised machine learning techniques, or a combination thereof.

9. The method of claim 1, wherein the patterned optical structure comprises an ordered patterned optical structure, a disordered patterned optical structure, an aperiodic patterned optical structure, a random or pseudo-random patterned optical structure, or a static optical structure.

10. The method of claim 1, further comprising directing a focuser to focus the structured illumination.

11. A system for processing a particle from a plurality of particles, comprising:
a flow cell comprising a fluid flow path configured to direct a plurality of particles;
a detector in sensing communication with at least a portion of the fluid flow path; and
one or more computer processors operatively coupled to the detector, wherein the one or more computer processors are individually or collectively programmed to:
(a) direct light from a light source through a patterned optical structure to generate a structured illumination, and focus the structured illumination onto the at least the portion of the fluid flow path of the flow cell such that the structured illumination generates a transmissive speckle pattern through the at least the portion of the fluid flow path and towards the detector;
(b) pass the particle of the plurality of particles through the at least the portion of the fluid flow path, wherein upon the particle passing through the at least the portion of the fluid flow path, the transmissive speckle pattern is modulated to generate a modulated transmissive speckle pattern; and
(c) collect at least a portion of the modulated transmissive speckle pattern using the detector.

12. The system of claim 11, wherein the detector is further configured to convert the at least the portion of the modulated transmissive speckle pattern into one or more temporal waveforms, wherein the one or more temporal waveforms comprise one or more intensity distributions imparted by the modulated transmissive speckle pattern as the particle of the plurality of particles passes through the structured illumination.

13. The system of claim 12, wherein the one or more computer processors are individually or collectively programmed to further apply one or more machine learning classifiers to the one or more temporal waveforms to identify the particle of the plurality of particles.

14. The system of claim 13, wherein the one or more computer processors are individually or collectively programmed to further separate or isolate the particle from the plurality of particles.

15. The system of claim 14, wherein the one or more computer processors are individually or collectively programmed to further sort the particle from the plurality of particles into one or more groups of sorted particles based on morphologies of the particle.

16. The system of claim 15, wherein the one or more groups of sorted particles are sorted without image reconstruction.

17. The system of claim 11, wherein the plurality of particles comprises one or more label-free particles.

18. The system of claim 13, wherein the one or more machine learning classifiers comprise supervised machine learning techniques, unsupervised machine learning techniques, or a combination thereof.

19. The system of claim 11, wherein the patterned optical structure comprises an ordered patterned optical structure, a disordered patterned optical structure, an aperiodic patterned optical structure, a random or pseudo-random patterned optical structure, or a static optical structure.

20. The system of claim 11, wherein the one or more computer processors are individually or collectively programmed to further direct a focuser to focus the structured illumination.

21. The method of claim 1, wherein the detector comprises one or more single-pixel detectors.

22. The system of claim 11, wherein the detector comprises one or more single-pixel detectors.

* * * * *